United States Patent
Stoyen

(10) Patent No.: US 7,330,844 B2
(45) Date of Patent: Feb. 12, 2008

(54) METHOD AND SYSTEM FOR INTELLIGENT AGENT DECISION MAKING FOR TACTICAL AERIAL WARFARE

(75) Inventor: Alexander D. Stoyen, Omaha, NE (US)

(73) Assignee: 21st Century Systems, Inc., Chappaqua, NY (US)

(*) Notice: Subject to any disclaimer, the term of this patent is extended or adjusted under 35 U.S.C. 154(b) by 0 days.

(21) Appl. No.: 10/067,255

(22) Filed: Feb. 7, 2002

(65) Prior Publication Data

US 2002/0073101 A1 Jun. 13, 2002

Related U.S. Application Data

(63) Continuation of application No. 09/277,776, filed on Mar. 29, 1999, now Pat. No. 6,360,193.

(60) Provisional application No. 60/100,863, filed on Sep. 17, 1998.

(51) Int. Cl.
*G06N 5/00* (2006.01)

(52) U.S. Cl. .................. 706/60; 706/45; 342/195

(58) Field of Classification Search .................. 706/60, 706/47, 45, 48, 903, 913, 20; 701/223; 342/13; 244/3.11

See application file for complete search history.

(56) References Cited

U.S. PATENT DOCUMENTS 5,208,757 A * 5/1993 Appriou et al. ............. 701/223

| | | | |
|---|---|---|---|
| 6,278,401 B1 * | 8/2001 | Wigren | 342/195 |
| 6,360,193 B1 * | 3/2002 | Stoyen | 703/17 |
| 6,788,243 B2 * | 9/2004 | Lavoie | 342/13 |
| 6,845,938 B2 * | 1/2005 | Muravez | 244/3.11 |
| 6,920,439 B1 * | 7/2005 | Love | 706/20 |

OTHER PUBLICATIONS

Mulgund et al., "Air Combat Tactics Optimization Using Stochastic Genetic Algorithms", 1998 IEEE International Conference on Systems, Man and Cybernetics, Oct. 1998, vol. 4, pp. 3136-3141.*

Tambe et al., "Adaptive Agent Tracking in Real-World Multi-Agent Domains: A Preliminary Report", Working Notes For the AAA Symposium on Adaptation, 1996, pp. 93-98.*

(Continued)

Primary Examiner—Wilbert L Starks, Jr.
(74) Attorney, Agent, or Firm—Arnold & Porter LLP

(57) ABSTRACT

In an intelligent object oriented agent system, a computer implemented or user assisted method of decision making in at least one situation. The method includes the step of configuring at least one tactical agent implemented by at least one tactical agent object that includes a plurality of resources corresponding to immediate certainties, near certainties, and longer-term possibilities characterizing the at least one situation. The method also includes the steps of processing the at least one situation using the at least one tactical agent, and implementing the decision making, by at least one user or independently by at least one intelligent agent. responsive to the processing step. A computer readable tangible medium stores instructions for implementing the user assisted or computer implemented method of decision making, which instructions are executable by a computer. In a preferred embodiment, the situation comprises an aerial combat situation. or other situation with moving resources.

46 Claims, 62 Drawing Sheets

OTHER PUBLICATIONS

Abdelzaher et al., "QoS Negotiation in Real-Time Systems and Its Application to Automated Flight Control", IEEE Transactions on Computers, 2000, vol. 49, No. 11, pp. 1170-1183.*

Murphy et al., "Air-Mobile Ground Surveillance and Security System (AMGSSS) Project Summary Report", Retrieved from the Internet on Aug. 13, 2003. Retrieved from the Internet site: Http://citeseer.nj.nec.com/murphy96airmobile.html.*

Berning et al., "Adaptive Tactical Navigation Denouement", Proceedings of the IEEE 1990 International Aerospace and Electronics Conference, May 1990, vol. 1, pp. 332-337.*

Atkins et al., "Solus: An Autonomous Aircraft for Flight Control and Trajectory Planning Research", Proceedings of the America Control Conference, Jun. 1998.*

Chandler et al., "Research Issues in Autonomous Control of Tactical UAVs", Proceedings of the American Control Conference, Jun. 1998.*

Bailey et al., "Performance of Integrated Air Defense Systems", Proceedings of the 29th Conference on Decision and Control, Dec. 1990.*

Alexander et al., "A Mission Management System Architecture For Cooperating Air Vehicles", Proceedings of the IEEE 1994 National Aerospace and Electronics Conference, May 1994, vol. 1, pp. 156-163.*

Bonissone et al., "Merging Strategic and Tactical Planning in Dynamic, Uncertain Environments", Proceedings of the 8th Conference on AI for Applications, Mar. 1992, pp. 98-105.*

Stilman, "Heuristic Networks for Concurrent Pursuit-Evasion Systems", 1995 IEEE/RSJ International Conference on Intelligent Robots and Systems, Aug. 1995, vol. 1, p. 477-482.*

Nagy et al., "Intelligent Internetted Sensor Management Systems for Tactical Aircraft", Proceedings of the IEEE 1990 National Aerospace and Electronics Conference, May 1990, vol. 1, pp. 321-327.*

McCauley-Bell et al., "Uncertainty Management in Information Warfare", 1997 IEEE International Conference on Systems, Man and Cybernetics, Oct. 1997, vol. 2, pp. 1942-1947.*

Ozimina et al., "Flight Control System Design for a Small Unmanned Aircraft", Proceedings of the American Control Conferenc Jun. 1995.*

Azarewicz et al., "Template-Based Multi-agent Plan Recognition for Tactical Situation Assessment," IEEE, pp. 247-254, Mar. 1989.

Voruganti et al., "Intelligent Decision Aids for 21th C4I Architecture," IEEE, pp. 618-622, Nov. 1997.

Bowden et al. "C31 Systems Analysis Using the Distributed Interactive C31 Effectiveness Simulation," IEEE, pp. 4326-4331, Oct. 1997.

Stilman, "Dynamic Hierarchy for Miltiagent Air Combat," IEEE, pp. 83-88, Aug. 1995.

Alexander et al., "A Mission Management System Architecture for Cooperating Air Vehicles," IEEE, pp. 156-163, May 1994.

Nguyen, Thong, "A Multi-Agent Architecture for Situation Awareness," IEEE, pp. 502-507, May 1997.

Gunsch et al., "On Applying Machine Learning to Develop Air Combat Simulation Agents," IEEE, pp. 67-73, Sep. 1993.

Petterson et al., "Multi-Source Integration and Temporal Situation Assessment in Air Combat," IEEE, pp. 371-375, Feb. 1999.

Khosla et al., "Human-Centered Virtual Machine of Problem Solving Agents, Software Agents, Intelligent Agents and Objects," IEEE, pp. 312-319, Nov. 1998.

International Search Report.

* cited by examiner

| IDENTIFIER | TYPE | DESCRIPTION |
|---|---|---|
| NAME | STRING | NAME OF THE RESOURCE |
| XYZ | COORD | A TRIPLET OF FLOATING-POINT NUMBERS REPRESENTING 3-DIMENSIONAL COORDINATES OF THE RESOURCE |
| ALLEGIANCE | INTEGER | RESOURCE ALLEGIANCE: OURS, ENEMY OR UNKNOWN |
| RG | GROUP | RESOURCE GROUP TO WHICH THIS RESOURCE BELONGS (OR NULL) |
| WD | WEAPONSDIR | WEAPONS DIRECTORY TO WHICH THIS RESOURCE BELONGS |
| MUSTBEHANDLED | BOOLEAN | RESOURCE MUST BE HANDLED (EVENTUALLY) |
| CRITICAL | BOOLEAN | RESOURCE MUST BE HANDLED IMMEDIATELY |
| BEINGHANDLED | BOOLEAN | RESOURCE IS BEING HANDLED |
| COMMITTED | BOOLEAN | RESOURCE IS COMMITTED TO HANDLING |
| PENDING | BOOLEAN | RESOURCE IS PENDING COMMITMENT |
| RECALL | BOOLEAN | RESOURCE NO LONGER NEEDS TO BE HANDLED |
| DIRECTORHANDLING | DIRECTOR | WEAPONS DIRECTOR RESPONSIBLE FOR HANDLING THIS RESOURCE |
| ORDERS | ORDER | CURRENT ORDER OF THE RESOURCE |
| COMMITTEDTO | RESOURCE | REFERENCE TO A RESOURCE THIS RESOURCE IS COMMITTED TO HANDLING (OR NULL) |
| CANDIDATES | VECTOR | LIST OF CANDIDATES FOR THE RESOURCE—IF THIS IS OUR RESOURCE, THIS IS A LIST OF POTENTIAL ENEMY RESOURCES TO HANDLE, IF THIS IS AN ENEMY RESOURCE, THIS IS A LIST OF OUR RESOURCES THAT CAN POTENTIALLY HANDLE IT |

FIG. 4

| IDENTIFIER | TYPE | DESCRIPTION |
|---|---|---|
| MAXV | FLOAT | MAXIMUM POSSIBLE SPEED OF THE MOVING RESOURCE |
| CRUISEV | FLOAT | CRUISING SPEED OF THE MOVING RESOURCE |
| MINV | FLOAT | MINIMUM SPEED OF THE MOVING RESOURCE |
| CRUISEZ | FLOAT | CRUISING ALTITUDE OF THE MOVING RESOURCE |
| FUELCONSUMPTION | FLOAT | MOVING RESOURCE FUEL CONSUMPTION WHEN CRUISING |
| MAXFUEL | FLOAT | THE MAXIMUM AMOUNT OF FUEL THE MOVING RESOURCE CAN POSSESS |
| FUELREMAINING | FLOAT | THE REMAINING AMOUNT OF FUEL THE MOVING RESOURCE CAN POSSESS |
| XYP | COORD | THE PREVIOUS SET OF COORDINATES OF THE RESOURCE (FROM THE PREVIOUS TICK) |
| BASE | BASE | THE BASE THIS RESOURCE IS ASSIGNED TO (OR NULL) |
| DESTROYED | BOOLEAN | MOVING RESOURCE DESTRUCTION INDICATOR |
| ATBASE | BOOLEAN | MOVING RESOURCE LANDING AT BASE INDICATOR |
| GETTINGFUEL | BOOLEAN | MOVING RESOURCE FUELING IN PROGRESS INDICATOR |

FIG. 5

| IDENTIFIER | TYPE | DESCRIPTION |
|---|---|---|
| MAXZ | FLOAT | MAXIMUM POSSIBLE ALTITUDE FOR THIS PLANE |
| MAXL | FLOAT | MAXIMUM POSSIBLE TRAVEL RANGE FOR THIS PLANE |
| HIT | BOOLEAN | A PLANE HAS BEEN HIT (BY A MISSILE) INDICATOR |
| MECHANICALPROBLEM | BOOLEAN | A PLANE HAS DEVELOPED A MECHANICAL PROBLEM |

FIG. 18

| IDENTIFIER | TYPE | DESCRIPTION |
|---|---|---|
| WEAPONS | WEAPONS | REFERENCE TO A FIGHTER WEAPONS DESCRIPTOR |
| NUMATTACKS | INTEGER | NUMBER OF ATTACKS THIS FIGHTER HAS PERFORMED |

FIG. 19

| IDENTIFIER | TYPE | DESCRIPTION |
|---|---|---|
| LANE | LANE | THE LANE ASSIGNED TO THIS WEAPONS DIRECTOR |
| CAPS | VECTOR | THE LIST OF COMBAT AIR PATROL (CAP) ZONES ASSIGNED TO THIS WEAPONS DIRECTOR |
| WD | WEAPONSDIR | THE WEAPONS DIRECTORY THIS WEAPONS DIRECTOR IS RESPONSIBLE FOR MANAGING |
| LEVEL | INTEGER | RESPONSIBILITY LEVEL OF THE WEAPONS DIRECTOR: 0-UNKNOWN 1-NOVICE 2-JOURNEYMAN 3-EXPERT 4-MASTER |
| ALLEGIANCE | INTEGER | ALLEGIANCE OF THE WEAPONS DIRECTOR (UNKNOWN, OURS, ENEMY) |
| SENIOR | SENIOR | SENIOR DIRECTOR TO WHOM THIS WEAPONS DIRECTOR REPORTS |
| HANDLE | VECTOR | LIST OF ENEMY RESOURCES THIS WEAPONS DIRECTOR NEEDS TO HANDLE |
| HUMAN | BOOLEAN | WEAPONS DIRECTOR IS OPERATING IN MANUAL MODE (AS OPPOSED TO AGENT-AUTOMATED) |
| RECOMMENDATIONS | VECTOR | LIST OF RECOMMENDATIONS FROM THE AGENT THE WEAPONS DIRECTOR RECEIVES AT EVERY TICK OF THE SIMULATION |
| RECOMMENDATIONS FROMHUMAN | VECTOR | LIST OF MANUALLY-ENTERED RECOMMENDATION/ORDER PAIRS FROM A HUMAN USER PASSED TO THIS WEAPONS DIRECTOR REPRESENTATION |
| EVENTS | VECTOR | LIST OF EVENTS THAT OCCURRED DURING A SIMULATION TICK WHICH THE AGENT CONSIDERS TO BE OF INTEREST TO THIS WEAPONS DIRECTOR |
| RATIONALE | VECTOR | LIST OF TEXTUAL ENTRIES, EACH CORRESPONDING TO A RECOMMENDATION IN THE "RECOMMENDATIONS" LIST, COMPRISING THE AGENT'S EXPLANATIONS OF REASONS FOR EACH RECOMMENDATION |

FIG. 26

| IDENTIFIER | TYPE | DESCRIPTION |
| --- | --- | --- |
| NAME | STRING | RECOMMENDATION IDENTIFIER |
| TOWHOM | DIRECTOR | REFERENCE TO THE WEAPONS DIRECTOR TO WHOM THE RECOMMENDATION IS MADE |
| R | VECTOR | LIST OF RESOURCES AFFECTED BY THIS RECOMMENDATION |
| ORDER | ORDER | ORDERS FOR RESOURCES AFFECTED BY THIS RECOMMENDATION |
| DESC | STRING | VERBAL DESCRIPTION OF THE RECOMMENDATION |
| ACCEPTED | BOOLEAN | INDICATOR OF ACCEPTANCE BY THE DIRECTOR (OR THE AGENT ON BEHALF OF THE DIRECTOR IF DIRECTOR IS AUTOMATED BY THE AGENT) |
| TRANSFER | BOOLEAN | RECOMMENDATION IS VALID ONLY AFTER THE SPECIFIED RESOURCES HAVE BEEN TRANSFERRED TO THIS WEAPONS DIRECTOR WITH THE APPROVAL FROM THE SENIOR DIRECTOR |

FIG. 30

| ACTION | RESULT |
|---|---|
| CLICK ON OUR MOVING RESOURCE AND DRAG TO THE SAME RESOURCE | SPLIT--IF OUR MOVING RESOURCE IS A GROUP, SPLIT THE GROUP (ADDITIONAL DISPLAY WILL PROVIDE A SELECTION OF MOVING RESOURCES TO BE SPLIT FORM THIS GROUP) |
| CLICK ON OUR MOVING RESOURCE AND DRAG TO OUR GROUP OF MOVING RESOURCES | JOIN--HAVE OUR MOVING RESOURCE JOIN OUR GROUP |
| CLICK ON OUR MOVING RESOURCE AND DRAG TO OUR TANKER | TANK--HAVE OUR MOVING RESOURCE PROCEED TO THIS TANKER FOR FUELING |
| CLICK ON OUR MOVING RESOURCE AND DRAG TO OUR BASE | RTB--HAVE OUR MOVING RESOURCE PROCEED TO AND LAND AT THIS BASE |
| CLICK ON OUR MOVING RESOURCE AND DRAG TO ENEMY RESOURCE | TARGET--HAVE OUR MOVING RESOURCE TARGET THE ENEMY RESOURCE |
| CLICK ON OUR MOVING RESOURCE AND DRAG TO A CAP AREA | CAP--HAVE OUR MOVING RESOURCE PERFORM COMBAT AIR PATROL IN THE SPECIFIED AREA |
| CLICK ON OUR MOVING RESOURCE AND DRAG TO A PARTICULAR POINT IN THE PRIMARY DISPLAY AREA NOT OCCUPIED BY ANY OTHER RESOURCE OR A CAP AREA | GO--HAVE OUR MOVING RESOURCE PROCEED TO THE SELECTED POINT |

FIG. 46

| RECOMMENDATION TYPE | ACCEPTED COUNT | CURRENT RESOURCE ORDER (ACC.) | RESOURCE LOCATION (ACC.) | NOT ACCEPTED COUNT | CURRENT RESOURCE ORDER (NOT ACC.) | RESOURCE LOCATION (NOT ACC.) |
|---|---|---|---|---|---|---|
| TARGET | 17 | 5- CAP 12- GO | 5- CAP1 | 5 | 5- CAP | 5- CAP2 |
| RTB | 5 | 5- CAP | 5- CAP1 | 4 | 4- CAP | 4- CAP2 |
| TANK | 11 | 4- CAP 7- GO | 4- CAP1 | 0 | | |
| JOIN | 2 | 2- GO | | 0 | | |
| SPLIT | 4 | 4- GO | | 0 | | |
| GO | 0 | | | 4 | 4- TANK | |
| CAP | 7 | 7- GO | | 1 | 1- TARGET | |

FIG. 55

METHOD AND SYSTEM FOR INTELLIGENT AGENT DECISION MAKING FOR TACTICAL AERIAL WARFARE

RELATED APPLICATIONS

This application is a Continuation of U.S. patent application Ser. No. 09/277,776, filed on Mar. 29, 1999, now U.S. Pat. No. 6,360,193 which in turn claims priority from U.S. Provisional application No. 60/100,863, filed on Sep. 17, 1998, all of which are incorporated herein by reference.

FIELD OF THE INVENTION

The present invention relates to a novel method and system that uses intelligent agent for decision making, for example, during tactical aerial defensive warfare, or other real-time decision making processes.

PRIOR ART

Presently, intelligent agent functions are available in different areas, mostly related to desktop/office system functionality—e.g., automatic spelling correctors, automatic email address selectors, etc. - - - Presently, there is no tactical intelligent agent for decision making in the area of air combat. Further, the intelligent agents that are present in other areas do not collaborate among themselves either in a homogeneous (i.e., among intelligent agents of the same type) or heterogeneous (i.e., among intelligent agents of different types operating in a common problem space) environment.

Further, the intelligent agents that are present in other areas do not collaborate with human users. Existing intelligent agents either act in an isolated fashion, or get directions from the user and follow these directions. Such intelligent agents collect and process information from the "environment" and report back to the user. None of the existing intelligent agents accept realtime corrections to the "environment" (as it perceives it) from the user (either in delayed or in real-time fashion).

In addition, no intelligent agent today takes into consideration such factors as mental and physical state of a human user, including user degree of fatigue, stress, etc.

SUMMARY OF THE INVENTION

In the described AWACS Trainer Software (ATS), which is one exemplary application of the present invention, there is a tactical intelligent agent for decision making in the area of air combat. Other situations may also be used with the present invention as described below in more detail. The agent is tactical because it considers not only immediate certainties and near certainties (e.g., if a hostile fighter is not shot at it will shoot at us) but also longer-term possibilities (e.g., if the bulk of our fighters are committed early, they may not be available should an enemy strike force appear in the future). The agent is intelligent because it exhibits autonomous behavior and engages in human-like decision process. The agent assists in decision making in the area of air combat because the agent gives explicit advice to human AWACS Weapons Directors (WD) whose job it is to coordinate air combat. The agent is also capable of making independent decisions in the area of air combat, replacing a human WD.

The described ATS employs groups of collaborating intelligent agents for decision making. The agents are collaborating because not every agent has all the information regarding the problem at hand, and because global decisions are made that affect all agents and humans, on the basis of agents exchanging, debating and discussing information, and then making overall decisions. Thus for instance, agents assisting individual WDs exchange threat information and then coordinate their recommendations, such as what fighters to commit to what enemy assets, without resource collisions. That is, an agent A will not recommend to its WD A to borrow a fighter pair P from another WD (WD B) while WD B's agent (agent B) recommends to WD B to use the same fighter pair P to target another threat.

The described ATS supports collaboration among (a heterogeneous set of) intelligent agents and a combination of (a heterogeneous set of) intelligent agents and humans. The set of agents is heterogeneous because it includes role-playing agents (e.g., an agent that plays a WD) and adviser agents (e.g., an agent that recommends a particular fighter allocation to a WD) (as well as other agents). The set of humans is heterogeneous because it includes WDs and Senior WDs (different roles, a.k.a. SDs). Agents and humans collaborate because agents and humans jointly perform air combat tasks.

Existing intelligent agents get directions from the user and follow these directions. They collect and process information from the "environment" and report back to the user. None of the existing intelligent agents accept real-time corrections to the "environment" (as it perceives it) from the user (either in delayed or in real-time fashion).

The described ATS provides a feedback loop between an intelligent agent and a user. Agents and users (humans or other agents) exchange information throughout ATS running. As changes occur (e.g., new planes appear), agents and users exchange this information and agents, naturally adjust (as do the users). For instance, as a pair of fighters becomes available, an agent may recommend to the human WD how to assign this pair. WD's reaction results in the agent learning what happened and possibly how to (better) advise the WD in the future. In particular, the agent may also change its perception of the environment. For instance, a repeated rejection of a particular type of agent recommendation may result in the agent re-prioritizing objects and actions it perceives.

The described ATS provides intelligent agents representing multiple users (e.g., impersonating or assisting WDs, SDs, instructors). These agents collaborate, as already illustrated. However, the agents do not all perceive the environment the same way. For instance, an agent representing WD A may only be able to probe the status of the planes WD A controls. An agent representing another WD B may only be able to probe the status of the planes controlled by WD B. An agent representing an SD is able to probe the status of a plane controlled by any WD that reports to the SD. A strike WD may command a stealth bomber which does not show on AWACS radar, and thus even its position and movement are not visible to the other WDs.

The described ATS intelligent agents learn over time by accumulating knowledge about user' behavior, habits and psychological profiles. An agent may observe that a WD it advises tends to always accept recommendations to target advancing enemy with CAP'ed (engaged in Combat Air Patrol assignment) fighters but never with fighters on their way to tank (even though the agent may consider these fighters adequately fueled and otherwise ready for another dog-fight). The agent may then over time learn not to recommend the WD assign fighters on their way to tank to other tasks.

The described ATS intelligent agent may observe that a WD tends to press mouse buttons more times than it needed, to accept a recommendation. This conclusion may lead the agent to believe that a WD is overly stressed out and tired. The agent may then recommend to the SD's advising agent to recommend that SD consider rotating this WD out. Perhaps as a compromise, the two agents and the two humans (the WD and the SD) may then decide that the best course of action is for the WD to continue for a while but that no fighters be borrowed for other tasks from this WD, and that after the next air combat engagement, the WD be rotated out anyway.

Since multiple intelligent agents and humans may be involved in the ATS decision making process, it is not surprising that they may differ in opinion as to what constitutes the best course of action. The reasons for the differences include the following: non-uniform availability of information (e.g., a particular agent may be privy to detailed information on the planes that belong to its WD only), strategy preferences (e.g., a particular WD may be very risk-averse compared to others), and one group's considerations vs. another group's considerations (e.g., a WD (and its agent) may not wish to loose a pair of fighters; on the other hand, from the point of view of the entire WD team, it may be acceptable to send that same pair of fighters to divert enemy air defenses (at a great risk to themselves) away from a strike package). Given the differences in opinion, the ATS agents exchange opinions and debate options, among themselves and with humans. Standard resolution protocols may be used to ensure that an overall decision is reached after a final amount of such exchanges. Examples include standard neural networks, standard ether net collission resolution, standard packet collision resolution, standard two-phase commit in databases, and other standard negotiating techniques. Also, in an operational or training setting, the SD (or other human in charge) can ultimately force a decision, even in disagreement with agents (or humans).

According to one embodiment of the invention, an intelligent object oriented agent system, a computer implemented or user assisted method of decision making in at least one situation. The method includes the step of configuring at least one tactical agent implemented by at least one tactical agent object that includes a plurality of resources corresponding to immediate certainties, near certainties, and longer-term possibilities characterizing the at least one situation. The method also includes the steps of processing the at least one situation using the at least one tactical agent, and implementing the decision making, by at least one user or independently by at least one intelligent agent. responsive to the processing step.

A computer readable tangible medium stores instructions for implementing the user assisted or computer implemented method of decision making, which instructions are executable by a computer.

In another embodiment of the present invention, an intelligent agent system implements, a computer implemented or user assisted method of decision making in at least one aerial combat situation. The functions of the system include configuring, using a computer, at least one tactical agent that includes data corresponding to immediate certainties, near certainties, and longer-term possibilities characterizing the at least one aerial combat situation. The functions also include processing, using the computer, the at least one aerial combat situation using the at least one tactical agent, and implementing the decision making, by at least one user or independently by at least one intelligent agent, responsive to said processing step.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

Summary of Claims

BRIEF DESCRIPTION OF THE DRAWINGS

The detailed description includes preferred embodiments of the invention, together with advantages and features, by way of example with reference to the following drawings.

FIG. 4 shows a representation of the Resource class objects.

FIG. 5 shows a representation of the MovingResource class objects.

FIG. 18 shows a representation of the Plane class objects.

FIG. 19 shows a representation of the Fighter class objects.

FIG. 26 shows a representation of the Director class objects.

FIG. 30 shows a representation for the Recommendation class objects.

FIG. 46 shows possible user actions in the primary graphical display area and their resulting effects these actions elicit.

FIG. 55 shows a data structure for accumulation of user behavioral information.

Notations and Nomenclature

Figure 1:
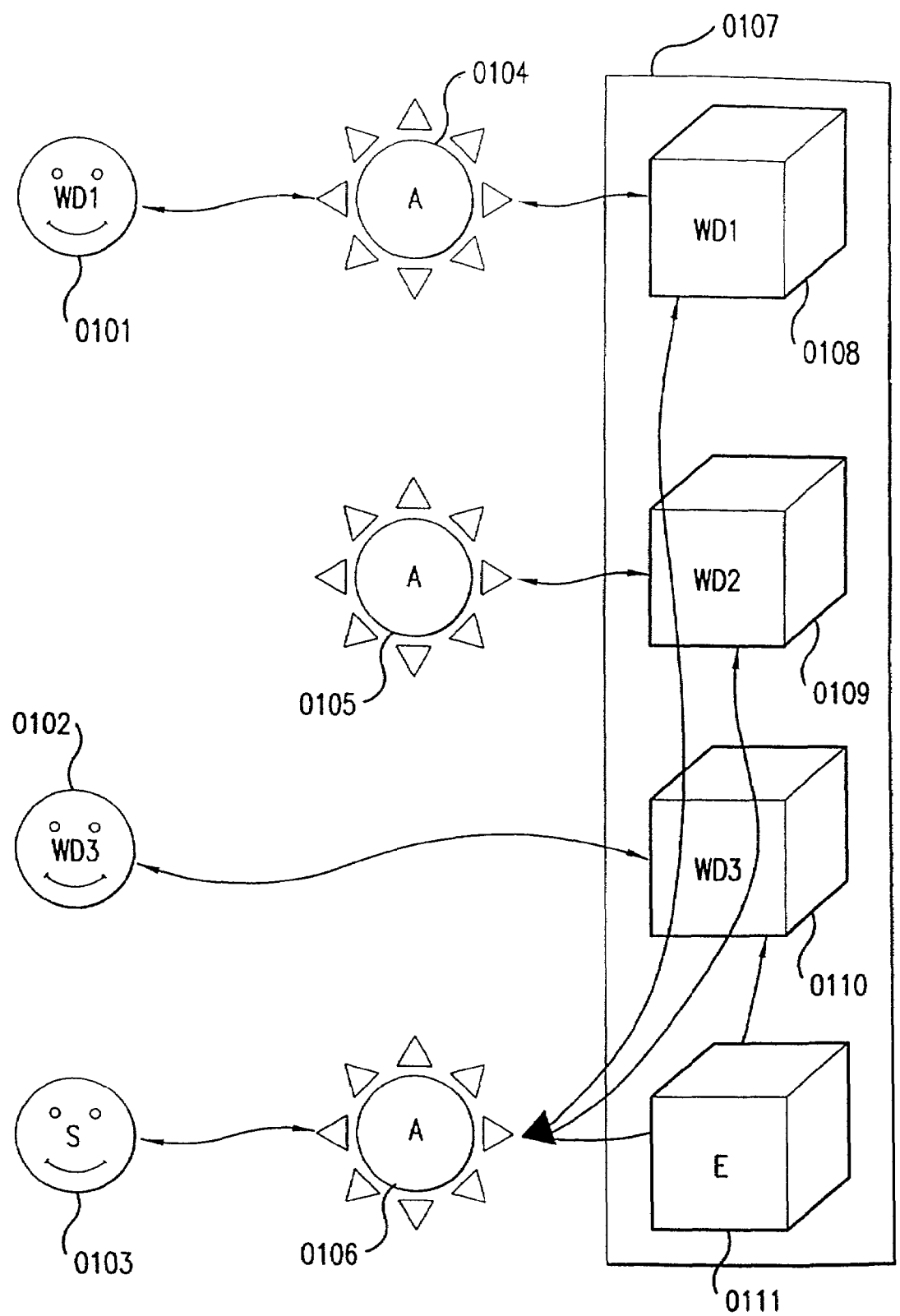
FIG. 1 is an overview of the system, showing important components.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE INVENTION

Glossary

The following terminology is used throughout the patent embodiment:

Tick—a single iteration of the simulation cycle.

Agent—a program which automates one or more user actions or provides real-time advice to one or more users.

Weapons director—a person in charge of a group of planes. A weapons director can give orders to plane pilots and receive reports from them.

Senior director—a person in charge of a group of weapons directors. A senior director can give orders to weapons directors, receive reports from them, and may even decide to take over the resources of a particular weapons director and act in that weapons director's stead. Weapons directory—a collection of resources a weapons director is responsible for managing.

CAP—combat air patrol.

CAP area—are patrolled by a CAP.

RTB—return to base.

TANK—refuel at a tanker.

BASIC EMBODIMENT

Overview

FIG. 1 presents an overview of the usage. Three users are present: weapons director 1 (WD1) 0101, weapons director 3 (WD3) 0102, and senior director 0103. Weapons director 1 is using the intelligent agent 0104. Weapons director 3 is acting without the involvement of an agent. Senior director is using the agent 6006. The simulation 0107 contains a number of weapons directories. Weapons director 1 is responsible for resources 0108 in the weapons directory 1, weapons director 3 is responsible for resources 0110 in the weapons directory 3. Weapons directory 2 is responsible for resources 0109 contained therein which is also present does not have a corresponding user or weapons director; weapons directory 2 is automated solely by the intelligent agent 0105. The enemy weapons directory (E) 60111-? is also automated via intelligent agent 0106.

Weapons director 1, in the course of the simulation, gets advice from the intelligent agent 0104, which is monitoring the events as they occur and providing advice in the form of recommendations to the weapons director 1 in real-time. Weapons director 1 may or may not follow direction(s). At each tick of the simulation, a set of all the recommendations from the agent 0104 is presented to weapons director 1, and weapons director 1 may accept or ignore the presented recommendations. Accepting or ignoring recommendations from the agent, does not prevent weapons director 1 from entering his own orders to the resources this weapons director is responsible for managing. Should an order be entered by weapons director 1, it becomes known to the intelligent agent helping this weapons director. On the other hand, weapons director 3 is making decisions on his own, without the assistance of the intelligent agent. Of course, weapons director 3 may alternatively have an associated intelligent agent.

It should be noted that three users are shown only as an example. An arbitrary number of weapons directors can be supported. Moreover, an arbitrary hierarchy (of command) can also be supported, including strict hierarchies (for each user, at most a single superior with an arbitrary number of subordinates) or multi-hierarchies, meaning an arbitrary number of superiors on the same level of authority that must negotiate with each other (each with an arbitrary number of subordinates) for each user.

Simulation

The simulation is driven by a standard simulator object. The simulator object is responsible for issuing time ticks, maintaining the lists of simulated resources, and invoking the objects comprising representations of simulated resources at every tick (iteration through the simulation cycle) of the simulation to allow these objects to simulate the activities of the resources they represent.

Figure 2:
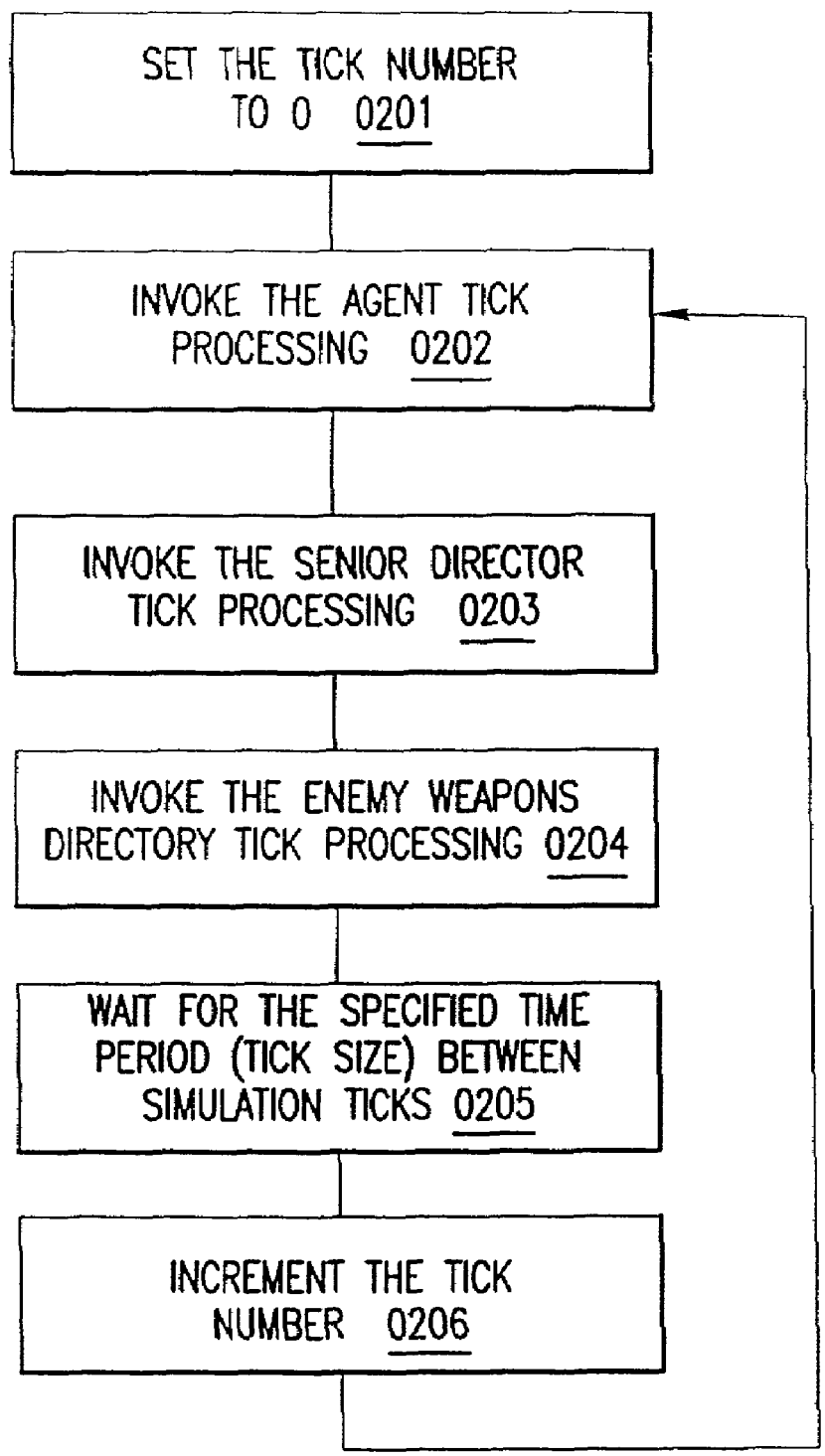
FIG. 2 shows the simulation cycle of the simulator.

FIG. 2 describes the simulation cycle. Prior to entering the simulation cycle, the simulator initializes the simulation tick number to 0 at 0201. The simulator then enters the simulation cycle, performing the following sequential, non-sequential or sequence independent steps. The simulator invokes the agent tick processing 0202. The simulator invokes the senior director tick processing 0203. The enemy weapons directory tick processing is invoked 0204. The simulation waits for the specified period of time (or tick size) to provide verisimilitude to the simulation 0205. Upon expiration of the wait period, the simulator increments the tick number 0206 and repeats the simulation cycle at 0202.

Object Model

Figure 3:
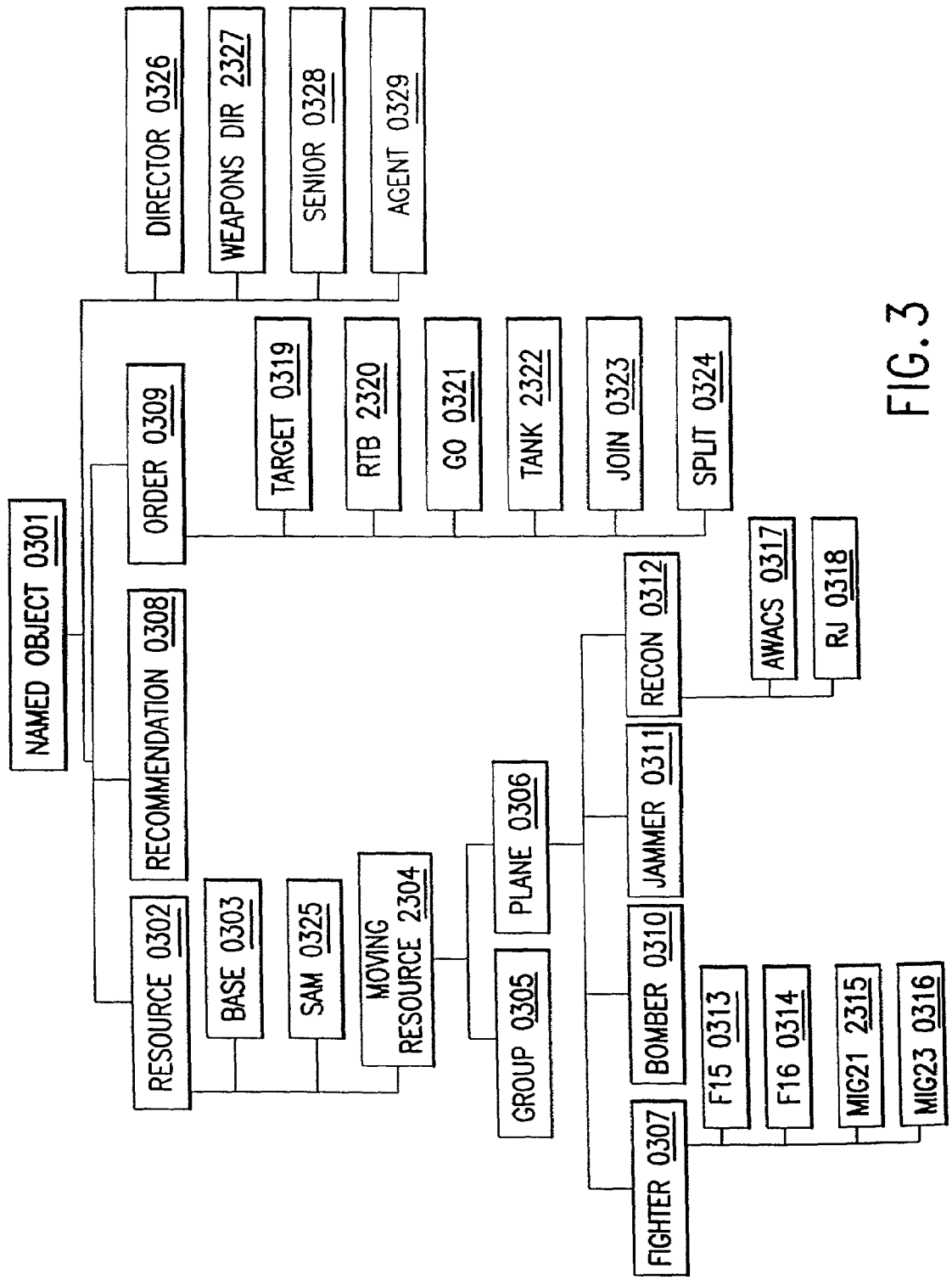
FIG. 3 shows the object model employed in the preferred embodiment.

FIG. 3 describes the object model. The base class of the object model is NamedObject 0301. A NamedObject is an object with a name, represented by a String. The Resource class 0302 derives from a NamedObject and is the class used to represent the common properties of resources. Specific classes deriving from the Resource class are Base 0303, representing an air-base, and SAM 325, representing a SAM battery. A MovingResource class 0304 derives from the Resource class and embodies the common properties of all moving resources.

The Group class 0305 represents a group of moving resources and derives from the MovingResource class. The Plane class 0306 also derives from the MovingResource class and embodies the properties common for all airplanes. The classes Fighter 0307, Bomber 0310, Jammer 0311, and Recon 0312 are subclasses of the Plane class and represents properties common for the corresponding types of airplanes. Specific models of fighters included in this definition include, for example, F15 0313, F16 0314, MIG21 0315, and MIG23 0315. Persons skilled in the art will understand that specific airplane model classes represent a subset of all the possible existing airplane models selected for the purposes of this embodiment, but this embodiment is in no way limited by this selection. Similarly, two specific types of reconnaissance aircraft are included: AWACS 0317 and RJ 0318. Other subclasses of NamedObject include Recommendation 0308, representing a recommendation from the agent, and Order 0309, serving as a superclass for the specific orders that can be given to aircraft pilots: TARGET 0319, RTB 0320 (return to base), GO 0321, TANK 0322, JOIN 0323 (a group of resources), and SPLIT 0324 (from a group). Other classes derived from the NamedObject are Director 0326 (weapons director), WeaponsDir 0327 (weapons directory), Senior 0328 (senior director), and Agent 0329.

For the purposes of this embodiment, the object model is restricted to aircraft and ground bases and SAM batteries. Other objects can be included in an object model, yielding a more complete real-life resource coverage, such as ships, submarines, satellites, ground vehicles, and human troops. In addition, objects from other areas of application, such as manufacturing and industrial automation (robots, tooling stations, parts, consumables, etc.), telecommunications (network nodes, packets, routers, etc.), energy (power plants, power lines, concentrators, energy flows, etc.), and others may be used in the present invention.

Resource

FIG. 4 shows the representation of a resource class. Each resource has a name, which is used as a resource identifier and as a search argument while maintaining lists of resources in weapons directories. Each resource has a set of coordinates, which is a triplet of floating point numbers, the first representing the position of the resource along the X axle, the second representing the position of the resource along the Y axle, and the third representing the resource altitude. Any number of dimensions or axles may also be used. For ground resources, the third value in the triplet is always 0. Each resource has an integer allegiance value, indicating whether it is our resource (value of 1), enemy resource (value of 2), or unknown (value of 0). Other values may also be used for some or different indicator and/or meaning.

Each resource that belongs to a group of resources, has a reference, RG, to a group to which it belongs. This reference is null if the resource is not a part of a group. Each resource has a reference, WD, to a weapons directory to which it belongs. An enemy resource may have a reference, directorHandling, to a weapons director who is responsible for handling it. If a resource has been given an order, a resource includes a reference, and orders to the Order object.

If a resource is being considered by the Agent resource assignment algorithm, the resource includes a reference, and candidates to a Vector of candidate resources.—if this is our resource, this vector is a list of potential enemy resources to handle, if this is an enemy resource, this vector is a list of our resources that can potentially handle this enemy resource. If a resource has been committed to handling or being handled (depending on its allegiance), the resource includes a committedTo reference to the resource it is handling or to the resource that is handling it.

Each resource has a number of Boolean values which are used by the resource allocation and assignment algorithms to indicate resource status, including:

mustBeHandled—(an enemy) resource must be handled (by us), however, the time of the handling has not yet been determined critical—resource must be handled immediately, delaying handling of this enemy resource may be detrimental to the fulfillment of our tactical or strategic goals beinghandled—(an enemy) resource is being handled committed—resource is committed to handling, i.e., if this is our resource, a target has been assigned for it, if this is an enemy resource, it has been targeted pending—resource is pending commitment recall—resource no longer needs to be handled Although for the purposes of this embodiment only three resource allegiance values are considered—"ours", "enemy", and "unknown"—persons skilled in the art will understand that other types of resource allegiance are possible, such as "neutral", "medical", "civilian", "diplomat", "UN", "ally", and others applicable to the specific application context.

Depending on a particular application, other attributes may be included that would better define the Resource class to the needs of a particular field.

The simulation tick processing by a resource consists of or includes two steps:

The "pending" indicator is turned off for this resource.

If the "order" reference of the resource is not null (indicating that the resource has an order to perform), the order is processed by this resource.

The described object model is specific to the context of air combat. However, a person skilled in the art will realize that the object model may be augmented or replaced with another object model, e.g., with Navy ships, airplanes, carriers, submarines, etc., with satellites, with ground troupes, trains, tanks, etc., or with objects totally unrelated to military users—e.g., network packets, ground transportation fleet (e.g., taxis and/or trucks), details on a conveyor belt, and so on. Various different types of resource objects may also be used.

Moving Resource

Figure 6:
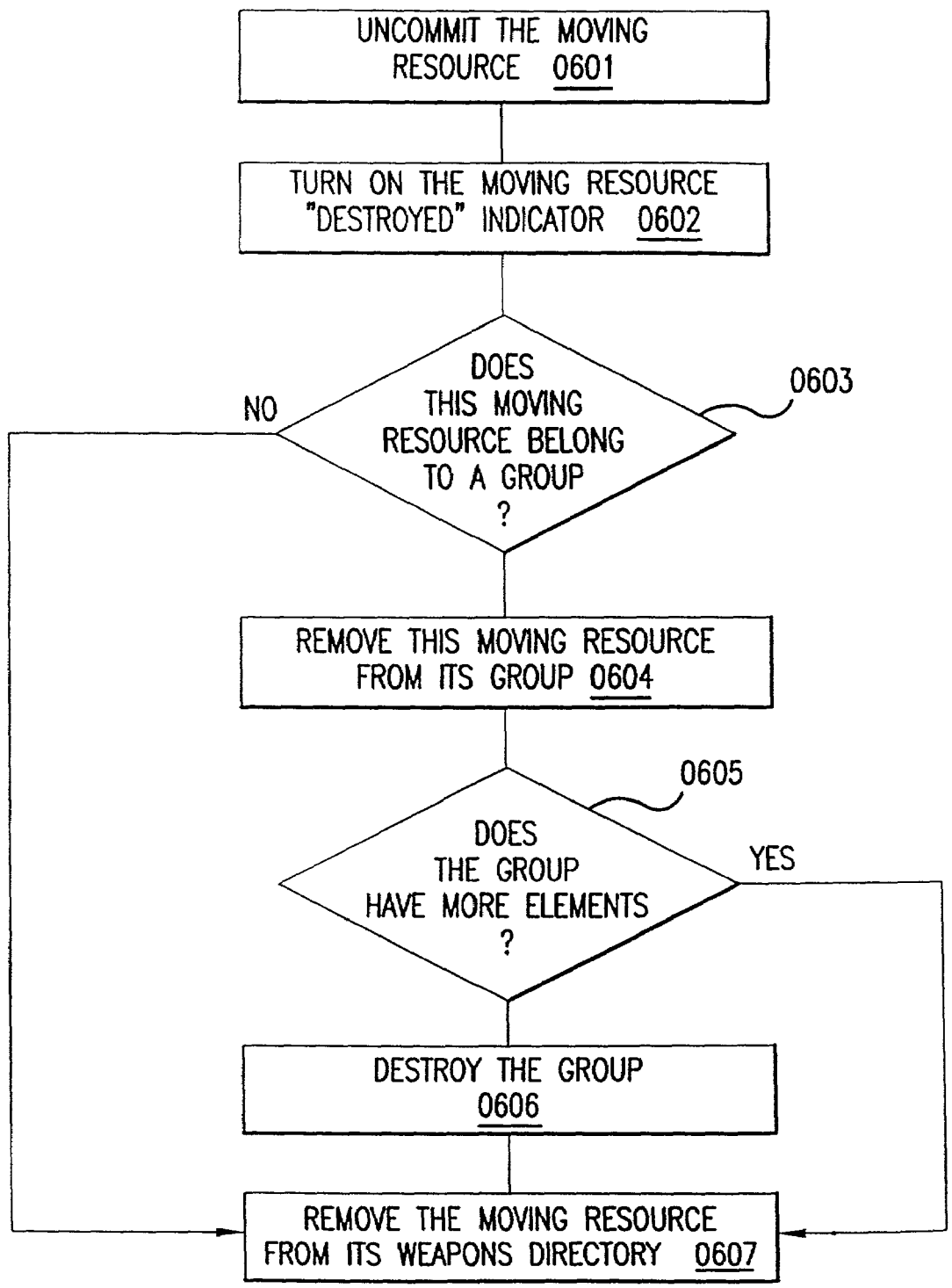
FIG. 6 shows the process of destroying a MovingResource class object.

The moving resource (MovingResource) class inherits from the Resource class, and adds the information that differentiates a moving resource from a stationary one. FIG. 5 shows the representation of the MovingResource class. Each moving resource has a maximum velocity (MaxV), cruising velocity (CruiseV), minimum velocity (MinV), and cruising altitude (CruiseZ). In addition, each moving resource has a value of fuel consumption at cruising velocity and altitude (fuelConsumption), a maximum amount of fuel a moving resource can carry (maxFuel), and the actual remaining amount of fuel (fuelRemaining). Each moving resource includes a previous set of coordinates (XYP), which is the value of the resource coordinate triplet from the previous simulation tick or time interval. Retaining the previous coordinates value permits the Agent to determine the resource movement direction and velocity at every tick of the simulation. Each moving resource may be assigned to a particular base, and it may include a reference (base) to a base this moving resource is assigned to. Each moving resource includes a number of additional Boolean indicators:

Destroyed—is set if this moving resource is destroyed,

AtBase—is set if this moving resource has landed at a base,

GettingFuel—is set if this moving resource is in process of getting fuel from a tanker As a result of a resource engagement (e.g., when an attack of a resource is performed), a moving resource may be destroyed. FIG. 6 describes the process of destroying a moving resource. The uncommit process is invoked for this moving resource 0601 to ensure that any active or pending commitments are cleared. Then, the "destroyed" indicator is set for this moving resource 0602. If this moving resource belongs to a group 0603, the moving resource is removed from its group's list of resources 0604. If the group to which this moving resource belonged has no more entries in its resource list 0605, the group is also destroyed 0606. To complete the process, the moving resource is removed from its weapons directory 0607.

Figure 7:
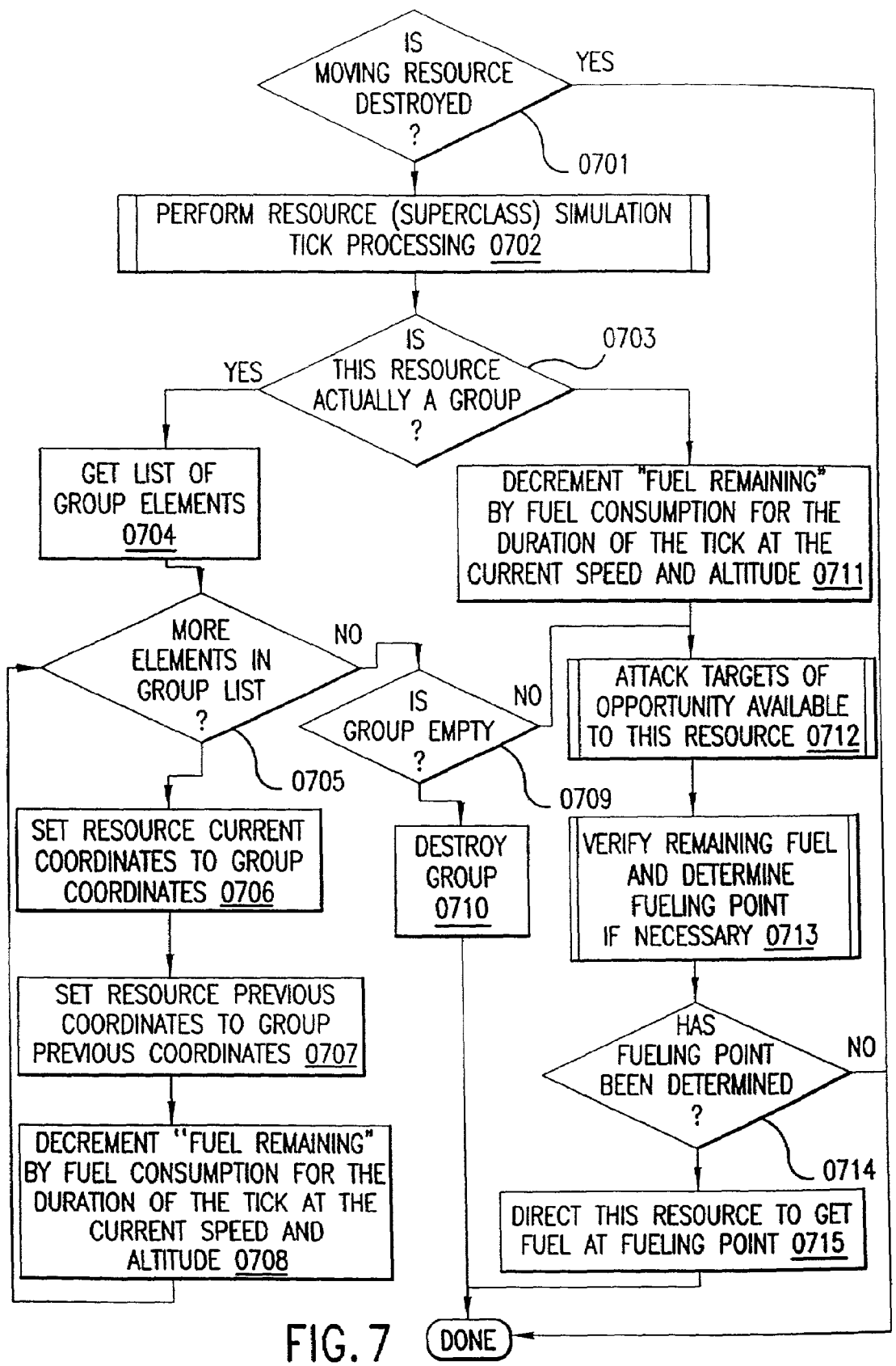
FIG. 7 shows the simulation tick processing of a MovingResource class object.

FIG. 7 shows the processing at each tick of the simulation by each moving resource. If the "destroyed" indicator of the moving resource is set 0701, indicating that this moving resource has been destroyed, nothing further is done and processing is terminated. The simulation tick processing of the MovingResource superclass (i.e., Resource) is then invoked 0702. If this a moving resource is indeed a single resource and not a group of moving resources 0703, the moving resource's "fuelRemaining" value is decreased by this moving resource's fuel consumption for the duration of the tick of the simulation at the current moving resource's velocity and altitude 0711. Then, the attack of available targets of opportunity is performed by this moving resource 0712. The remaining amount of fuel "fuelRemaining" of this moving resource is verified, and if a need to obtain additional fuel for this moving resource is determined, the appropriate fueling point is determined 0713.

If a fueling point has been determined for this moving resource 0714, indicating that the moving resource's "fuelRemaining" amount of remaining fuel is approaching its low mark, this moving resource is directed to get fuel at the previously determined fueling point 0715. If this moving resource is actually a group of moving resources 0703, the list of moving resources comprising this group of moving resources is obtained 0704.

While there are unprocessed moving resources in the previously obtained list of moving resources comprising this group of moving resources 0705, for each moving resource in the list, the following processing is performed. The moving resource's current coordinates "XYZ" are set to be the same as the coordinates "XYZ" of the group of moving resources to which this moving resource belongs 0706. The moving resource's previous coordinates "XYP" are set to the previous coordinates "XYP" of the group of moving resources to which this moving resource belongs 0707. Then, the moving resource's "fuelRemaining" value is decreased by this moving resource's fuel consumption for the duration of the tick of the simulation at the current moving resource's velocity and altitude 0708. If this group of moving resources has a null or empty list of moving resources comprising this group of moving resources 0709, this group of moving resources is destroyed 0710, otherwise steps 0712-0715 are performed for this group of moving resources.

Figure 8:
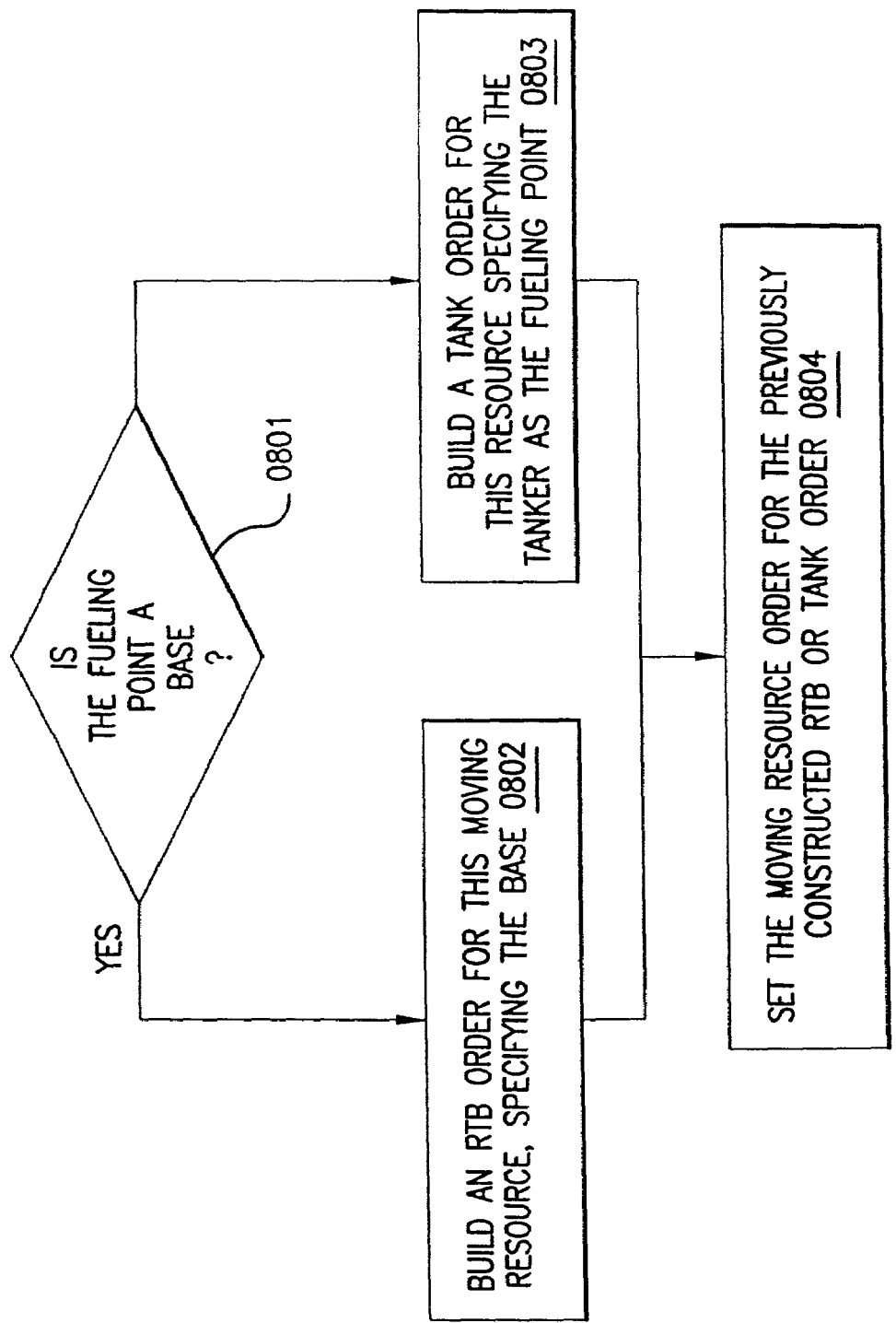
FIG. 8 shows the process of directing a MovingResource class object to obtain fuel at a specified fueling point.

FIG. 8 describes the process of directing a moving resource to obtain fuel at a specified fueling point. If the specified fueling point is a base 0801, a Return-to-Base (RTB) order is constructed for this moving resource, specifying this base as the base to return to 0802. Otherwise, if the fueling point is not a base 0801, it is a tanker, and a TANK order is constructed for this moving resource, specifying this tanker as the fueling point 0803. The moving resource's "order" reference is then set to the previously constructed RTB or TANK order 0804.

Figure 9:
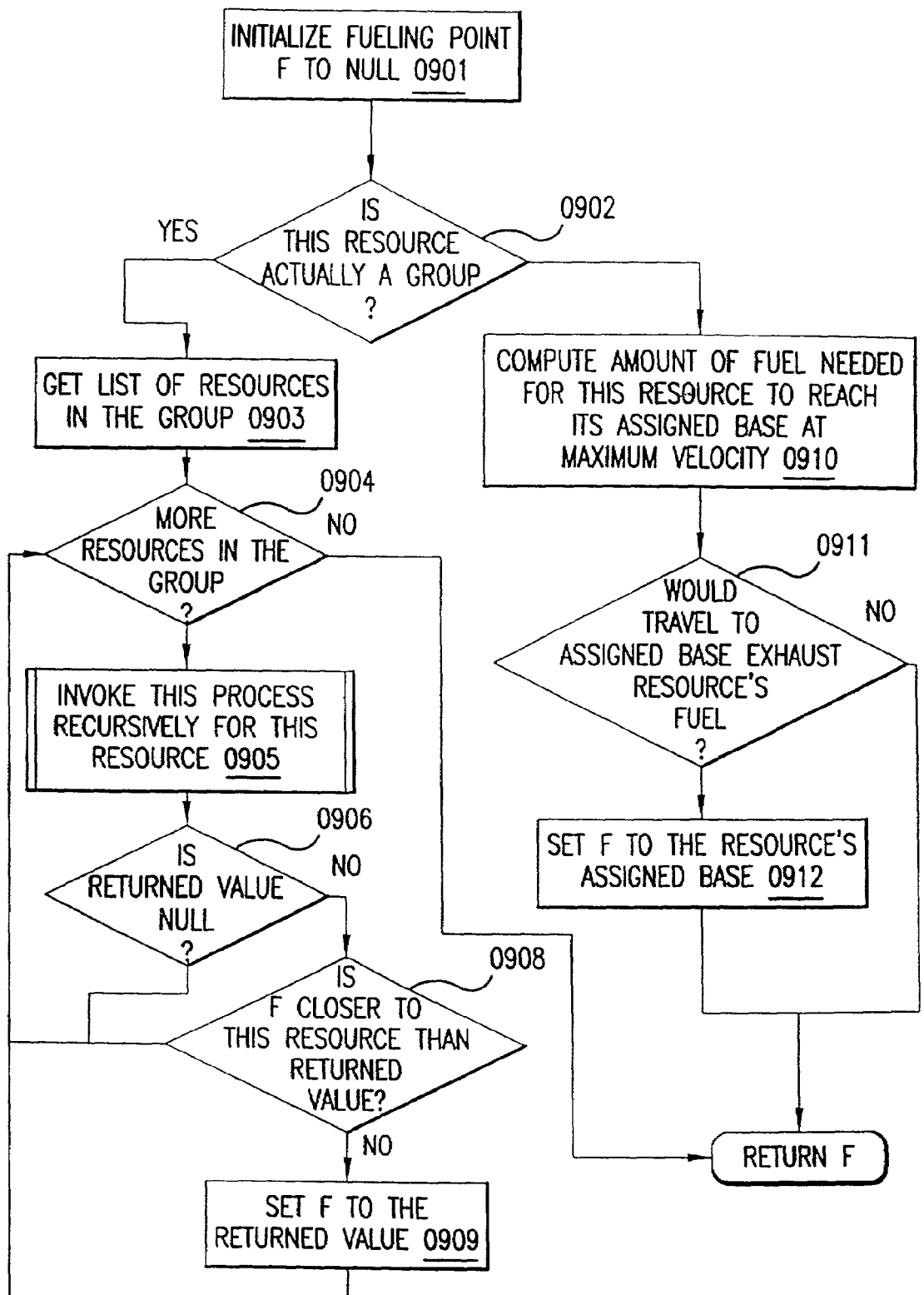
FIG. 9 shows the process of fuel verification for a MovingResource class object.

FIG. 9 describes the process of fuel verification for a moving resource. First, the fueling point is initialized to null 0901. If this moving resource is indeed a single moving resource and not a group of moving resources 0902, the amount of fuel required for this moving resource to reach its assigned base at maximum velocity is computed 0910. If travel to this moving resource's assigned base would deplete the amount of fuel of this resource to be equal to or less than the minimum amount of fuel tolerable for this resource 0911, the fueling point is set to the resource's assigned base 0912. The resulting fueling point (null or non-null) is then returned to the invoker of this method. If this moving resource is actually a group of moving resources 0902, the list of moving resources comprising this group of moving resources is obtained 0903.

While there are unprocessed moving resources in the list of moving resources comprising this group of moving resources 0904, for each moving resource in the list, the following processing is performed. Steps 0910-0912 are invoked recursively for this moving resource 0905. If a nonnull value has been returned 0906, if this fueling point is closer to this moving resource than the fueling point returned by the previous recursive invocation 0908, the fueling point is set to be the fueling point returned by the previous recursive invocation 0909. Upon completion of the iterations through the list of moving resources comprising this resource group, the fueling point value (null or non-null) is returned to the invoker of this method.

Figure 10:
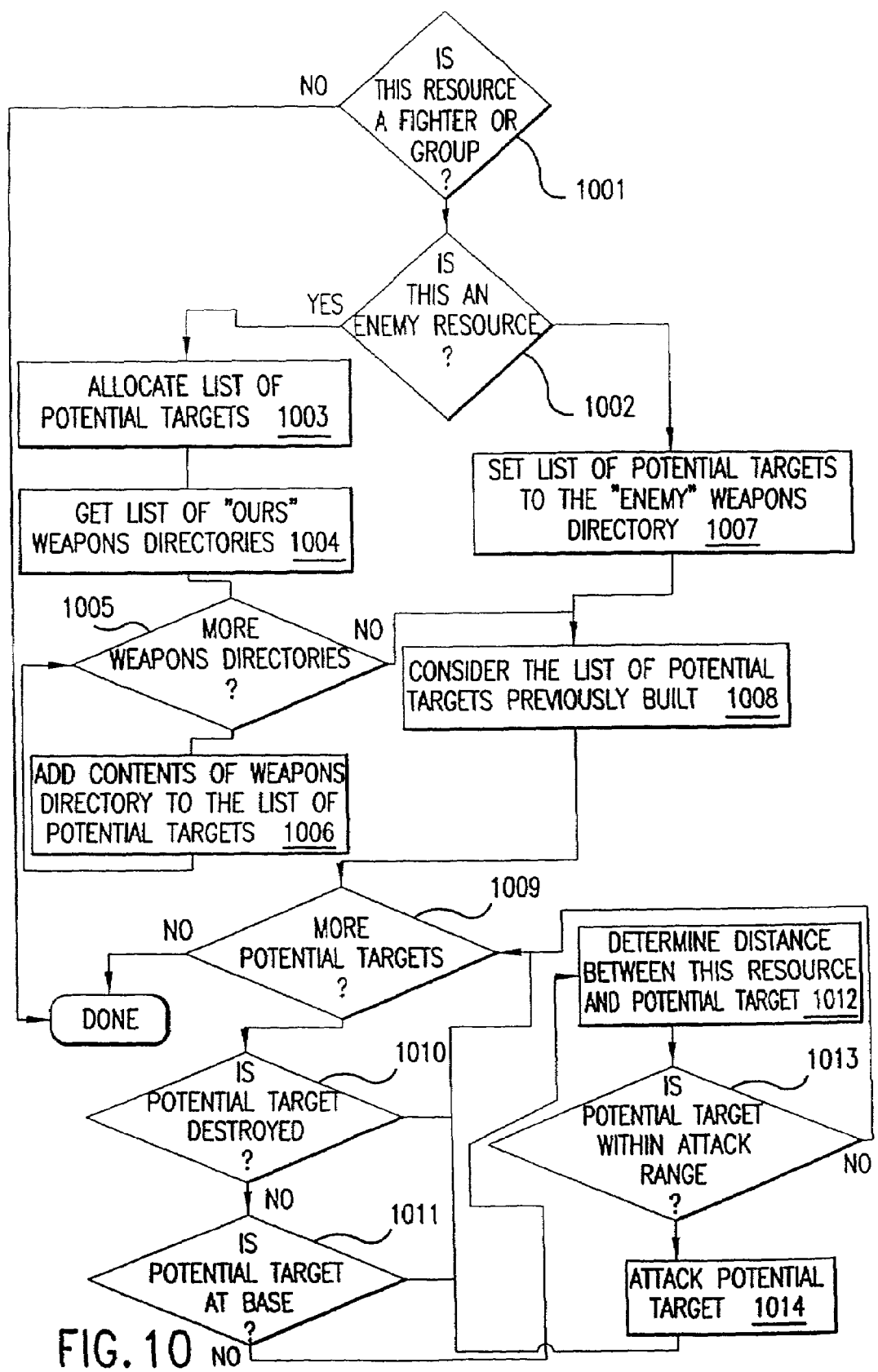
FIG. 10 shows the process of determination and attack of targets of opportunity by a MovingResource class object.

FIG. 10 describes the process of determination and attack of targets of opportunity by a moving resource. If this moving resource is not a fighter or a group of fighters 1001, this resource cannot attack targets of opportunity and processing is terminated immediately. If this moving resource's "Allegiance" value is "enemy" 1002, a list of potential targets of opportunity is allocated 1003, and the list of our weapons directories is obtained from the simulator 1004. While there are unprocessed weapons directories in the list of our weapons directories obtained from the simulator 1005, our weapons directories' contents are added to the list of potential targets of opportunity 1006. If this moving resource's "Allegiance" value is "ours" 1003, the list of potential targets of opportunity is set to be the same as the enemy weapons directory 1007.

The previously built list of potential targets of opportunity is then considered 1008. While there are unprocessed entries in the previously built list of potential targets of opportunity 1009, for each entry in the list the following processing is performed. If the potential target of opportunity moving resource's "destroyed" indicator is set 1010, meaning that the potential target of opportunity has already been destroyed, this potential target of opportunity is ignored. If the potential target of opportunity moving resource's "atBase" indicator is set 1011, meaning that the potential target of opportunity is a plane landed at a base, the potential target of opportunity is ignored. The distance between this moving resource and the potential target of opportunity moving resources is then determined 1012. If the potential target of opportunity moving resource is within the attack range of this moving resource 1013, this is indeed a target of opportunity, and the attack of the target of opportunity is performed by this moving resource 1014.

Figure 11:
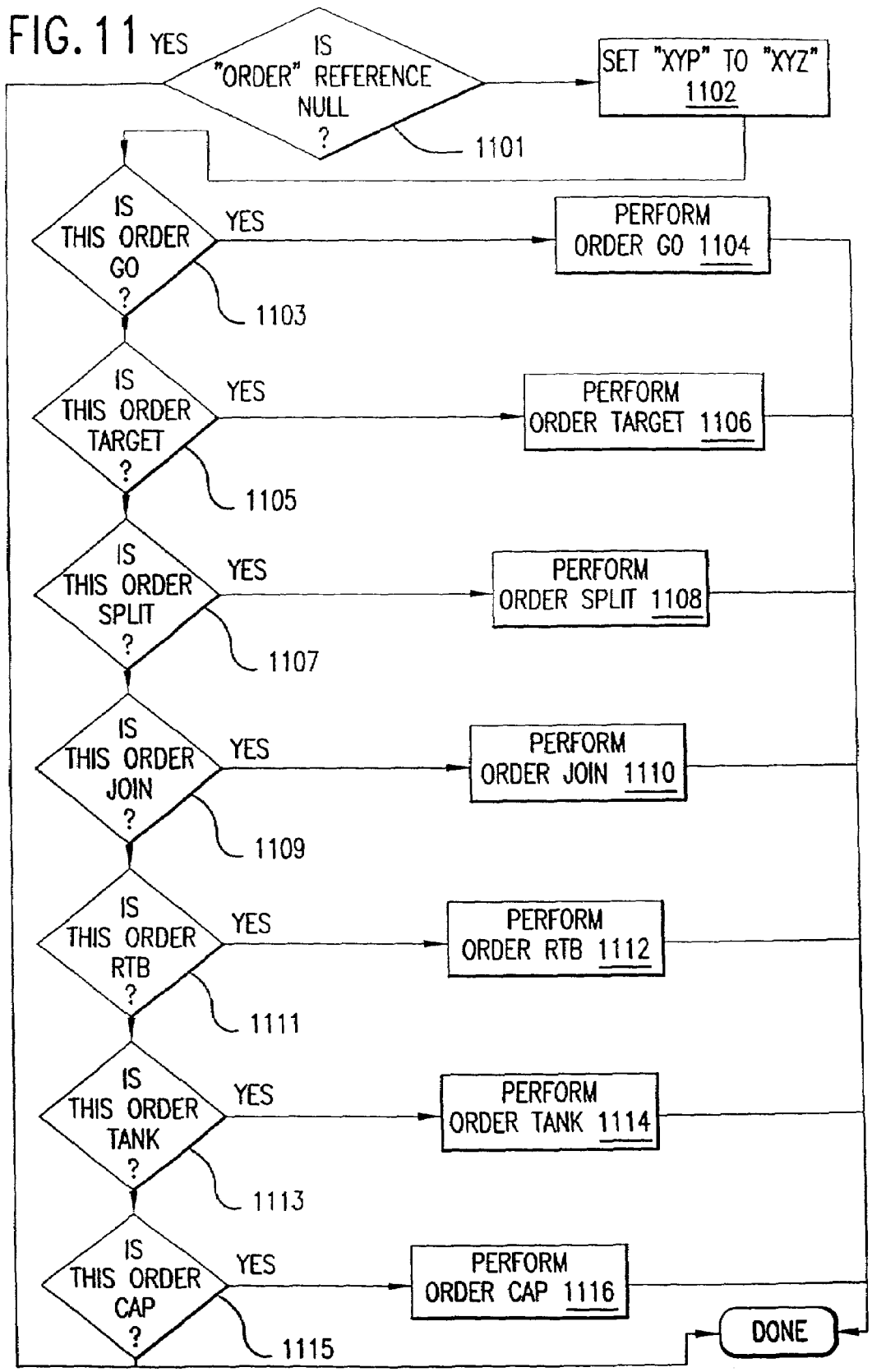
FIG. 11 shows order processing by a MovingResource class object.

FIG. 11 describes order processing by a moving resource. If the "order" reference of a moving resource is null 1101, this moving resource does not have an order to perform and processing is terminated. Otherwise, depending on the order pointed to by the "order" reference of this moving resource, appropriate order execution is performed. The moving resource's previous coordinates "XYP" are set to the values of its current coordinates "XYZ" 1102. If the "order" reference points at a GO order 1103, order GO is executed by this moving resource 1104. If the "order" reference points at a TARGET order 1105, order TARGET is executed by this moving resource 1106. If the "order" reference points at a SPLIT order 1107, order SPLIT is executed by this moving resource 1108. If the "order" reference points at a JOIN order 1109, order JOIN is executed by this moving resource 1110. If the "order" reference points at a RTB order 1111, order RTB is executed by this moving resource 1112. If the "order" reference points at a TANK order 1113, order TANK is executed by this moving resource 1114. If the "order" reference points at a CAP order 1115, order CAP is executed by this moving resource 1116.

Figure 12:
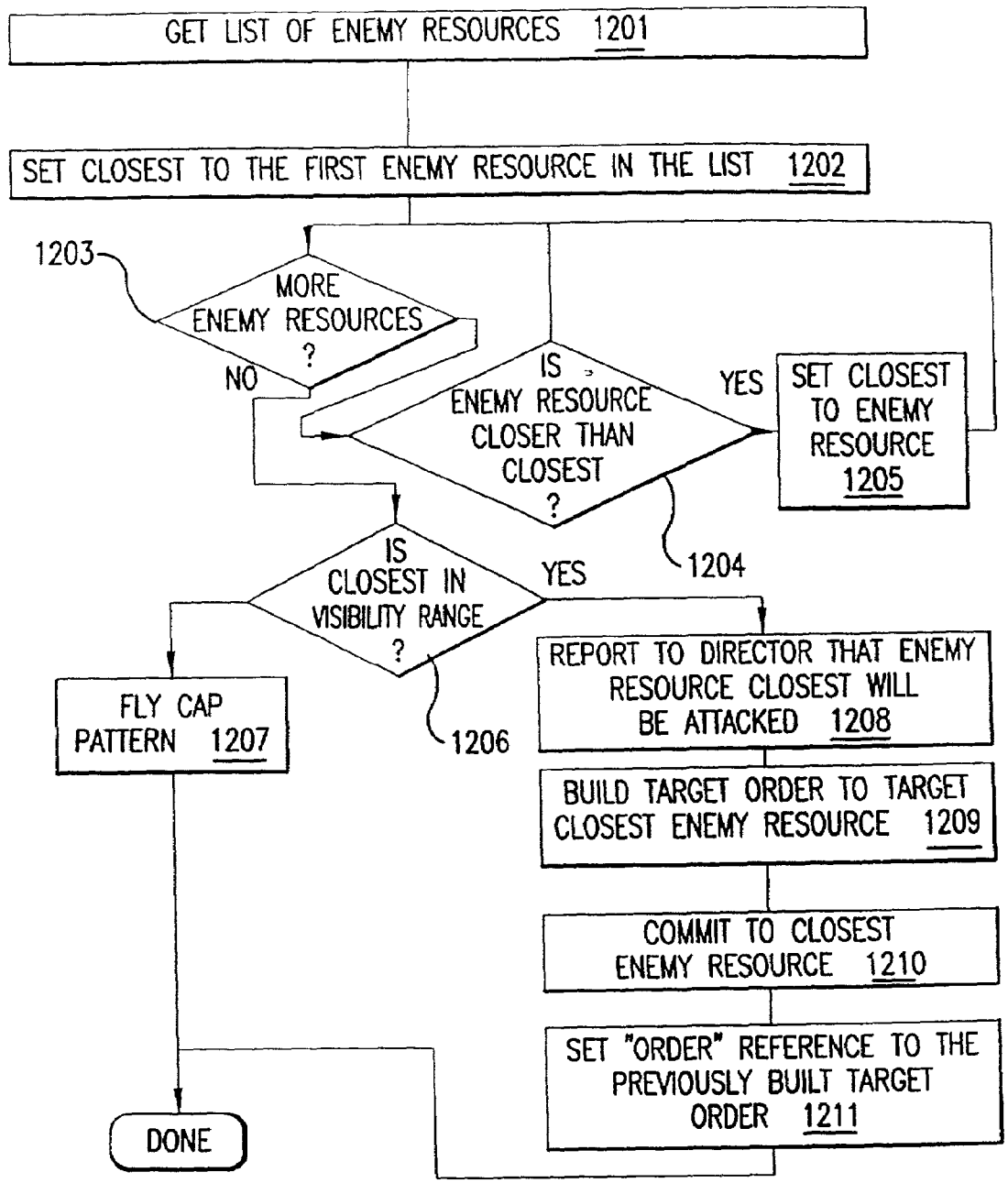
FIG. 12 shows order processing by a MovingResource class object for a Combat Air Patrol (CAP) class of orders.

FIG. 12 describes the process of execution of order CAP (Combat Air Patrol) by a moving resource. The list of enemy planes or groups of planes is obtained from the simulator 1201. The CLOSEST reference is set to the first enemy plane or group of planes in the previously obtained list of enemy planes or groups of planes 1202. While there are unprocessed enemy planes or groups of planes in the previously obtained list of enemy planes or groups of planes 1203, for each enemy plane or group of planes, if this enemy plane or group of planes is closer to this moving resource than the CLOSEST enemy plane or group of planes 1204, the CLOSEST reference is reset to this enemy plane or group of planes 1205. Once the CLOSEST enemy plane or group of planes is determined, if this CLOSEST enemy plane or group of planes is outside the visibility range of this moving resource 1206, the moving resource continues to fly its CAP pattern 1207 (e.g., circle along the CAP perimeter). Otherwise, if the CLOSEST enemy plane or group of planes is visible to this moving resource 1206, the following processing is performed by the moving resource. A report is presented to the weapons director responsible for managing this moving resource conveying the intent of this moving resource to attack the CLOSEST enemy plane or group of planes 1208. A TARGET order is built, specifying the CLOSEST enemy plane or group of planes as the target 1209. This moving resource is committed to the CLOSEST enemy plane or group of planes 1210. The "order" reference of this moving resource is set to the previously built TARGET order 1211.

Figure 13:
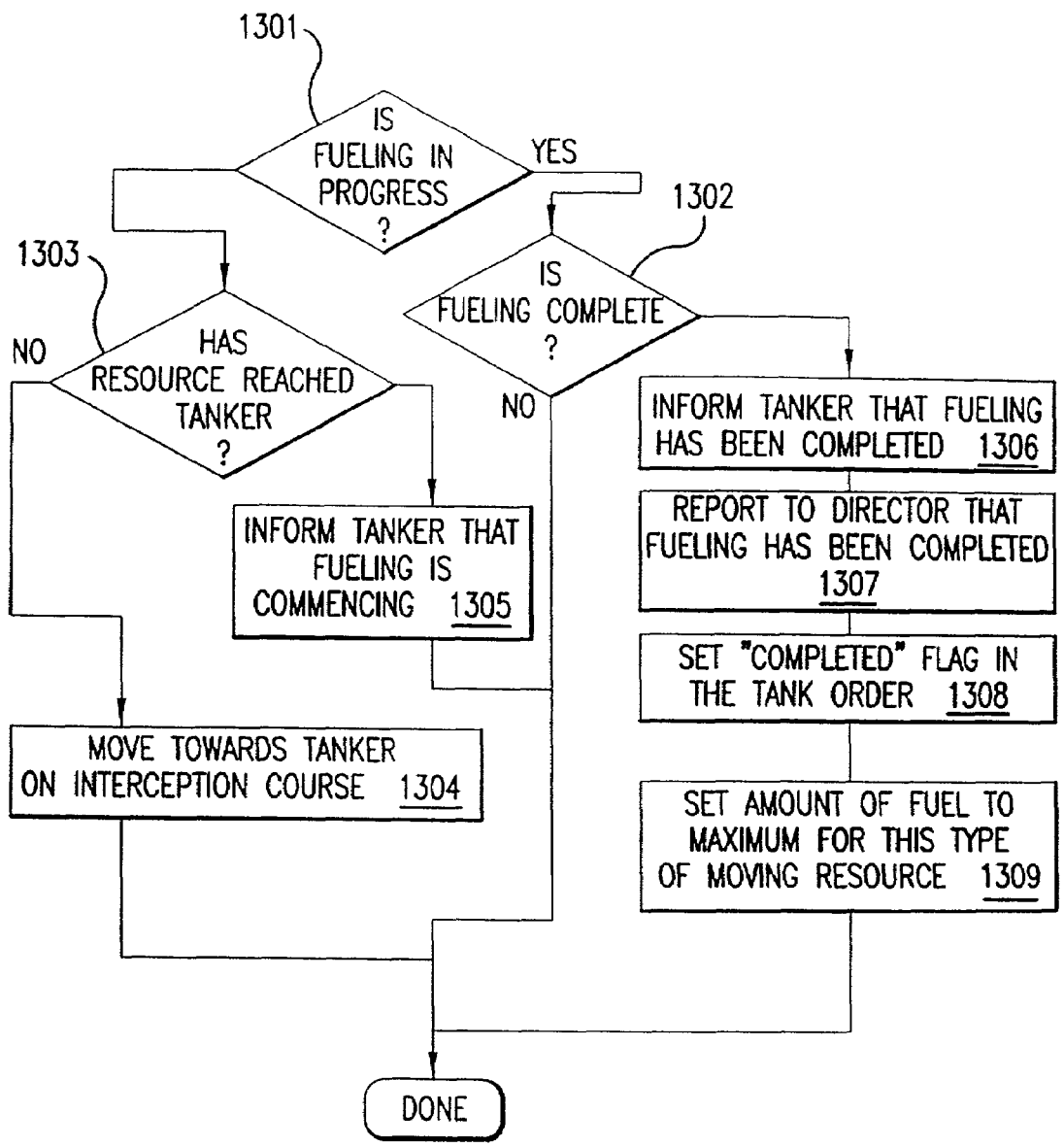
FIG. 13 shows order processing by a MovingResource class object for a TANK class of orders.

FIG. 13 describes the process of execution of order TANK by a moving resource. If this moving resource is already fueling 1301, and if fueling has not been completed by this moving resource at this time 1302, fueling will continue, and nothing further is done. If fueling has been completed by this moving resource at this time 3802, the tanker from which fueling is being performed is informed that fueling has been completed 1306, a report is set to the weapons director responsible for managing this moving resource, informing this weapons director that fueling of this moving resource has been completed 1307, the "completed" indicator is set in the TANK order this moving resource has completed execution 1308, and the amount of fuel for this moving resource is set to the maximum for this type of moving resource 1309. If this moving resource has not yet commenced fueling 1301, if this moving resource has not yet reached the tanker prescribed by the TANK order this moving resource is executing 1303, the moving resource will move for a duration of a tick of the simulation towards the prescribed tanker on the interception course 1304. If this moving resource has reached the prescribed tanker 1303, the tanker is informed that fueling of this moving resource is commencing 1305.

Figure 14:
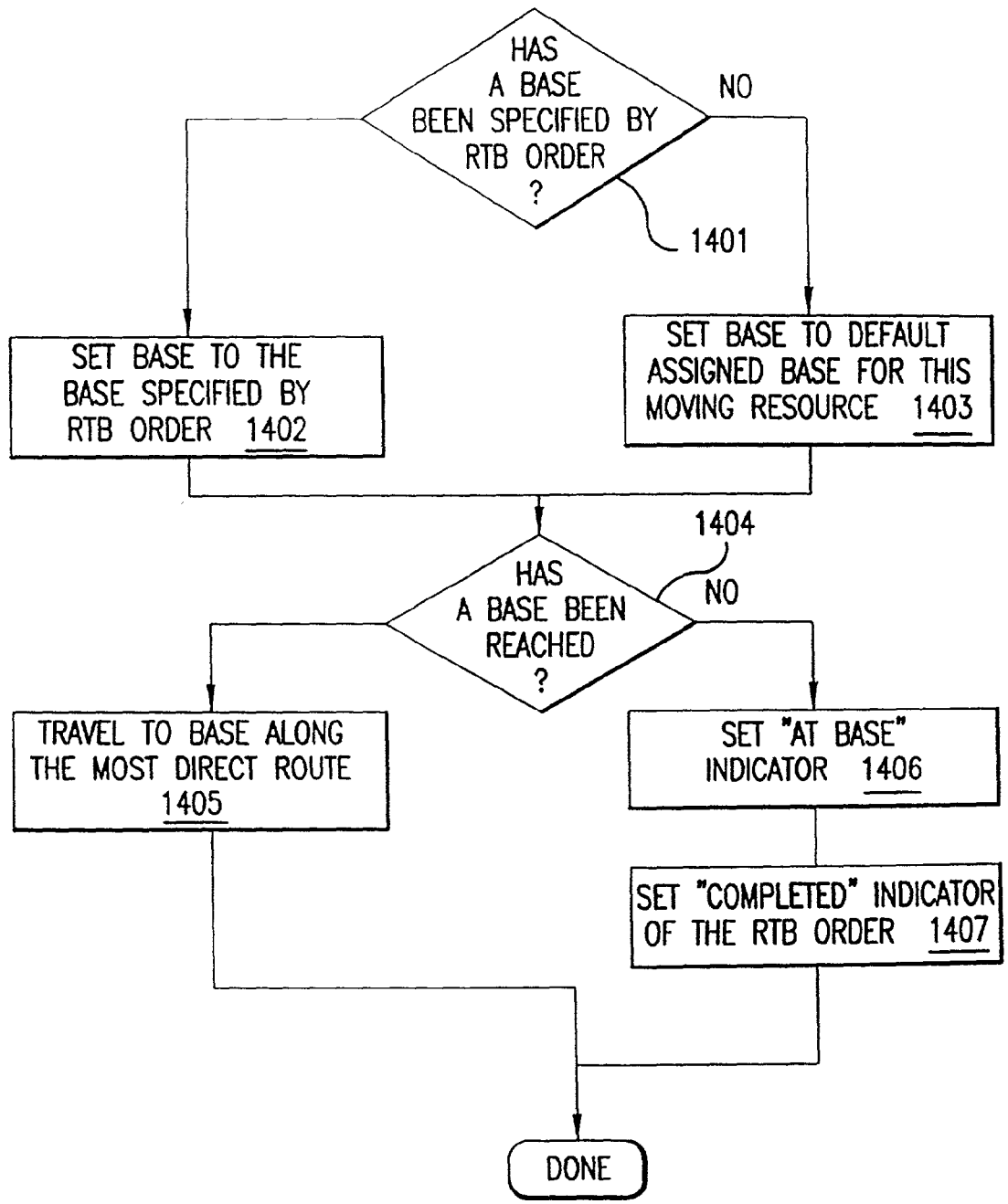
FIG. 14 shows order processing by a MovingResource class object for a Return to Base (RTB) class of orders.

FIG. 14 describes the process of execution of order RTB (Return-to-Base) by a moving resource. If a base has been specified by the RTB order 1401, the BASE reference is set to the base specified by the RTB order this moving resource is executing 1402, otherwise, the BASE reference is set to the default assigned base for this moving resource 1403. If this moving resource has not yet reached the BASE 1404, the moving resource will travel for the duration of a tick of the simulation towards the BASE along the most direct route 1405. Otherwise, the "atBase" indicator of the moving resource is set to indicate that the moving resource has landed at a base 1406, and the "completed" indicator of the RTB order this moving resource is executing is set to indicate completion of the RTB order execution 1407.

Figure 15:
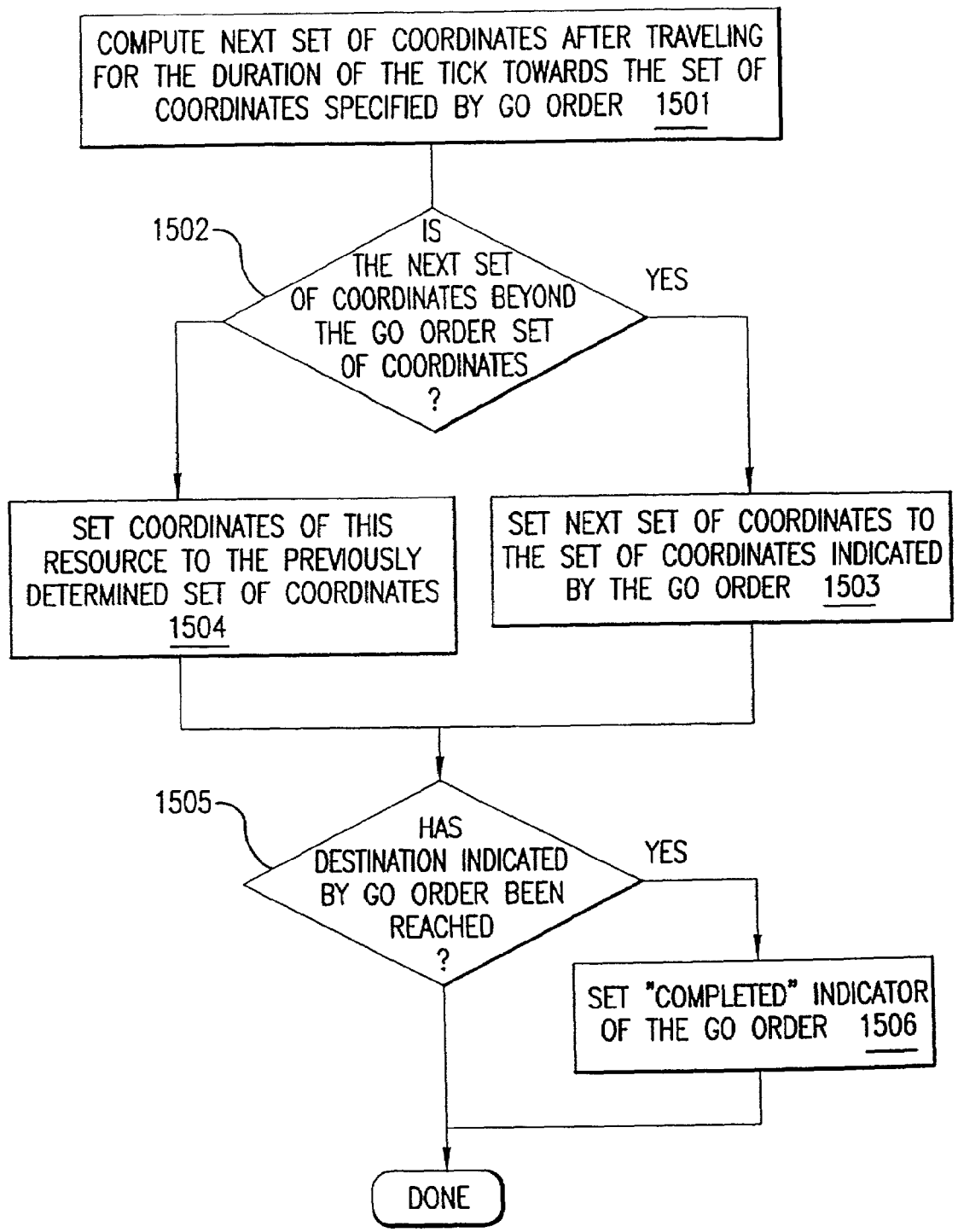
FIG. 15 shows order processing by a MovingResource class object for a GO (going straight) class of orders.

FIG. 15 describes the process of execution of order GO by a moving resource. The next set of coordinates this moving resource would reach after travelling for the duration of a tick of the simulation towards the set of coordinates indicated by the GO order this moving resource is executing is computed 1501. If the previously computed set of coordinates would place this moving resource beyond the set of coordinates indicated by the GO order this moving resource is executing 1502, set the next set of coordinates for this moving resource to the set of coordinates indicated by the GO order this moving resource is executing 1503 to prevent overshooting the target position, otherwise, set the set of coordinates for this moving resource to the previously determined set of coordinates 1504. If the destination indicated by the GO order this moving resource is executing has been reached by this moving resource 1505, the "completed" indicator of the GO order this moving resource is execution is set 1506 to indicate completion of the order GO execution by this moving resource.

Figure 16:
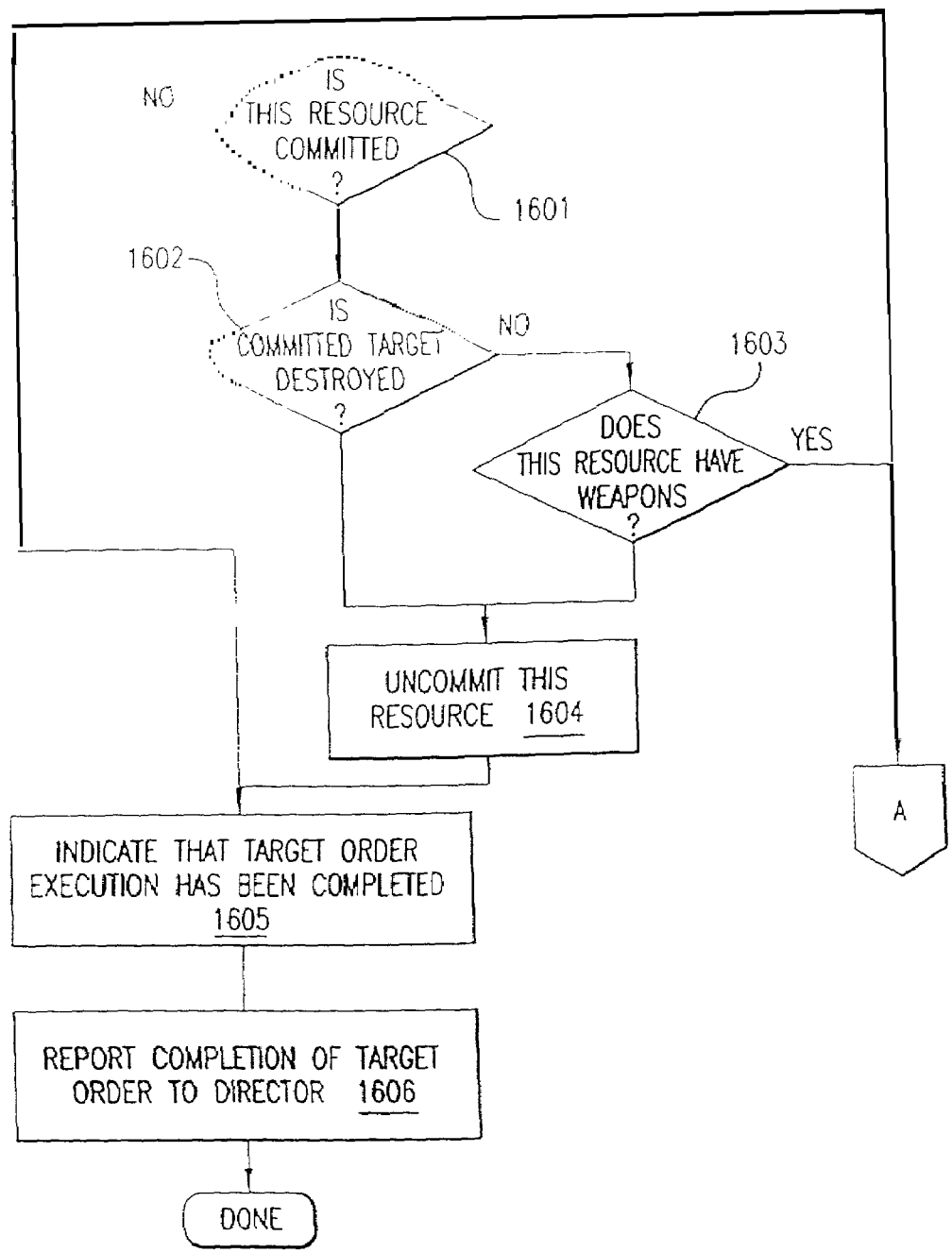
FIG. 16 shows order processing by a MovingResource class object for a TARGET class of orders.
Figure 16B:
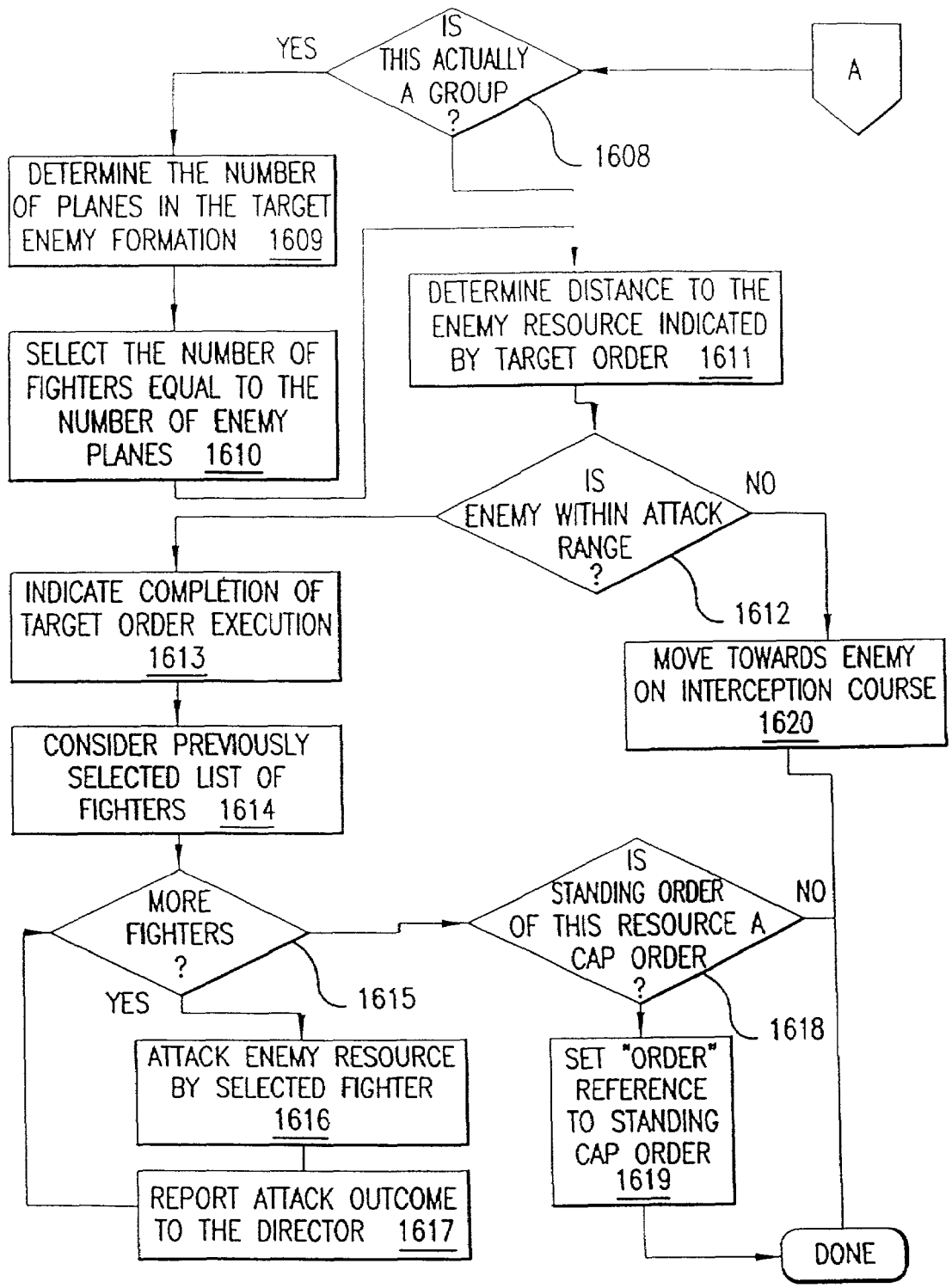

FIG. 16 describes the process of execution of order TARGET by a moving resource. If this moving resource does not have the "committed" indicator set 1601, the "completed" indicator is set in the TARGET order for this moving resource 1605 to indicate TARGET order execution completion, and report completion of the TARGET order to the weapons director responsible for managing this moving resource 1606. If the target moving resource specified by the TARGET order this moving resource is executing has its "destroyed" indicator set 1602, meaning that the target moving resource specified by the TARGET order this moving resource is executing has been destroyed, the process performs the uncommit process for this moving resource from the target moving resource specified by the TARGET order 1604 and proceed to step 1605. Otherwise, if this moving resource has no weapons 1603, and therefore cannot perform the TARGET order, the process performs the uncommit process for this moving resource from the target moving resource specified by the TARGET order 1604 and proceeds to step 1605.

If this moving resource possesses weapons and the target moving resource prescribed by the TARGET order this moving resource is executing has not yet been destroyed, the remainder of the processing is performed. If this moving resource is actually a group of fighters 1608, the number of planes in the target enemy formation is determined 1609 and the number of fighters equal to the previously determined number of enemy planes is selected from within this group 1610. The distance is then determined between this moving resource and the enemy moving resource indicated by the TARGET order 1611. If the enemy moving resource is not yet within the attack distance of the selected fighters 1612, this moving resource will move towards the enemy moving resource prescribed by the TARGET order on the interception course for the duration of a tick of the simulation 1620.

Otherwise, if the enemy moving resource is within the attack distance of the selected fighters 1612, the "completed" indicator is set in the TARGET order 1613 to indicate that the TARGET order execution is being completed by this moving resource. The previously determined list of one or more fighters is now considered 1614. While there are unprocessed fighters in the previously determined list 1615, for each of the fighters in the list, the following processing is performed. The attack of the enemy moving resource by the selected fighter is carried out 1616. The report of the attack outcome is presented to the weapons director responsible for managing this moving resource 1617. If the standing order of this moving resource was order CAP 1618, the "order" reference of this moving resource is set to the standing order CAP 1619.

Figure 17:
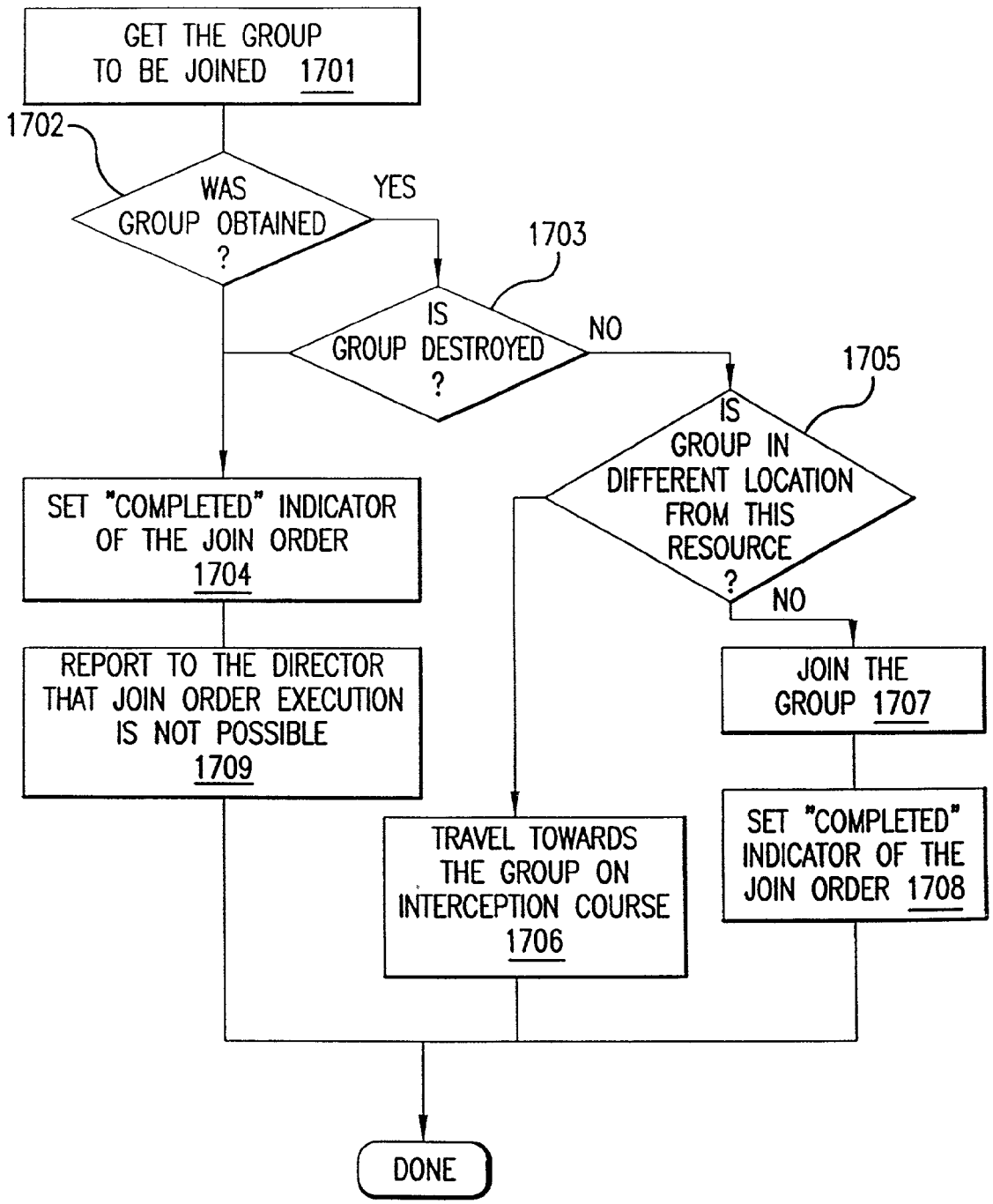
FIG. 17 shows order processing by a MovingResource class object for a JOIN class of orders.

FIG. 17 describes the process of execution of order JOIN by a moving resource. The group of resources to be joined by this moving resource is retrieved from the simulator's list of resources 1701. If the group of resources to be joined was not obtained 1702, the "completed" indicator of the JOIN order executed by this moving resource is set 1704 to indicate completion of the JOIN order execution, and a report to the weapons director responsible for managing this moving resource is made, informing the weapons director that JOIN order execution is not possible 1709. Otherwise, if the group of resources to be joined has been obtained from the simulator resource list 4301, and if the group's "destroyed" indicator is set 1703, meaning that this group of resources has been destroyed, steps 1704 and 1709 are executed. Otherwise, if the group of resources to be joined, prescribed by the order JOIN, is indeed available for joining, and if the group of resources to be joined is in a different location from this moving resource 1705, the moving resource will travel for the duration of a tick of the simulation on the interception course towards the group of resources to be joined that is prescribed by the order JOIN 1706. If this moving resource has reached the group of resources prescribed by the order JOIN 1705, the moving resource joins the group of resources it reached 1707, and the "completed" indicator is set in the order JOIN this moving resource is executing 1708 to indicate completion of the JOIN order.

Plane

The Plane class inherits from the MovingResource class, and adds the information pertinent to planes, in addition to that generally used for all moving resources. FIG. 18 shows the representation of the Plane class. Each plane has a ceiling, or a maximum possible flying altitude (MaxZ), and a maximum possible travel range (MaxL). In addition, each plane has additional logical indicators:

Hit—the plane has been hit by a missile, from a gun, etc.
MechanicalProblem—the plane has developed a mechanical problem Fighter The Fighter class inherits from the Plane class, and adds the information pertinent to fighter planes. FIG. 19 shows the representation of the Fighter class. Each fighter has a reference to a list of weapons it possesses (weapons). In addition, each fighter plane contains the counter of the number of attacks it has performed, which, in conjunction with the fighter flight time, may be used to compute the degree of fatigue the fighter pilot is subject to.

Figure 20:
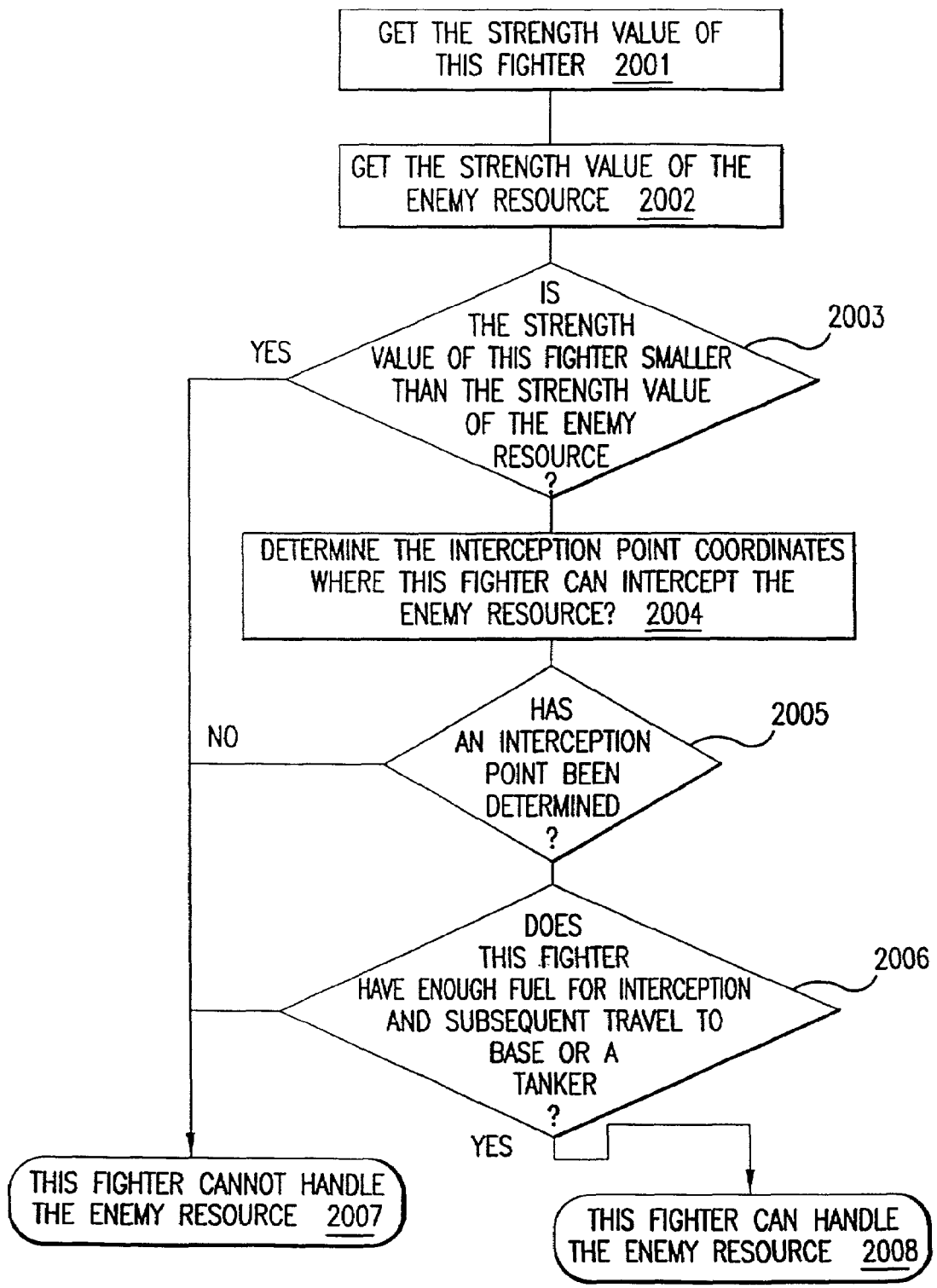
FIG. 20 shows the process of determination of the ability of a fighter to handle a specific enemy resource.

Before a fighter is committed to attacking a particular enemy resource, it is necessary to determine whether this fighter possesses the ability to successfully complete the attack of this specific enemy resource. FIG. 20 describes the process of determining the ability of a fighter to successfully attack a specific enemy resource. First, the strength values of this fighter and the enemy resource under consideration are obtained 2001, 2002. If the strength value of this fighter is smaller than the strength value of the enemy resource under consideration 2003, the attack will not succeed, and processing is terminated with the indication that the fighter is not deemed capable of successfully attacking this enemy resource 2007. Otherwise, an attempt is made to determine coordinates for the point where this fighter can intercept the enemy resource under consideration 2004, assuming the maximum possible velocity of this fighter and projected velocity of the enemy resource under consideration.

If the interception point has not been successfully determined 2005, meaning that interception of this enemy resource by this fighter is not possible, processing is terminated with the indication that the fighter is not deemed capable of successfully attacking this enemy resource 2007. Otherwise, if the interception point has been successfully determined, fuel verification is performed to ascertain the ability of this fighter to reach the previously determined interception point at maximum velocity and then successfully reach a base or a tanker for refueling 2006. If it is determined that this fighter does not have sufficient fuel for the travel to the interception point at maximum velocity and subsequent travel to a base or a tanker, processing is terminated with the indication that the fighter is not deemed capable of successfully attacking this enemy resource 2007. Otherwise, if this fighter has enough fuel for the required travel, processing is completed with the indication that this fighter is deemed capable of successfully attacking this enemy resource 2008.

Figure 21:
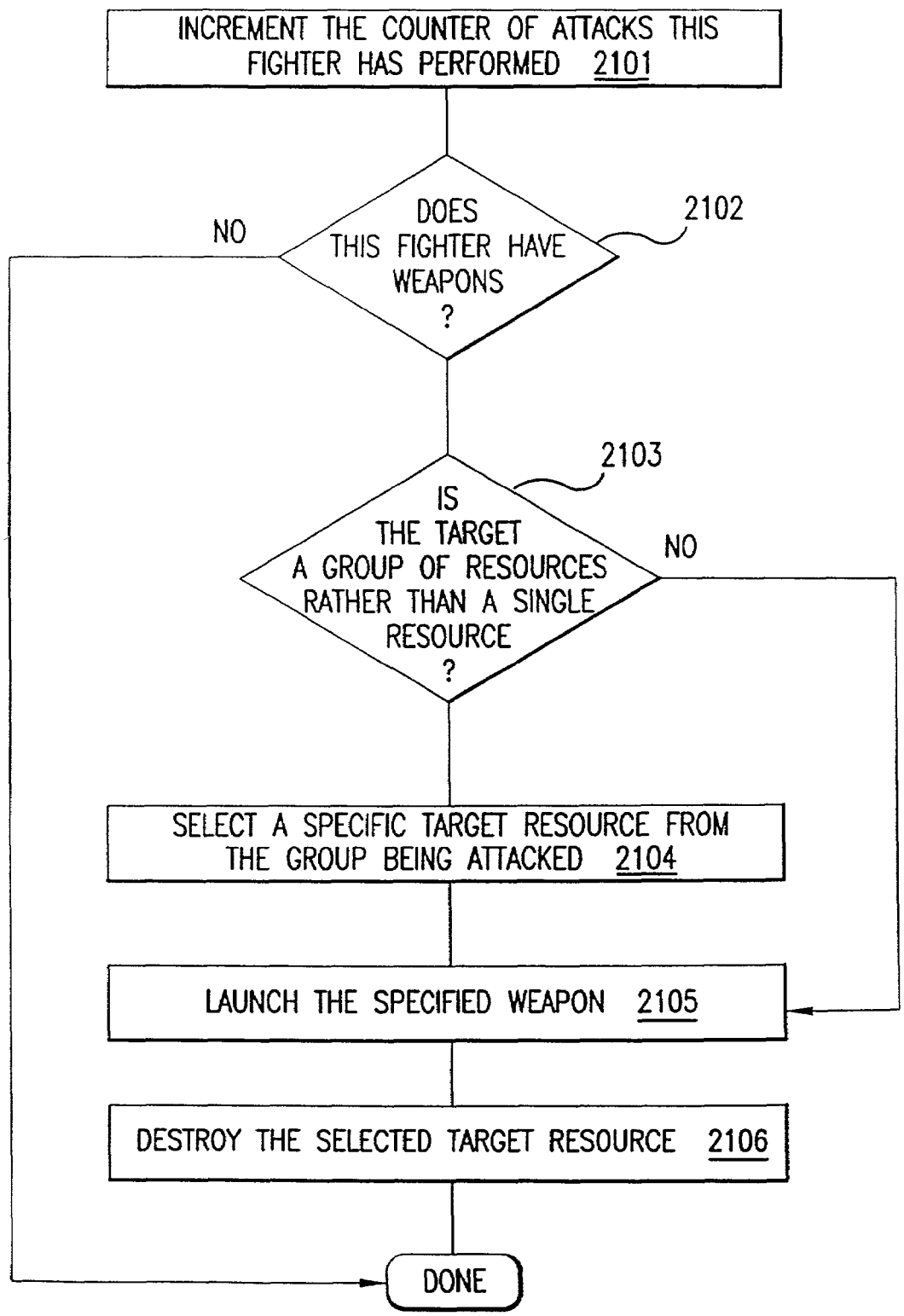
FIG. 21 shows the process of a fighter attack of an enemy resource.

FIG. 21 describes the process of an attack being performed by a fighter. First, the counter attacks performed by this fighter is incremented 2101. Then, a check of fighter's weapons is performed 2102. If this fighter has no weapons, attack is impossible and processing is terminated. If this fighter has weapons, processing continues. If the target of this fighter's attack is a group of resources, rather than a single resource 2103, a specific single resource is selected from the list of resources of the group being attacked 2104. Then the specified weapon is launched at the selected target resource 2105, and the selected target resource is destroyed 2106.

While the above process assumes an unconditional success for a fighter attack of an enemy resource, other attack outcome derivation schemes are possible, e.g., a probabilistic one, where a success probability is assigned to all or particular types of attacks, and attacks are only successful with that probability. A more elaborate scheme is possible, where the attack outcome is also dependent on geometry and relative positions and speeds of the resources that are engaged. Furthermore, it is possible to have manual determination of an attack outcome, performed by a particular user. In a real-life air combat situation, the attack outcome will become known to the agent from its information gathering sources (e.g., a radar device), or by manual entry of attack outcome by a surveillance operator or another user.

Group

The Group class inherits from a MovingResource and includes a list of MovingResource objects that comprise a group.

Figure 22:
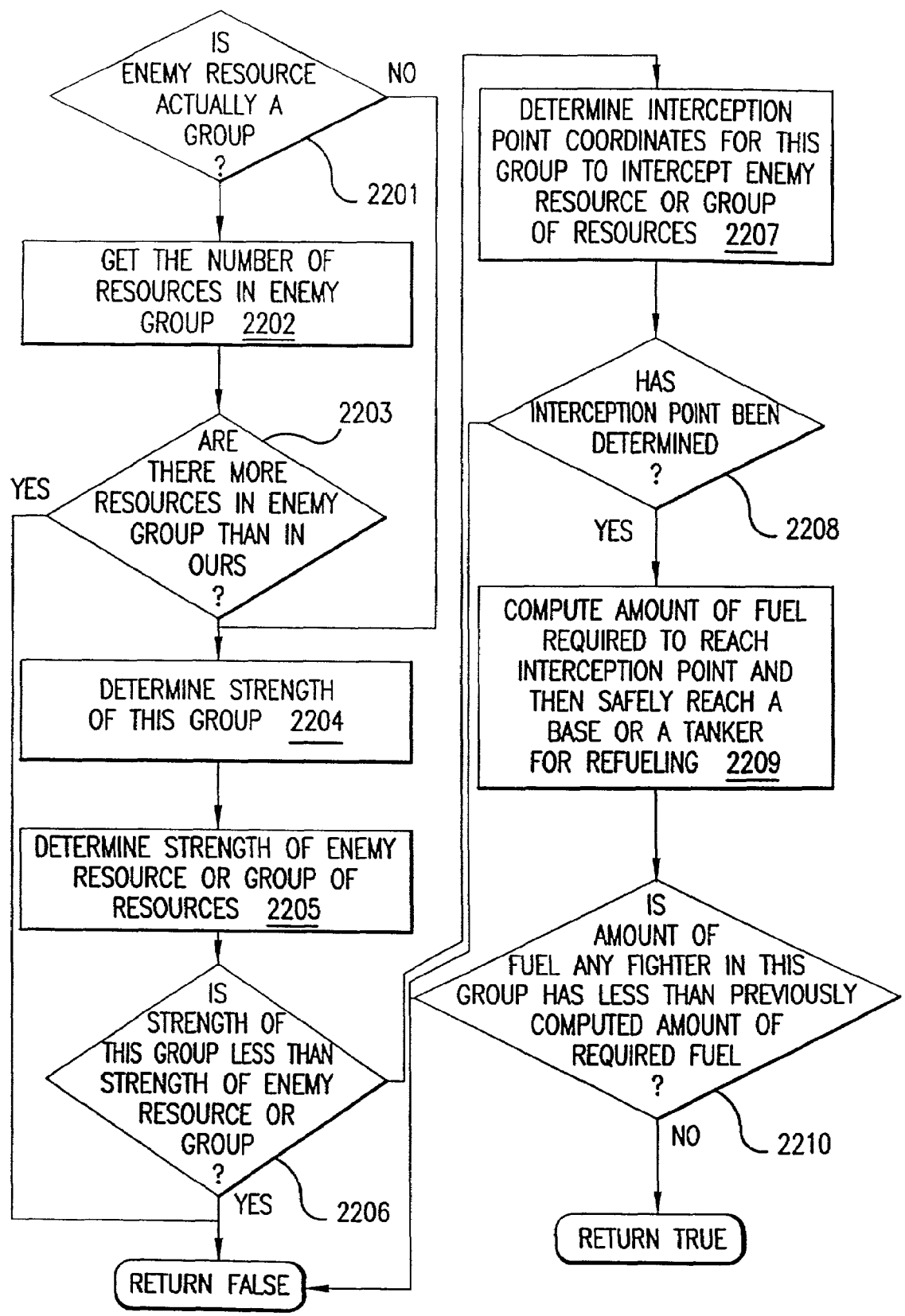
FIG. 22 shows the process of determination of the ability of a group of fighters to handle a specific enemy resource.

Before a group is committed to attacking a particular enemy resource or a group of enemy resources, it is necessary to determine whether this group possesses the ability to successfully complete the attack of this specific enemy resource or a group of enemy resources. FIG. 22 describes the process of determining the ability of a group to successfully attack a particular enemy resource or a group of enemy resources. First, a determination is made of whether the enemy resource is a single resource or a group of enemy resources 2201. If the enemy resource is actually a group of enemy resources, the number of resources in the enemy group is obtained 2202. If the enemy group has more resources than this group, 2203, processing is terminated with the indication that this group is deemed incapable of successfully attacking the specified enemy group. Otherwise, the strength of this group is determined 2204, followed by determining the strength of the enemy resource or group of enemy resources 2205. If the strength of this group is less than the strength of the enemy resource or group of enemy resources 2206, processing is terminated with the indication that this group is deemed incapable of successfully attacking the specified enemy resource or a group of enemy resources. Otherwise, an attempt is made to determine the coordinates of the points where this group can intercept the enemy resource or a group of enemy resources 2207, assuming the maximum possible velocity of this group and the projected velocity of the enemy resource or a group of enemy resources.

If the interception point coordinates have not been successfully determined 2208, meaning that the interception is impossible, e.g., because the enemy resource or a group of enemy resources is travelling too fast, processing is terminated with the indication that this group is deemed incapable of successfully attacking the specified enemy resource or a group of enemy resources. If the interception point coordinates have been successfully determined, the amount of fuel this group, based on a single fighter within this group, would require to reach the previously determined interception point at the group's maximum velocity and then safely reach a base or a tanker for refueling is determined 2209. If the previously determined amount of required fuel is greater than the actual amount of fuel possessed by any fighter in this group 2210, processing is terminated with the indication that this group is deemed incapable of successfully attacking the specified enemy resource or a group of enemy resources. Otherwise, if this group possesses a sufficient amount of fuel for interception at maximum velocity and subsequent travel to base or a tanker for refueling, processing is terminated with the indication that this group is deemed capable of successfully attacking the specified enemy resource or a group of enemy resources.

Figure 23:
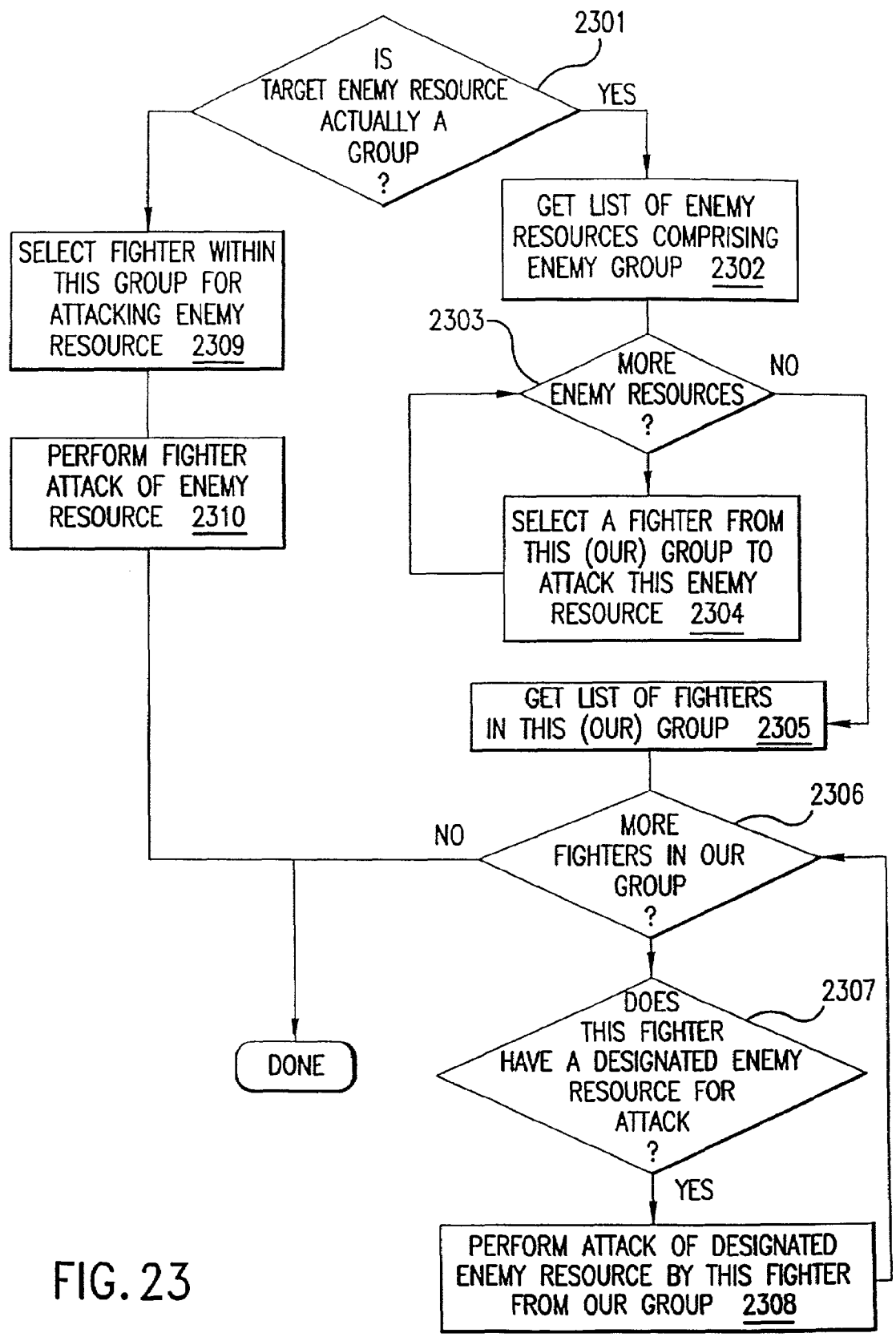
FIG. 23 shows the process of a group of fighters attack of an enemy resource.

FIG. 23 describes the process of a group attacking an enemy resource or a group of enemy resources. First, a determination is performed of whether the target enemy resource is a single resource or a group of resources 2301. If the target enemy resource is a group of resources, the list of enemy resources is obtained from the target enemy group 2302. While there are unprocessed enemy resources in the list of resources obtained from the target enemy group 2303, for each enemy resource in this list, a fighter is selected from our group to attack this enemy resource 2304. The list of fighters in our group is then obtained 2305. While there are unprocessed fighters in our group 2306, for each fighter in our group, the following is performed. If this fighter has a designated enemy resource for attack 2307, the attack of this designated enemy resource by this fighter is performed 2309. If the target enemy resource is a single resource, rather than a group of resources 2301, a single fighter is selected from this group for attacking the target enemy resource 2309, and the attack of the target enemy resource by the selected fighter from this group is performed 2310.

Figure 24:
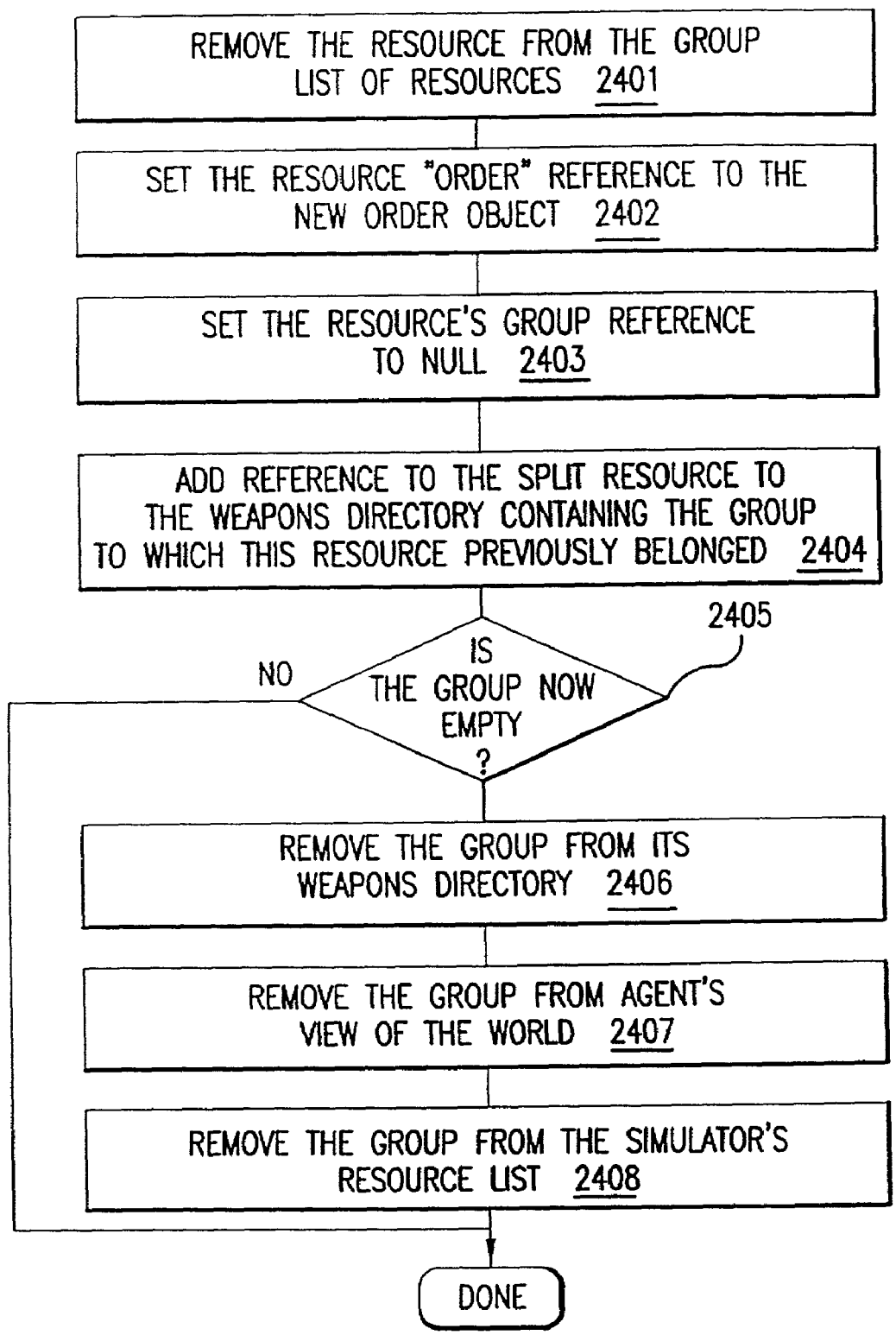
FIG. 24 shows the process of splitting a resource from a group.

It may sometimes be necessary to split a particular resource from the group this resource belongs to, or to add a particular single resource to a specific group. FIG. 24 shows the process of splitting a resource from its group. The specified resource is first removed from its group's list of resources 2401. The specified resource "order" reference is then set to a new order this resource must now perform 2402. The resource "group" reference is set to null 2403, indicating that this resource is no longer a part of any group or resources. This is followed by adding a reference to this resource to the weapons directory to which the group of resources previously containing this resource belongs 2404. If the group from which the specified resource was removed now has no more resources left and its resource list is empty 2405, the reference to this group of resources is removed from its weapons directory 2406, from the agent's view of the world table 2407, and from the simulator's resource list 2408, thus effectively making this group of resources cease to exist.

Figure 25:
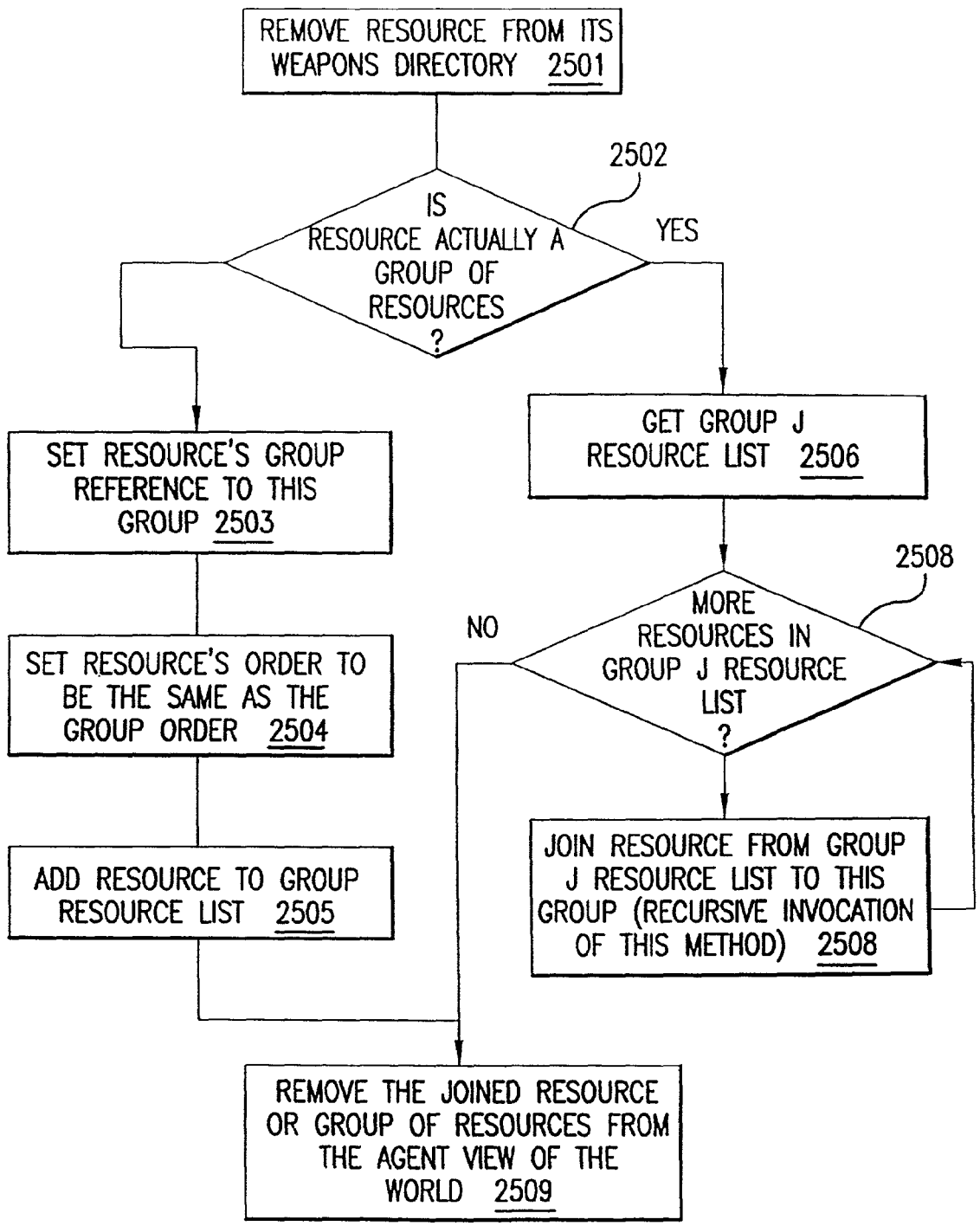
FIG. 25 shows the process of joining a resource to a group.

FIG. 25 shows the process of joining a particular resource to a group of resources. First, the reference to this specified resource is removed from the resource's weapons directory 2501. If this resource is indeed a single resource and not a group of resources 2502, the resource's "group" reference is set to point at the group of resources this resource is joining 2503, the resource's "order" reference is set to be the same as the "order" reference of the group of resources this resource is joining 2504, and a reference to this resource is added to the list of resources comprising the group of resources this resource is joining 2505. Otherwise, if this resource is actually a group of resources (GROUPJ) 2502, the GROUPJ list of resources is obtained 2506, and while the GROUPJ list of resources has unprocessed resources 2507, for each resource in the GROUPJ resource list, the resource from GROUPJ list of resources is joined to the resource group the specified resource is joining 2508, by a recursive invocation of steps 2501-2505 and 2509. The resource or group of resources that has just joined the specified group of resources is then removed from the agent view of the world table 2509.

Weapons Director

The Director class embodies the properties of a weapons director. FIG. 26 shows the representation of a weapons director by the Director class. Each weapons director may have a "Lane", or an area of air space this weapons director is responsible for protecting. A weapons director may have a list "CAPs" of combat air patrol (CAP) zones, where it is desirable for this weapons director to assign patrolling groups of fighters. Each weapons director has a weapons directory "WD", containing the list of resources this weapons director is responsible for managing. Each weapons director has a "Level", represented by an integer number, and has one of the following values, depending on the responsibility level of this weapons director:

0—unknown
1—novice
2—journeyman
3—expert
4—master

Each weapons director has an "Allegiance" integer value, indicating whether this weapons director is ours, enemy, or unknown. Each weapons director representation contains a reference "SENIOR" to the senior director this weapons director reports to. A weapons director may have a list of enemy resources this weapons director is responsible for handling. In addition, each weapons director has a "Human" indicator, which is set to the "true" logical value if this weapons director object is representing a weapons director operating in manual mode, meaning that a human user is present and performing a role of this weapons director, as opposed to this weapons director actions being determined by the agent. During each tick of the simulation, each weapons director for which the agent is active may have a list of "Recommendations", containing the current set of recommendations from the agent for this weapons director. In addition, the "RecommendationsFromHuman" list may be present, which contains any manually-entered recommendation/order pairs from a human user acting for this weapons director. If the agent is enabled for this weapons director, the agent may inform this director of any events the agent considers of interest to this weapons director by adding these events' textual descriptions to the "Events" list of the weapons director object. In addition, the "Rationale" list contains textual explanations of the recommendations by the agent to this weapons director.

Figure 27:
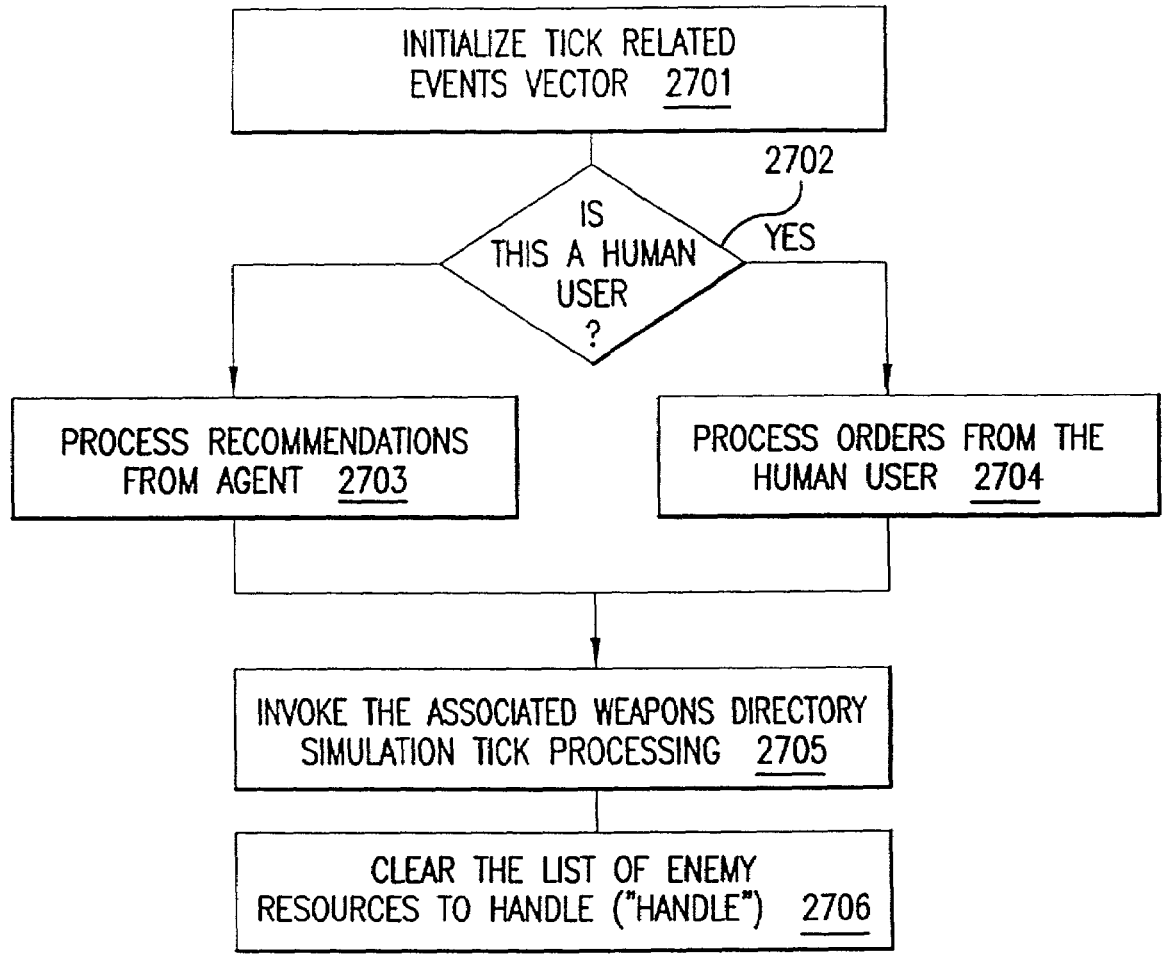
FIG. 27 shows processing of a simulation tick by a Director class object.

FIG. 27 describes the processing performed by the weapons director object at each tick of the simulation. The tick-related events vector is initialized 2701. If this weapons director is managed by a human user 2702, orders from the human user (if any) are processed 2704. Otherwise, if this weapons director is not managed by a human user 2702, recommendations from an agent automating the behavior of this weapons director are processed 2703. Then the simulation tick processing of the weapons directory associated with this weapons director is invoked 2705. To complete the process, the list of enemy resources this weapons director must handle is cleared 2706.

Figure 28:
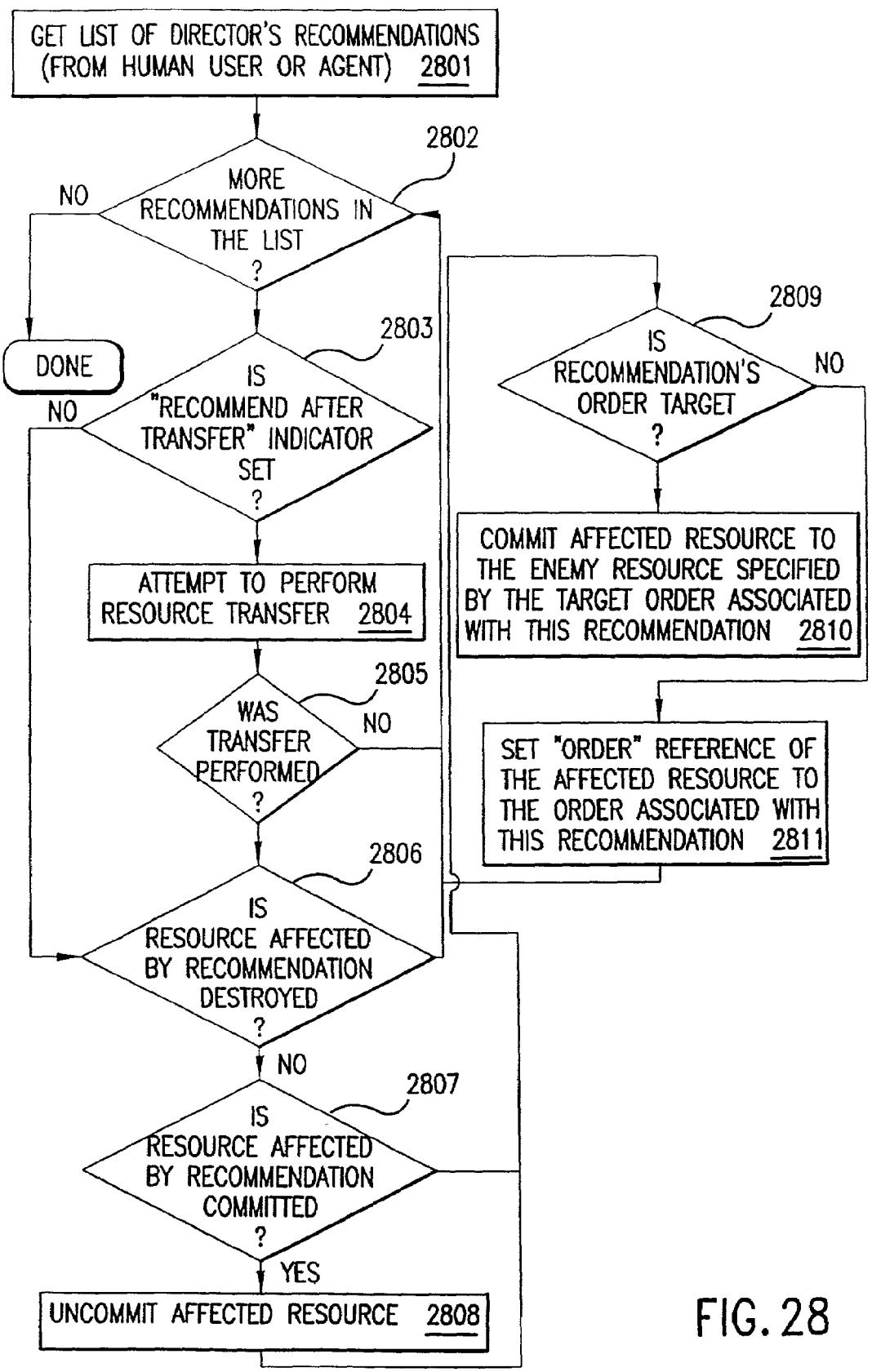
FIG. 28 shows processing of recommendations from the intelligent agent or a human user by a Director class object.

FIG. 28 describes processing of recommendations from a human user or the automating agent by a weapons director. First, the list of recommendations to this weapons director from human user or automating agent is obtained 2801. If this list is empty 2802, processing is terminated. Otherwise, if recommendations are present in this list, while there are unprocessed recommendations in this list 2802, for each recommendation, the following processing is performed.

If this recommendation has "recommendAfterTransfer" indicator set 2803, the weapons director requests its senior director to permit and accomplish the transfer of the resource specified by the recommendation from the weapons director presently responsible for managing that resource to this weapons director 2804. If the senior director has not approved and performed the resource transfer 2805, this recommendation is ignored. Otherwise, a check of the "destroyed" indicator of the resource prescribed by this recommendation is performed 2806 to ensure that this resource is still available. If the resource prescribed by this recommendation has been destroyed, the recommendation is ignored. Otherwise, if the resource prescribed by this recommendation has "committed" indicator set 2807, the uncommit process is performed for this resource 2808. If the order associated with this recommendation is TARGET 2809, the resource prescribed by this recommendation is committed to the enemy resource specified by the TARGET order associated with this recommendation 2810. The order associated with this recommendation is then given to the resource prescribed by this recommendation by setting the "order" reference of this resource to the order associated with this recommendation 2811.

Senior Director

The Senior class embodies the senior director to whom weapons directors report. Senior class objects contain a list of weapons directors reporting to this senior director.

Figure 29:
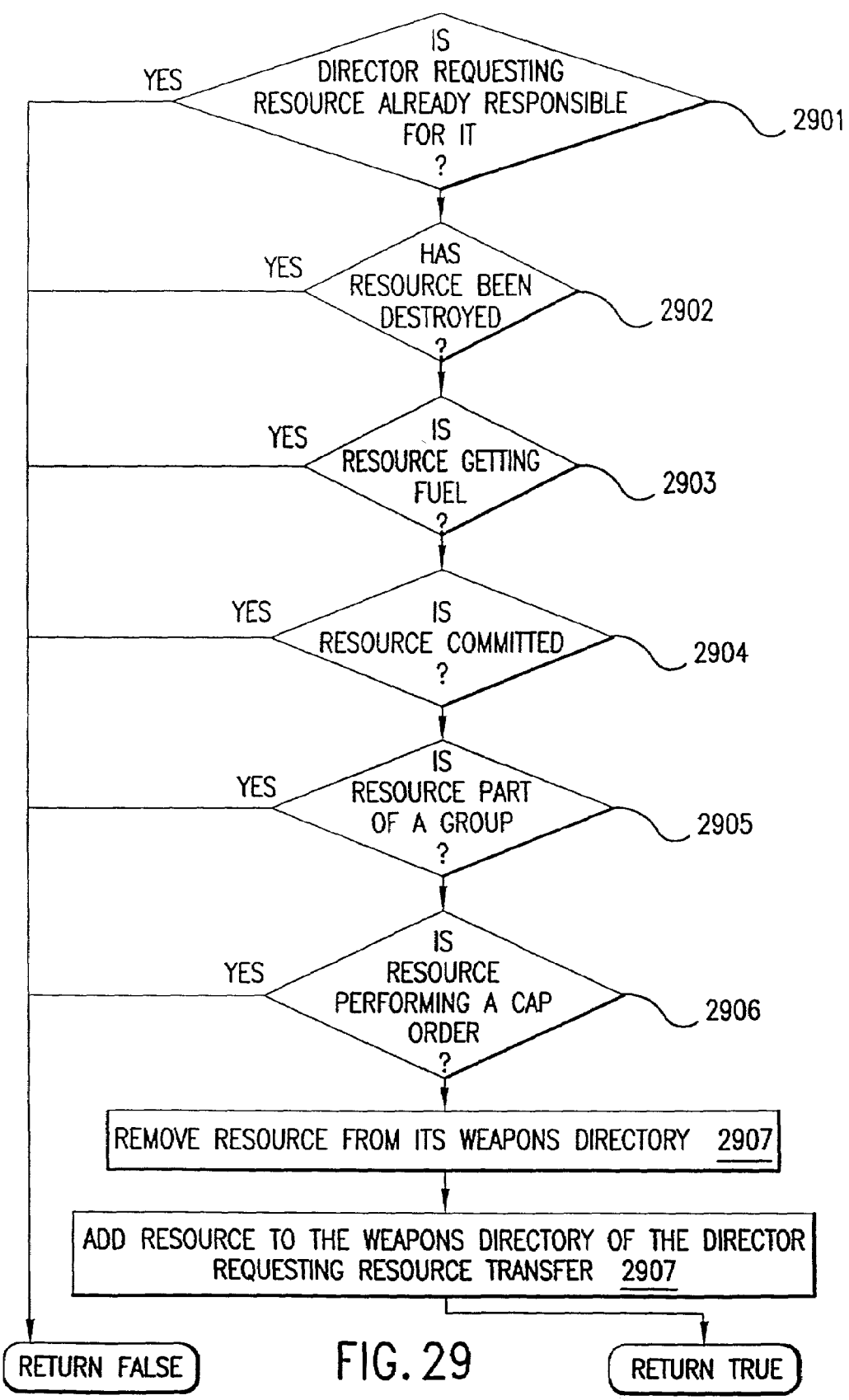
FIG. 29 shows the process of transferring resources between weapons director by a senior director.

The senior director may be asked to approve and perform transfer of resources from one weapons director to another. FIG. 29 describes the process performed by the senior director to determine whether the resource transfer should be approved and to accomplish an approved resource transfer. The senior director confirms the eligibility of the specified resource for transfer by performing a series of checks. The senior director first verifies that the resource for which the transfer is requested does not already belong to the weapons director requesting the resource transfer 2901. If the resource for which the transfer is requested already belongs to the weapons director requesting the transfer, the senior director terminates processing with the indication that the resource transfer is rejected. The senior director then checks whether the resource for which the transfer is being requested has its "destroyed" indicator set 2902. If so, the senior director terminates processing with the indication that the resource transfer is rejected.

Then, the senior director checks whether the resource for which the transfer is being requested is presently in the process of getting fuel 2903. If so, the senior director terminates processing with the indication that the resource transfer is rejected. The senior director then checks whether the resource for which the transfer is being requested has its "committed" indicator set 2904. If so, the resource for which the transfer is being requested is otherwise engaged and not eligible for transfer, and the senior director terminates processing with the indication that the resource transfer is rejected. If the resource for which the transfer is being requested has a non-null "group" reference, meaning that the resource for which the transfer is being requested belongs to a group of resources, the senior director terminates processing with the indication that the resource transfer is rejected.

If the resource for which the transfer is being requested has a non-null "order" reference, meaning that this resource was given an order and is executing it, and if the order to which the "order" reference of the resource for which the transfer is being requested is a CAP order 2906, the resource is important for defending the position of the weapons director presently responsible for managing this resource, and the senior director terminates processing with the indication that the resource transfer is rejected. Otherwise, the senior director enacts the resource transfer. The resource for which the transfer is being requested is removed from its weapons directory 2906 and added to the weapons director of the weapons director requesting the resource transfer 2907, then the senior director terminates processing with the indication that the resource transfer has been approved and performed.

Recommendation

The Recommendation class embodies the recommendations passed by the agent to the weapons directors it automates, to the human users who act for particular weapons directors, and by the human users acting for particular weapons directors to the weapons directors they act for (to elicit actions or give orders to the resources they manage). FIG. 30 describes the representation of a Recommendation class object.

Each recommendation has a unique identified string "name". Each recommendation has a reference "towhom" to the weapons director object for which the recommendation is intended. Each recommendation contains a list of resources "R" managed by the weapons director this recommendation is intended for that are affected by this recommendation. Associated with a recommendation is "order", the actual Order class or subclass object this recommendation prescribes to the resources in its list of affected resources. Each recommendation also contains a verbal description string "desc". In addition, each recommendation has the following logical indicators:

"accepted"—indicating that a recommendation has been accepted by a weapons director and will be followed "transfer"—indicating that this recommendation is only valid after the specified affected resource(s) is/are transferred from some other Weapons director to the weapons director for whom this recommendation is intended, and after a permission for this transfer is given by the senior director.

Order

Each of the specific order classes (TARGET, RTB, GO, TANK, JOIN, and SPLIT) is a container for order-specific information appropriate to its order type. So, order TARGET includes the reference to the resource to be targeted, order RTB includes either a reference to the base towards which to proceed or a null base reference, indicating return to the default assigned base, order GO includes a set of destination coordinates, order TANK includes a reference to a specific tanker, order JOIN includes a reference to a group of resources to join, and order SPLIT includes no additional information (it is assumed that after a resource is split from a group, it will be provided a specific order to perform).

Agent

The overview of the agent resource allocation algorithm is as follows. For each director, the agent determines the list of enemy resources that must be handled, and for each resource determines its strength, speed, and time available for handling. The agent then builds a list of available resources, and for each available resource determines its strength, speed, pilot fatigue factor, and remaining flight time. Then, for each enemy resource, the agent builds a list of candidates for handling (i.e., our resources that could dispatch this enemy resource). Then, the agent processes the list of our resources and determines handlers for each enemy resource (starting with the shortest candidate list), and if a handler is not available, the agent adds the corresponding enemy resource to the list of resources to be handled by the team. Then resource commitment is performed, and recommendations are generated for each director. Subsequent to that, for each enemy resource which has been labeled "team responsibility", the same processing is repeated, but this time without regard to responsibilities and resources of specific weapons directors, and then the commitment process is performed again and team recommendations are generated (note that team recommendations involve transfer of resources between weapons directors and required approval by the senior weapons director in order to be enacted). A more detailed description of the above is provided hereafter.

Figure 31:
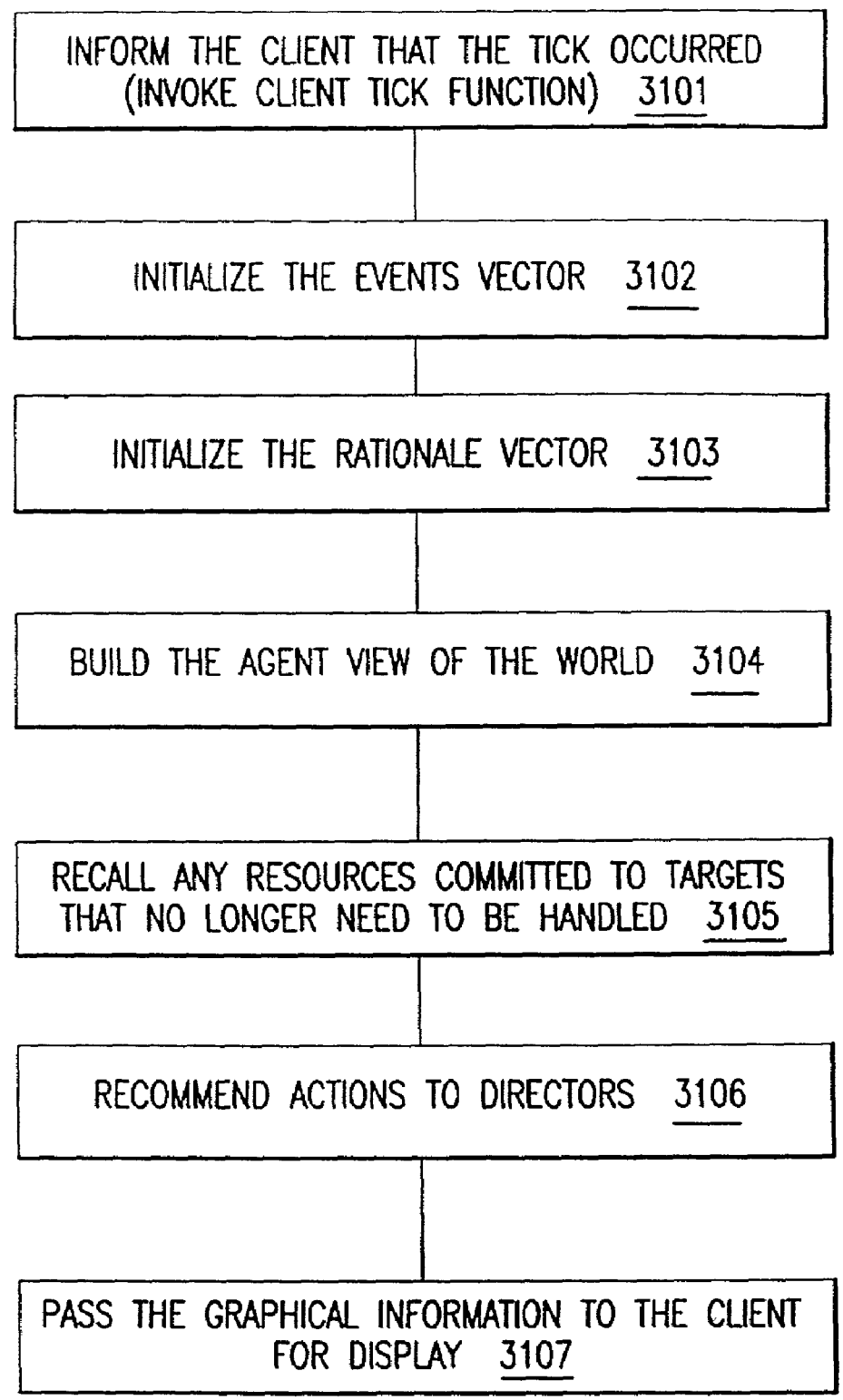
FIG. 31 shows the simulation tick processing by the intelligent agent.

FIG. 31 describes processing performed by the agent at each tick of the simulation. The clients are informed that the tick has occurred 3101. The events and rationale vectors, containing textual descriptions of events at every tick of the simulation that are of interest to the weapons directors, and the textual rationale for agent recommendations, respectively, are allocated 3102, 3103, and the agent view of the world table is built 3104. The agent view of the world table is the representation of the simulated resources as seen by the agent; the agent view of the world may differ from reality with respect to recognition of some resources. In the described embodiment, it is assumed that all the resources are known to the agent. However, in an alternate embodiment, it is possible that the agent may not receive the resource information directly from the simulator, but be instead required to recognize the objects it observes based on their observable characteristics and behavior. In another alternate embodiment, the agent may be receiving the world information not from the simulator, but from a real-time device (e.g., radar), observing real-world (not simulated) objects. Any resources that are currently committed to targets that no longer need to be handled are recalled 3105 and recommendations are generated for weapons directors 3106 which will tell weapons directors what, in the opinion of the agent, is their best course of action for the current tick in order to best accomplish their strategic and tactical goals. In the described embodiment the goals are to prevent enemy from destroying our planes or attacking our bases. In an alternate embodiment, the goal may something else, e.g. to optimize the attack by our bombers of a ground enemy target.

Figure 32:
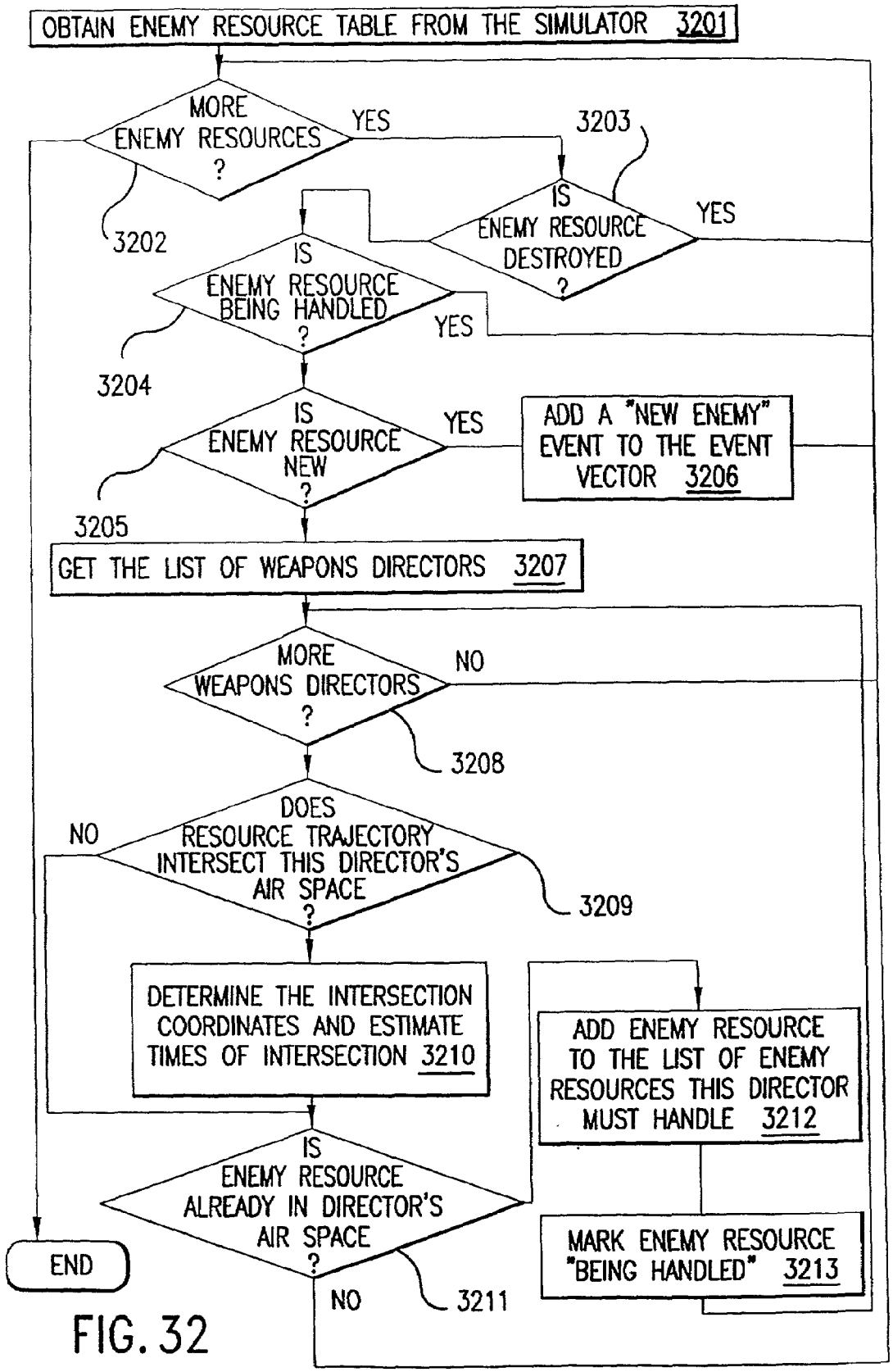
FIG. 32 shows the process of building the intelligent agent view of the world.

FIG. 32 describes the process of building the agent view of the world table at each tick. The agent obtains a list of enemy resources from the simulator 3201, and while there are enemy resources in the list 3202, for each enemy resource in the list, the following consideration is performed by the agent. If the enemy resource has been destroyed 3203, it is ignored. If the enemy resource is already being handled by one of our weapons directors' planes 3204 it is ignored. If the enemy resource is new 3205 (i.e., it just appeared and did not exist in the agent's view of the world during the previous tick of the simulation), an event is entered into the events vector 3206, indicating appearance of a new enemy resource to the weapons director(s). Since the movement of the new resource is yet unknown, handling of the resource is postponed until the next tick of the simulation and the resource is temporarily ignored.

Then, movement of each resource is projected and reviewed for potential intersection with the air space of each weapons director as follows. The list of weapons directors is obtained from the senior director 3207. While there are more unprocessed weapons directors in the obtained weapons directors list 3208, for each weapons director, the following is performed. The agent checks whether the projected trajectory of the enemy resource under consideration by the agent will intersect the air space of this weapons director 3209, and if so, the agent determines the intersection point coordinates and the estimated time of intersection 3210. If the enemy resource is already in the weapons director's air space 3211, the enemy resource object is added to the list of enemy resources this director must handle 3212. The enemy resource is then marked as "beingHandled" 3213.

Figure 33:
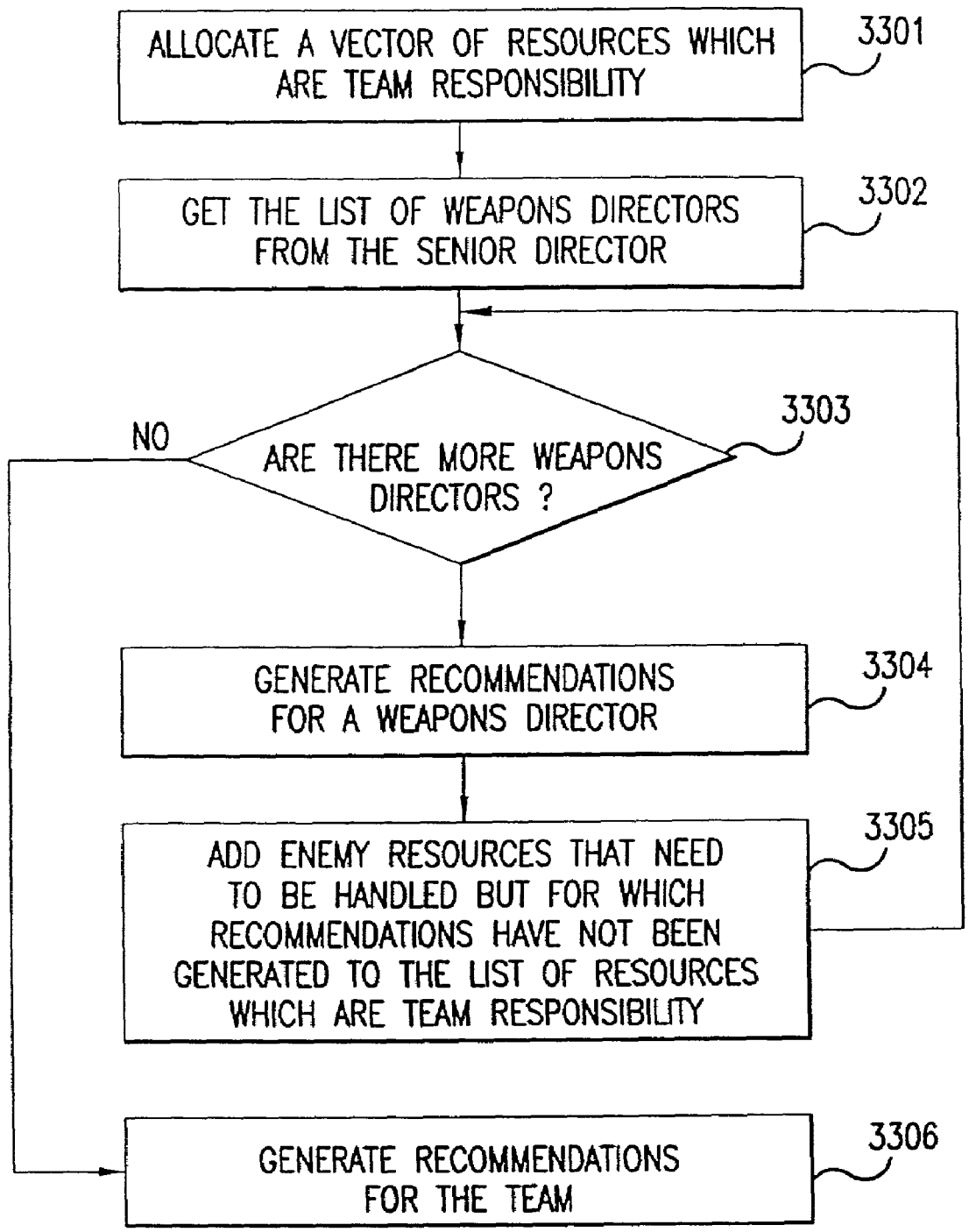
FIG. 33 shows the process of the intelligent agent making recommendations for weapons directors.

FIG. 33 describes at the high level the processing of the agent for generating recommendations for weapons directors. At each tick of the simulation, a vector of enemy resources to be handled jointly by the team of weapons directors (rather than by a specific weapons director) is allocated and initialized to an empty vector 3301. The agent then obtains the list of weapons directors from the senior director 3302. While there are more unprocessed weapons directors in the previously obtained weapons directors list 3303, for each weapons director in the list, the agent performs the following. The agent generates recommendations for this weapons director 3304. Any enemy resources which need to be handled, but handling of which could not be recommended by the agent due to insufficient or incapable resources of this weapons director, is added to the previously allocated vector of resources to be handled jointly by the team of weapons directors 3305. Upon completion of the weapons directors list traversal, the agent generates recommendations for the team of weapons directors against the accumulated list of enemy resources which are a team responsibility 3306.

Figure 34:
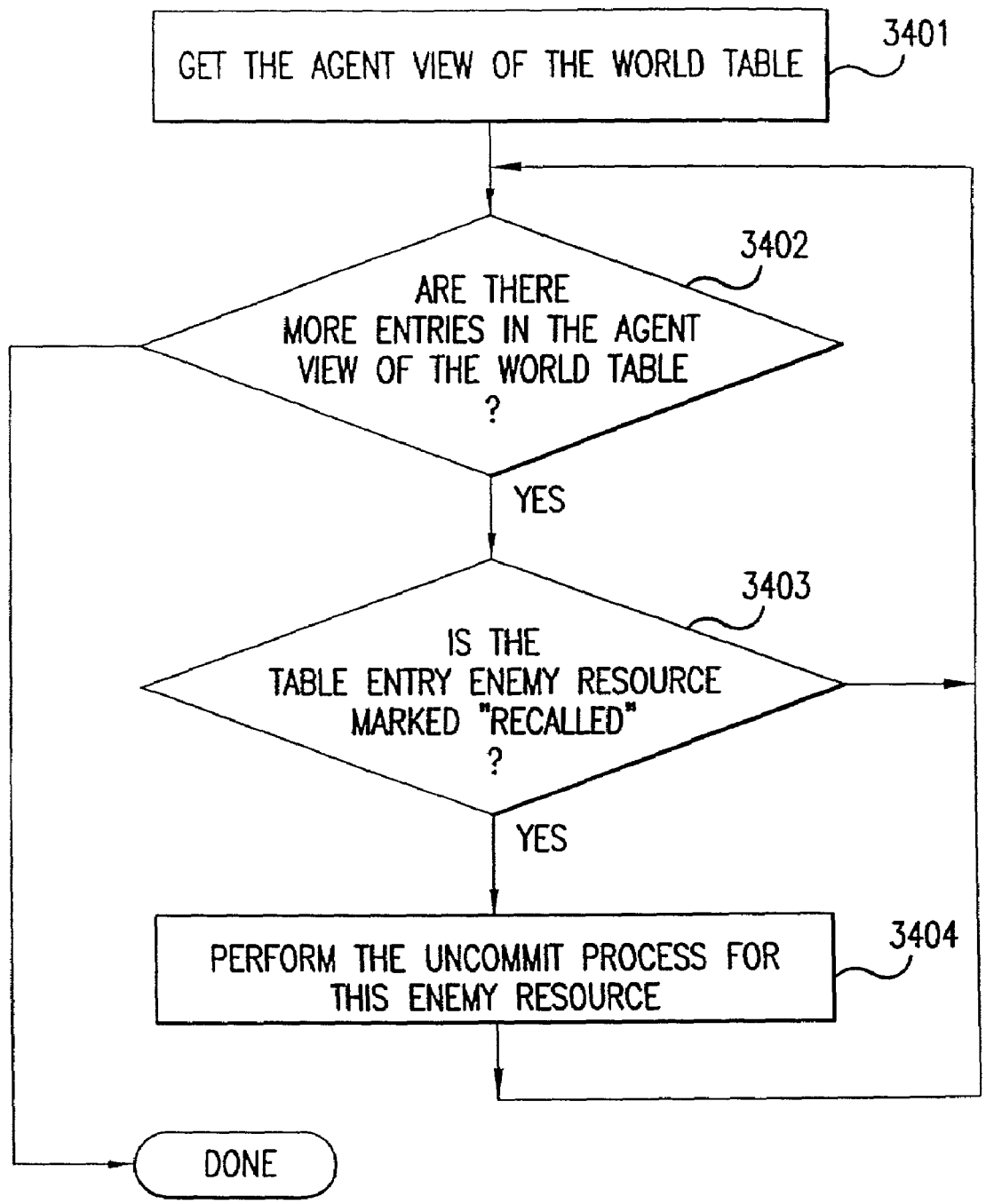
FIG. 34 shows the process of recalling committed resources from target that no longer need to be handled.

FIG. 34 describes the process of recalling committed resources from targets that no longer need to be attacked. The agent considers its view of the world table 3401. While there are unprocessed entries in the agent view of the world table 3402, for each entry in the view of the world table, the agent performs the following. If the enemy resource represented by this table entry is marked "recalled" 3403 (e.g., for some reason, it was previously determined that this enemy resource no longer poses a threat, and it was decided to free up any of our resources that were committed to handling this enemy resource), the uncommit process is performed for this enemy resource 3404. While the commit process is a process of establishing a mapping of a pair of two resources, where one resource is the enemy and another resource is ours, assigned to destroy the aforementioned enemy resource, the uncommit process is the opposite—destroying the representation of a previously established commitment mapping thus freeing up committed resources for consideration by the agent.

Figure 35A:
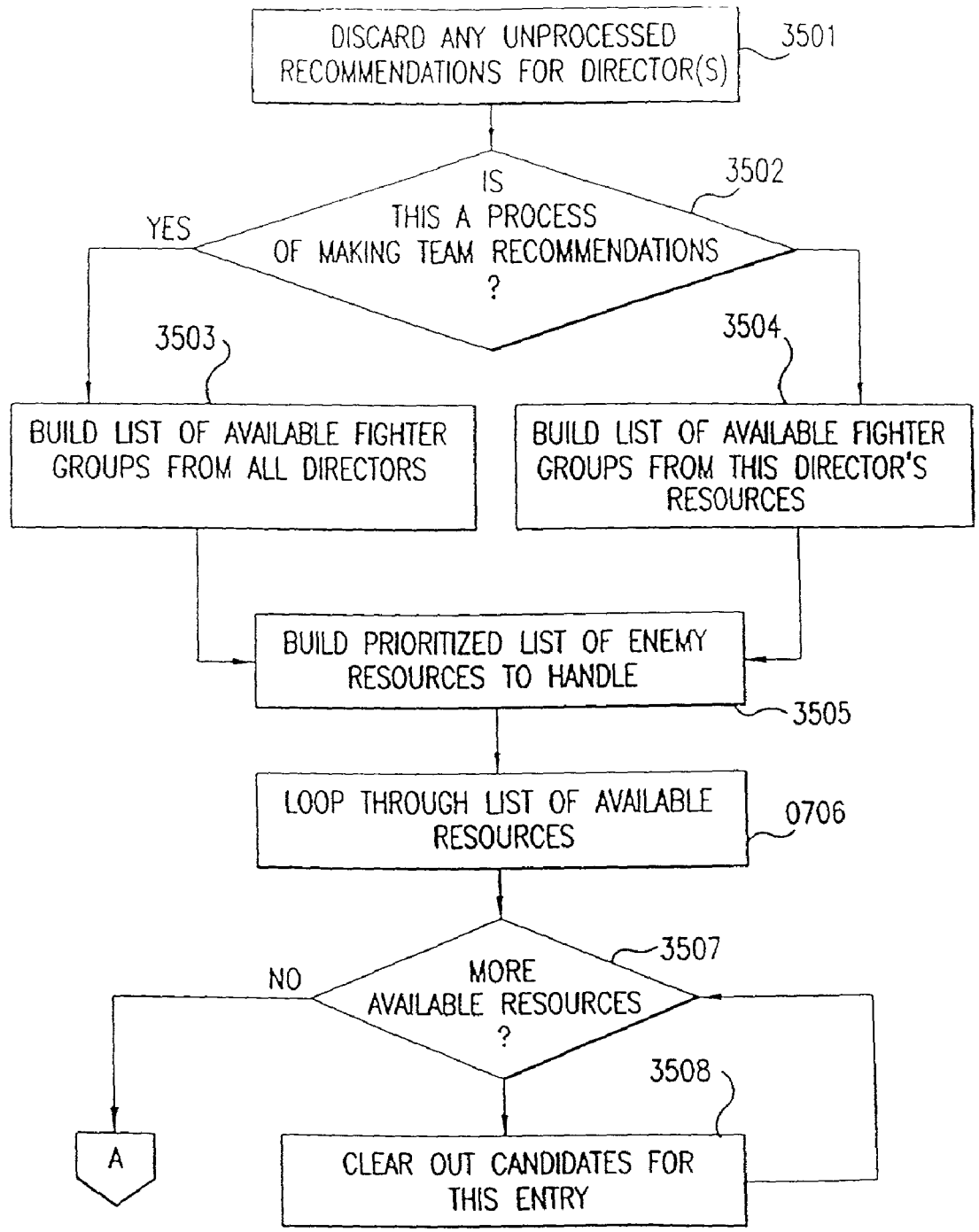
FIG. 35 shows the process of generating recommendation for a single weapons director or a team of weapons directors.
Figure 35:
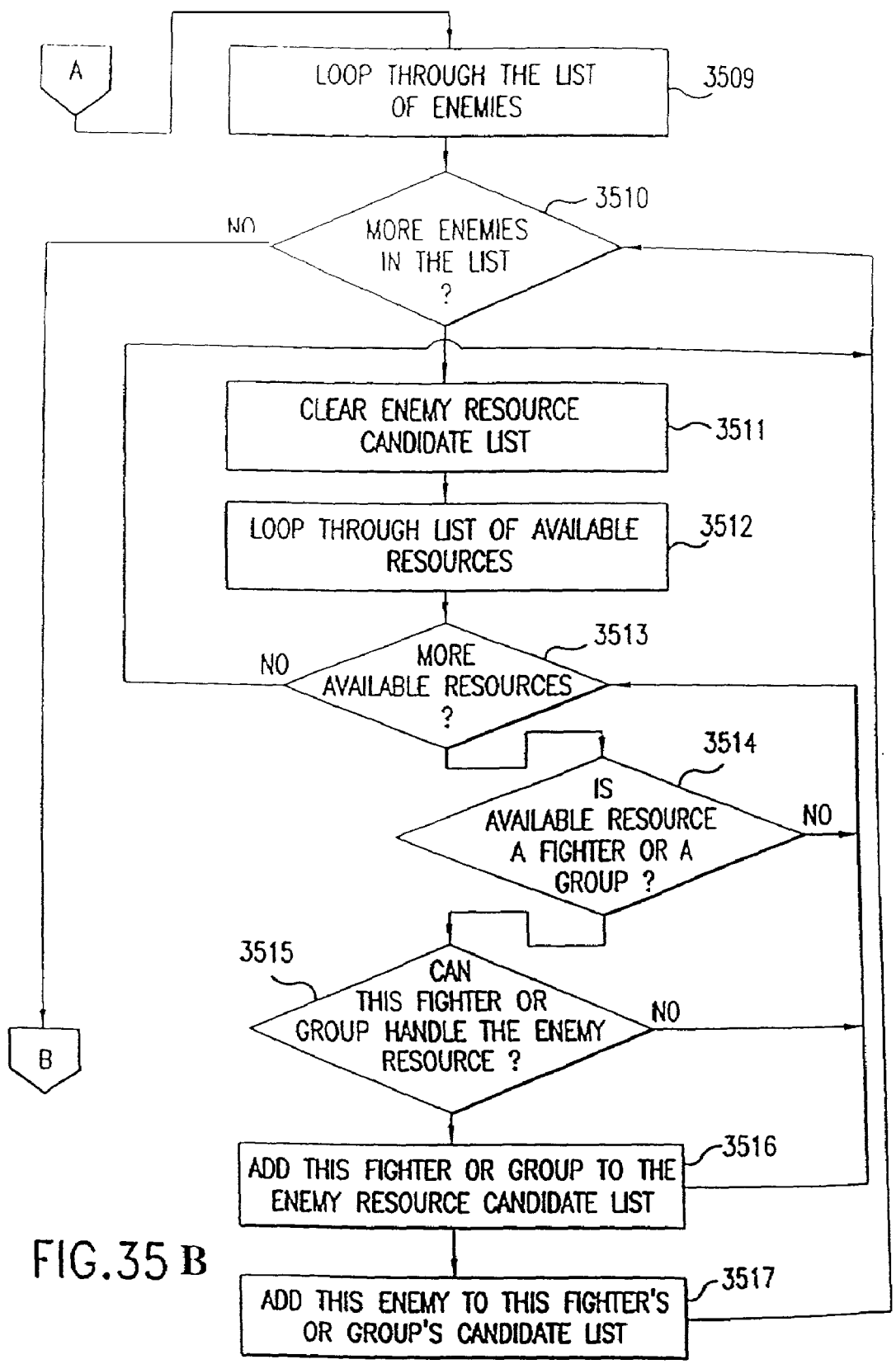
Figure 35C:
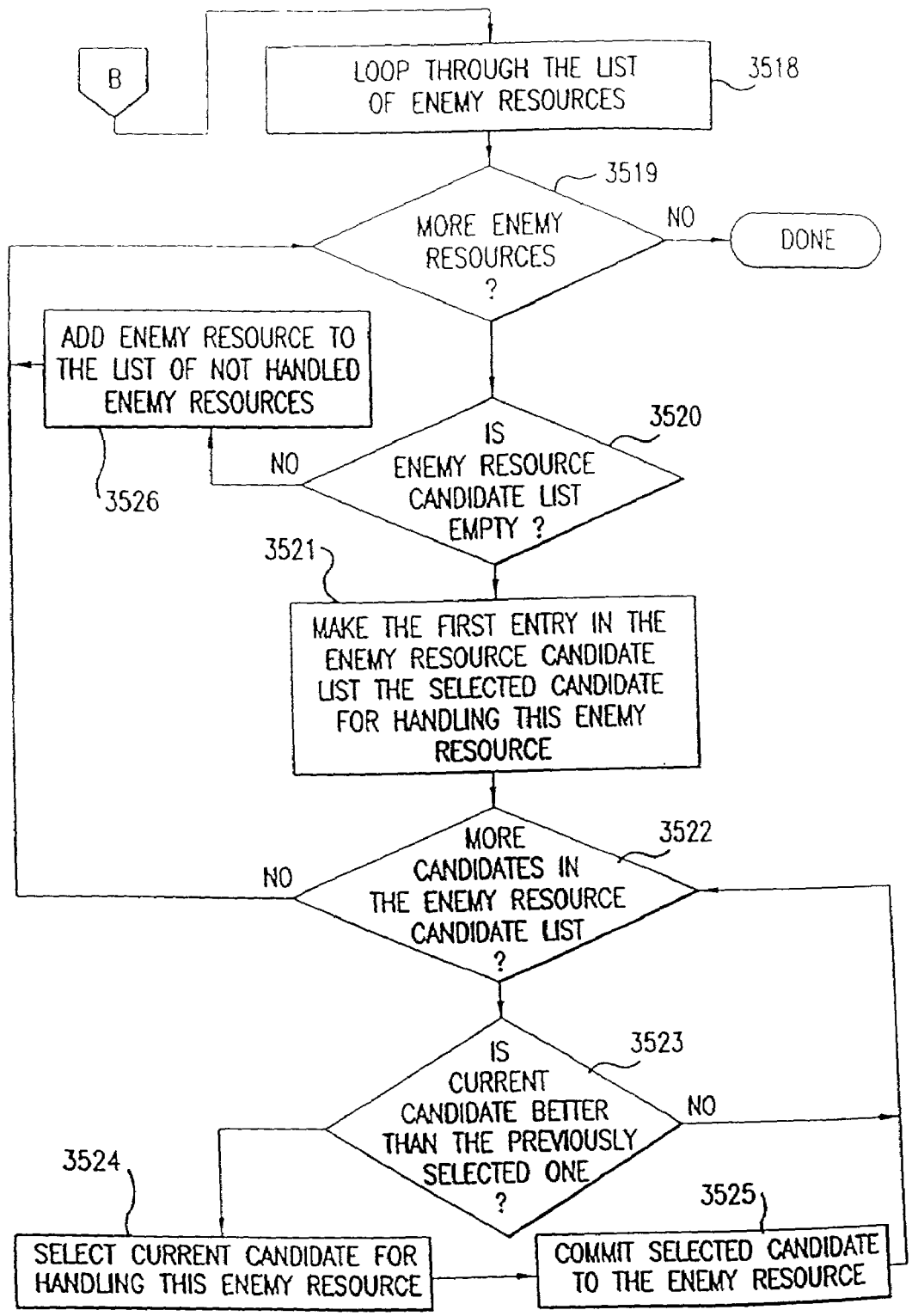

FIG. 35 describes generation of recommendations by the agent for a single weapons director or team of directors. First, any unprocessed recommendations for a weapons director or a group of weapons directors that are pending, are discarded 3501, since they originate from the previous tick and may no longer be valid. If this process has been invoked to generate recommendations for a team of weapons directors 3502, the list of our available fighter groups (AVAIL) is built from the fighter or fighter groups managed by all the weapons directors in the team 3503. Otherwise, if making recommendations for a single weapons director 3502, the AVAIL list is built from the resources this weapons director is responsible for managing 3504. Then, agent builds a prioritized list of enemy resources which need to be handled (ENEMY) 3505. The agent then ensures that our available resources (fighters or groups of fighters) in the AVAIL list have no candidates by clearing out their candidate lists.

The agent also considers the AVAIL list 0706. While there are unprocessed entries in the AVAIL list 3507, for each of our fighters or groups of fighters in the AVAIL list, the candidates list reference is set to null 3508. The candidates are then determined from the list of available resources for handling of each of the enemy resources in the previously built prioritized list. The ENEMY list is then processed 3509. While there are unprocessed entries in the ENEMY list 3510, for each entry in the ENEMY list the agent performs the following. The enemy resource list of candidates is cleared to be empty 3511. The agent then loops through the AVAIL list 3512, and while there are unprocessed entries in the AVAIL list 3513, for each entry in the avail list, if this AVAIL list entry is a fighter or a group of fighters, 3514, the agent determines whether this fighter or group of fighters is capable of handling this enemy resource 3515. If this fighter or group of fighters from the AVAIL list is capable of handling this enemy resource, this fighter or group of fighters is added to the enemy resource list of candidates 3516, and the enemy resource is added to our fighter or group of fighters list of candidates 3517.

The selection of candidates for each of enemy resources in the previously built prioritized ENEMY list is performed as follows. The agent loops though the ENEMY list 3518. While there are unprocessed entries in the ENEMY list 3519, for each enemy resource, the agent determines whether the ENEMY resource candidates list is empty 3520. If there are entries in the ENEMY list, the first element from the enemy resource candidate list is temporarily considered to be the selected candidate for handling this enemy resource. While there are more candidates in the enemy resource candidates list 3522, for each candidate determine whether it is a better choice for handling this enemy resource than the currently selected candidate 3523, and if so, this entry from the enemy resource list of candidates is considered to be the selected candidate for handling this enemy resource 3524. Then the resource commitment for the selected candidate and the enemy resource under consideration is performed 3525. If, however, the enemy resource candidates list was empty 3520, the enemy resource is added to the list of enemy resources that were not handled by this process 3526.

Figure 36A:
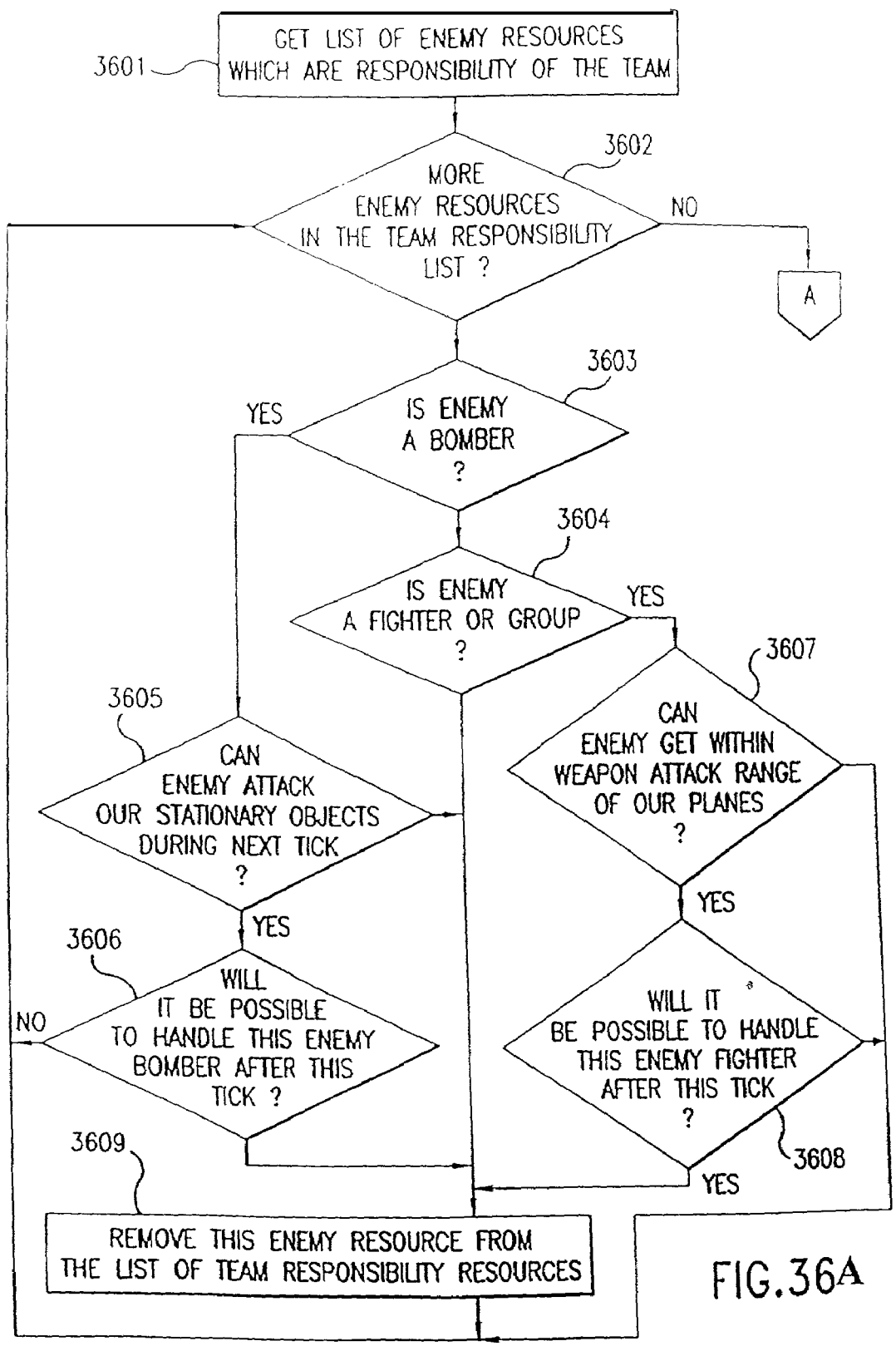
FIG. 36 shows the process of generating team recommendations.
Figure 36:
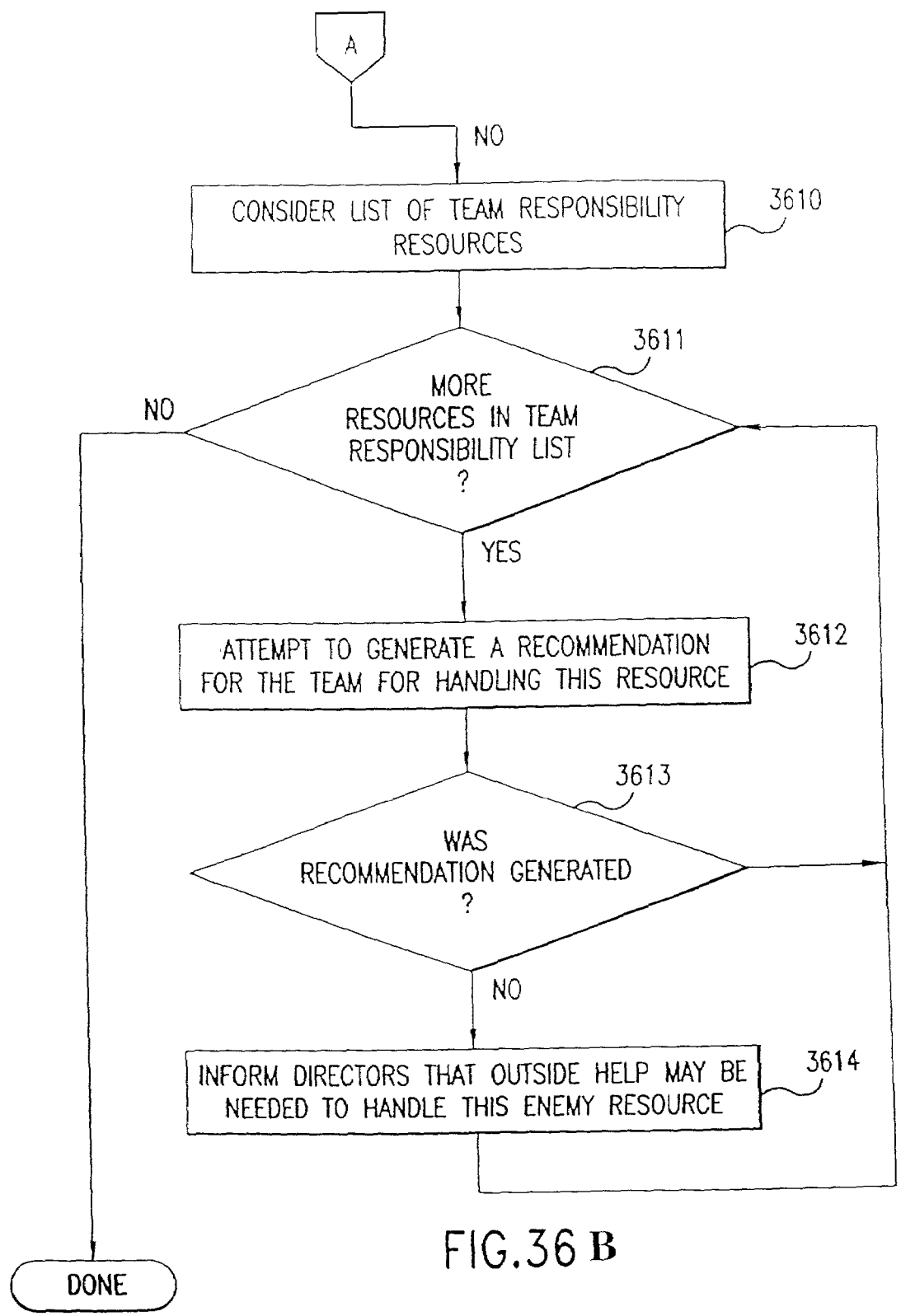

FIG. 36 describes the details of the process of generation of team recommendations by the agent (i.e., recommendations for handling of the enemy resources that cannot be handled by a single weapons director due to shortage, unavailability, or insufficient strength of resources managed by that director, and which are considered to be the responsibility of the whole weapons directors' team). In the previous processing, the agent has determined the list of resources which it considers to be weapons directors team responsibility. The agent now considers this list 3601. While there are unprocessed enemy resources in the list 3602, for each of the enemy resources in the list, the agent performs the following. First, critical resources (i.e. those handling of which may not be delayed until the next simulation tick, and ignoring which would result and forfeiture of some or all of the tactical or strategic goals) are selected from the list of resources that are team responsibility.

If the enemy resource is a bomber 3603, the agent determines whether this enemy bomber can reach any of our bases or other stationary ground protected objects for attack during the time period equivalent to the duration of the tick of the simulation 3605. If the enemy bomber can attack our base by the next tick of the simulation, the agent considers this bomber, for example, a critical resource. Otherwise, even if this enemy bomber cannot perform its attack of our resources at the next tick of the simulation, but delaying its handling will place this enemy bomber in the position where none of our fighters can handle this bomber (e.g., the bomber will be too far or travelling too fast to intercept in time before it can attack our protected ground resources), this enemy bomber is still considered critical by the agent. "Critical" in this context means "must be handled immediately".

Of course, other definitions of critical may be used in the present invention. If the enemy bomber has not been determined to be critical, it is removed from the list of enemy resources that are the responsibility of the weapons directors' team 3609. Similarly, if the enemy resource under consideration is a fighter or a group of fighters 3604, a determination of its criticality is made based on whether this enemy fighter or group of fighters can get within weapon attack range of any of our planes 3607, or whether if handling of this enemy fighter or group of fighters is postponed until the next tick, this enemy fighter or group of fighters will be in a position where it cannot be handled 3608. If this enemy fighter or group of fighters is not deemed to be critical by the agent, it is removed from the list of enemy resources which are the responsibility of the weapons directors' team 3609.

Once the whole list of enemy resources that are considered to be the responsibility of the weapons directors' team is processed, it only contains critical resources that must be handled immediately. The agent then considers the list of critical enemy resources 3610. While there are unprocessed critical enemy resources 3611, for each critical enemy resource, the agent performs the following. The agent attempts to generate a recommendation for the team of weapons directors for handling this critical enemy resource 3612. If the recommendation has not been generated successfully 3613, the agent informs the weapons directors and the senior director about the unhandled critical enemy resource, indicating that outside help may be required to handle this enemy resource 3614.

Figure 37:
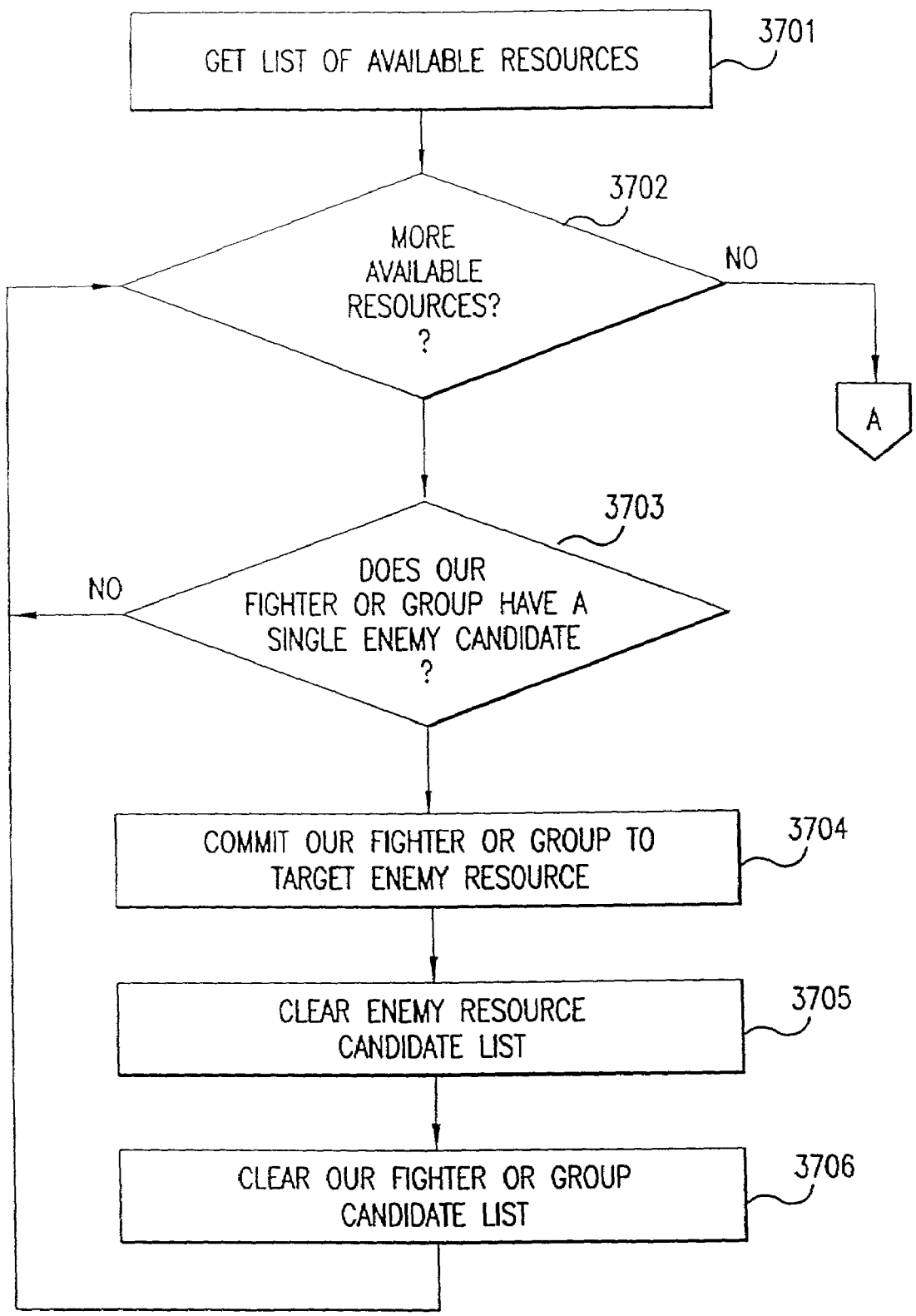
FIG. 37 shows the process of committing resources.
Figure 37:
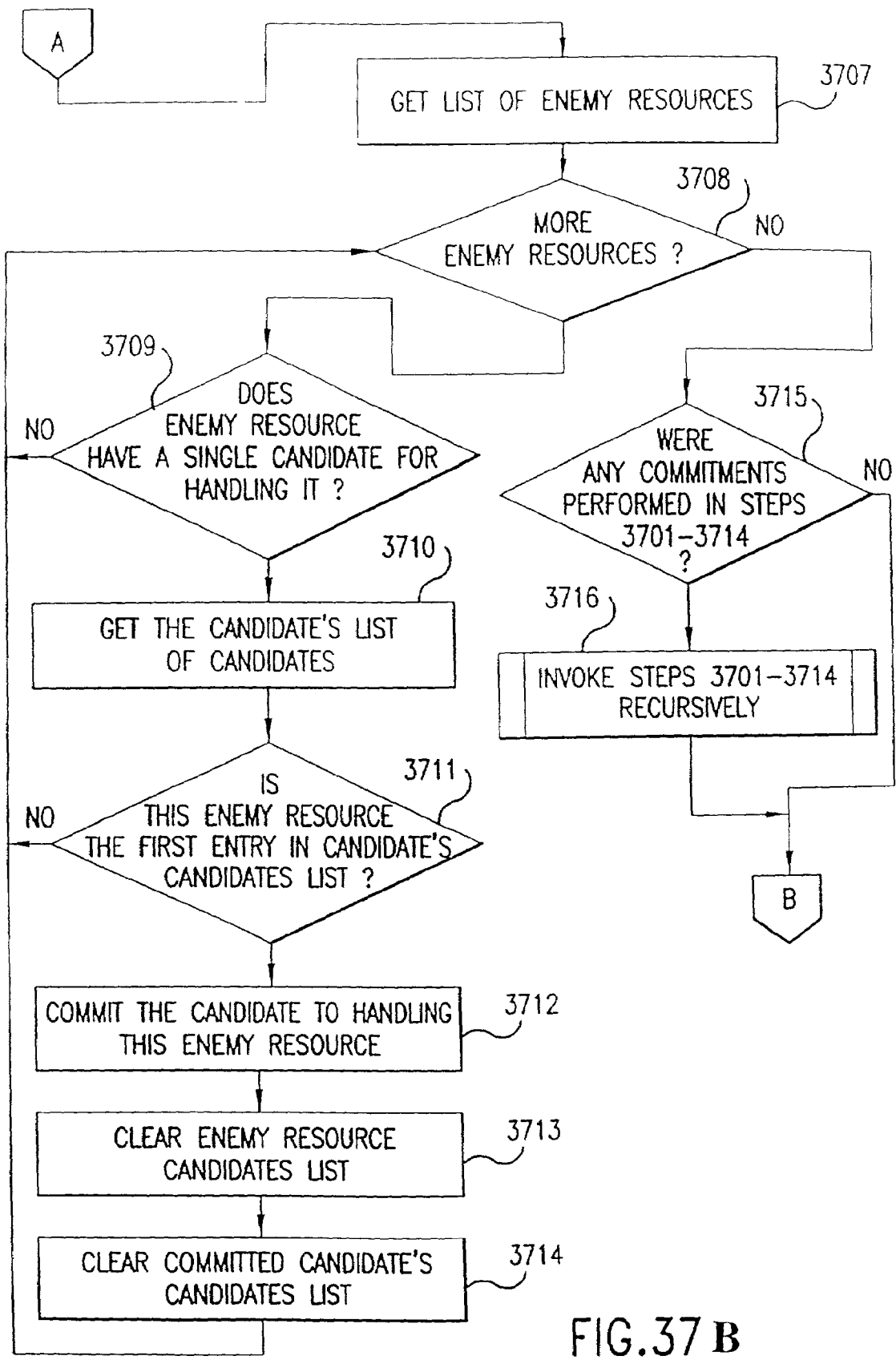
Figure 37C:
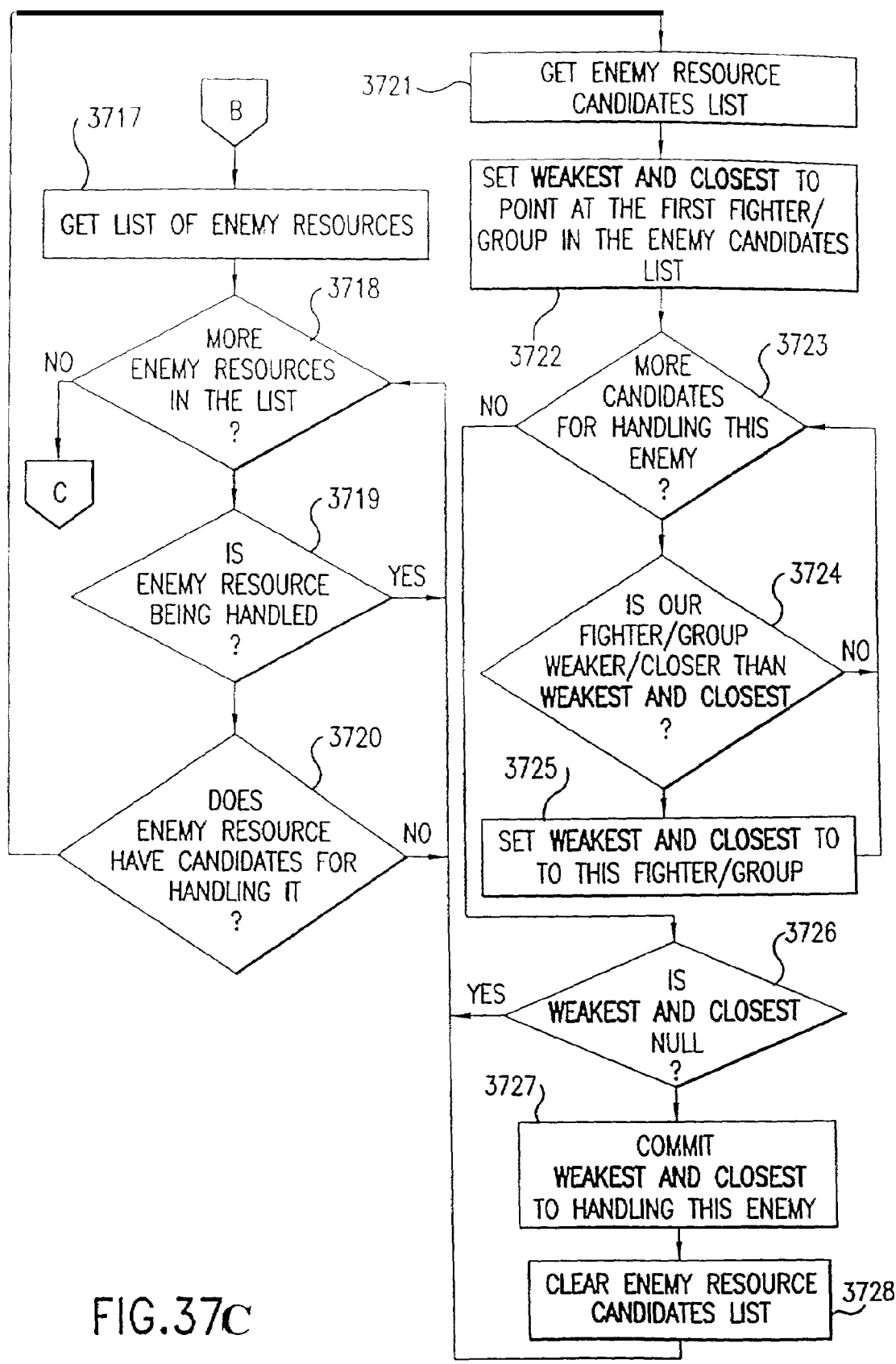
Figure 37D:
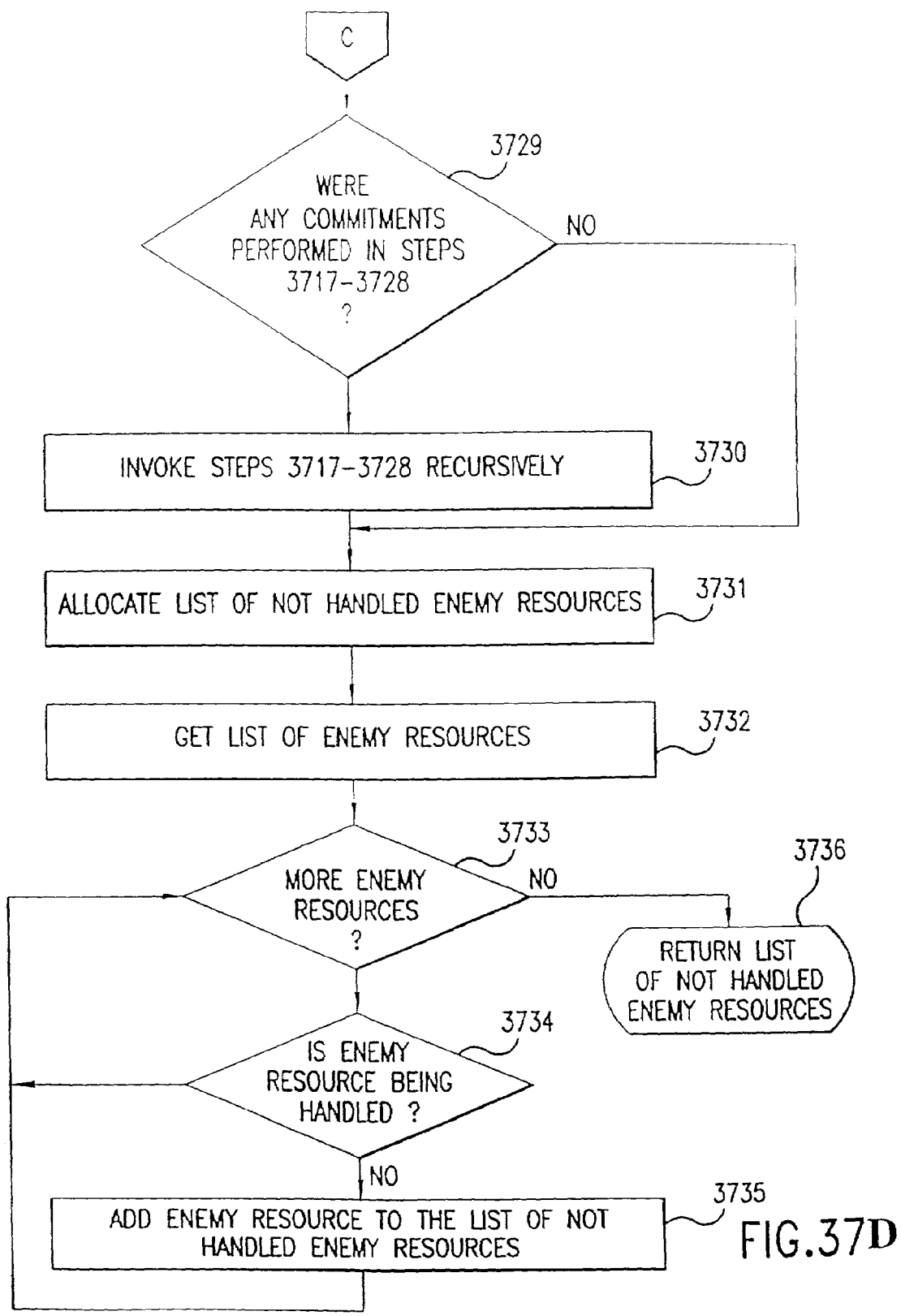

The process of resource commitment initiated by the agent is described in FIG. 37. The agent first initiates commitment for resources with a single candidate—either our resources which can only handle a single enemy resource, or enemy resources which only a single resource on our side can handle. The single resource commitment is followed by multiple resource commitment, where the agent makes a choice of a resource to commit from the list of available resources containing more then one entry. The agent considers the list of available resources 3701. While there are more unprocessed available resources in list 3702, the agent performs the following. If our fighter or group of fighters has a single enemy candidate in its list of candidates 3703, the agent commits this fighter or group of fighters to target the single enemy resource this fighter or group of fighters has in its candidates list 3704.

The agent then clears the enemy resource candidates list 3705 and the candidates list of our fighter or group of fighters for which commitment was performed 3706. The agent then considers the list of enemy resources 3707. While there are unprocessed enemy resources in the list of enemy resources 0808, the agent performs the following processing. If the enemy resource has a single candidate for handling it in its candidates list 3709, the agent retrieves the candidates list of our resource which is the candidate for this enemy resource 3710, and if this enemy resource is the first (i.e., the most important) entry in the candidates list of our resource 3711, the agent commits our resource to handling this enemy resource 3712. This is followed by clearing the enemy resource candidates list 3713 and the candidates list of our resource that was committed to handling this enemy resource 3714.

If any commitments were performed in the above steps 3701-3714 in step 3715, the agent repeats these steps 3716 to attempt more single resource commitments. Once an iteration with no single resource commitment performed takes place, the agent goes on to perform multiple resource commitments. The agent once again considers the list of enemy resources 3717. While there are unprocessed enemy resources in the list of enemy resources 3718, the agent performs the following for each enemy resource from the list. If this enemy resource has "beingHandled" indicator set 3719, the agent ignores it, as this enemy resource needs no additional involvement on the part of the agent. If this enemy resource has no candidates for handling it (i.e., its candidates list is empty) 3720, the agent ignores it. Otherwise, the agent retrieves this enemy resource's list of candidates 3721 and sets the reference WEAKESTANDCLOSEST to point at the first of our fighter or group of fighters in the enemy resource's candidates list 3722.

While there are more unprocessed entries in this enemy resource's candidates list 3723, for each of our fighters or group of fighters in this enemy resource's candidates list, the agent performs the following. If this fighter or group of fighters is weaker or closer than the previously determined WEAKESTANDCLOSEST fighter or group of fighters 3724, the agent resets WEAKESTANDCLOSEST reference to the current entry from this enemy resource's candidates list 3725. Upon completing the iteration through this enemy resource's candidates list, the agent checks whether the WEAKESTANDCLOSEST fighter or group of fighters has been determined 3726—that is our fighter or group of fighters which will be handling this enemy resource, and the agent performs the commitment of our WEAKESTANDCLOSEST fighter or group of fighters to this enemy resource 3727. Then the agent clears this enemy resource's list of candidates 3728.

If any commitments were initiated by the agent in the above steps 3717-3728 in step 3729, the agent repeats steps 3717-3728 to attempt more commitments 3730. This is repeated until an iteration with no commitments performed occurs. At the last phase of this process, the agent allocates the list of unhandled enemy resources 3731. The agent then again considers the list of enemy resources 3732. While there are unprocessed enemy resources in the list of enemy resources 3733, the agent performs the following for each enemy resource in the list of enemy resources. If this enemy resource does not have the "beingHandled" indicator set 3734, the agent adds this resource to the previously allocated list of unhandled enemy resources 3735. Upon completion of the processing, this method returns the list of unhandled enemy resources to its invoker 3736.

Figure 38:
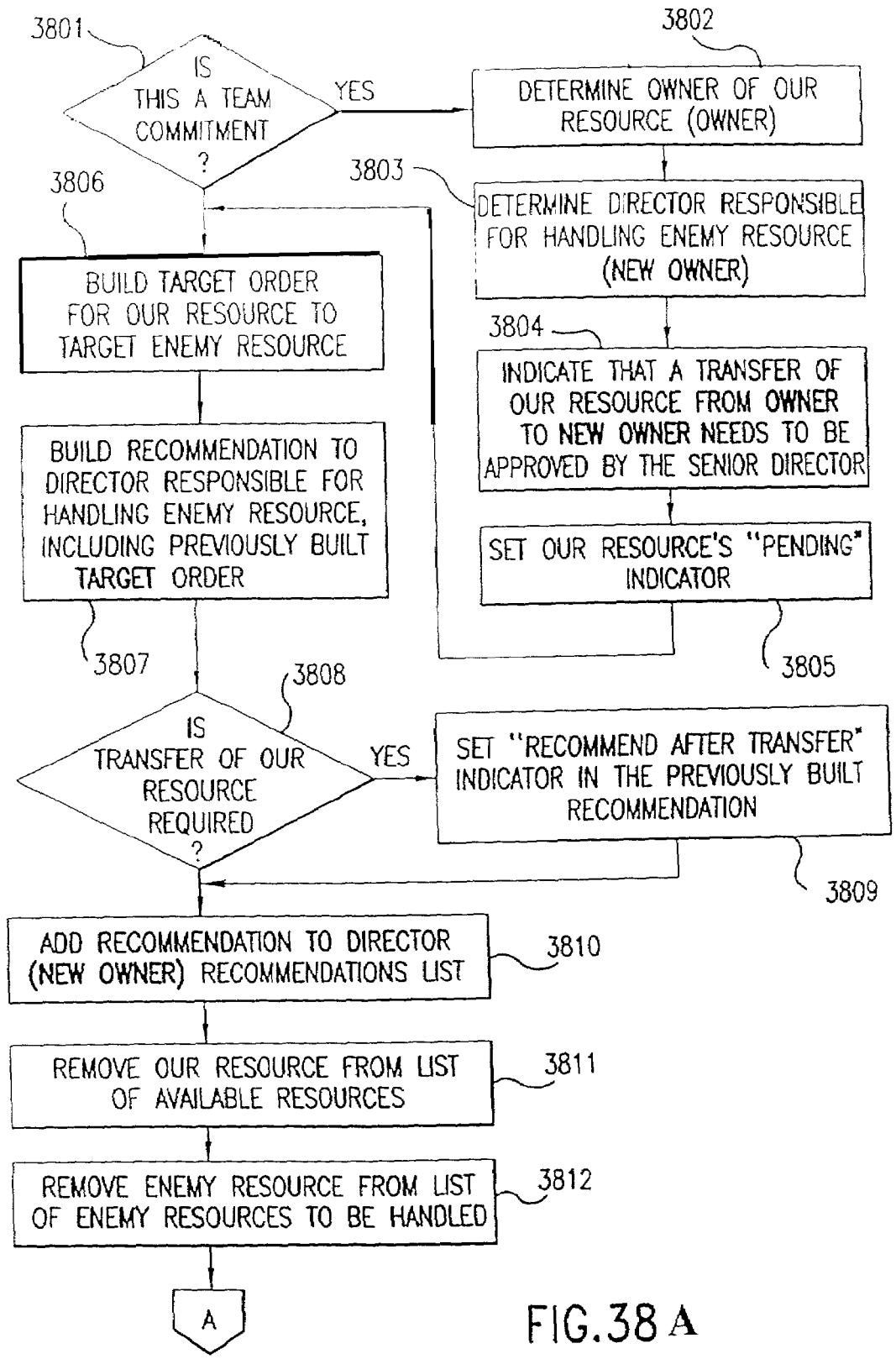
FIG. 38 shows the process of committing a specific pair of handler/handled resources.
Figure 38B:
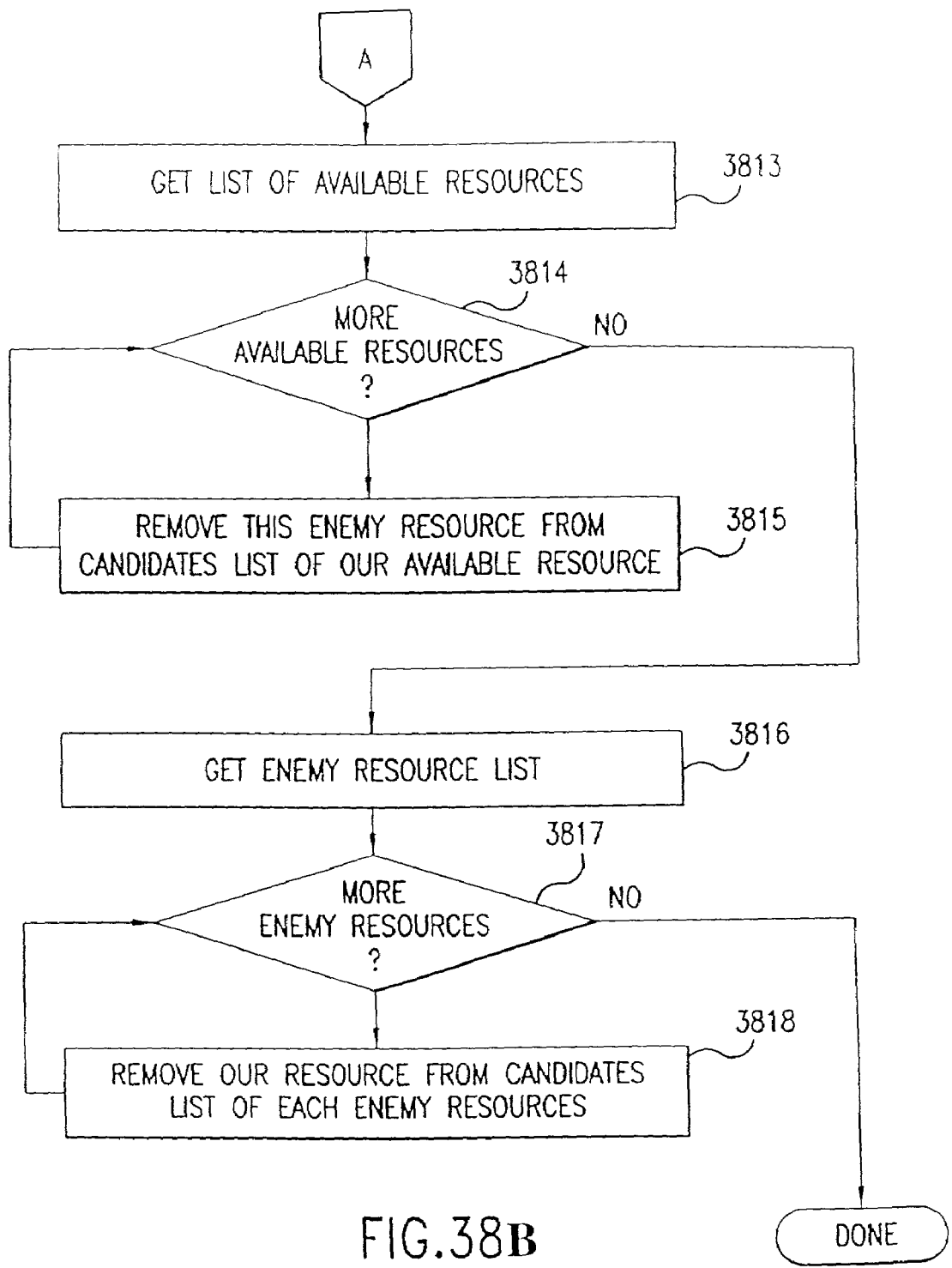

The process of committing a pair of handled/handler resources is described in FIG. 38. Prior to actual processing of recommendations by weapons directors, "commitment" means removal of resources from consideration for resource allocation until the next tick of the simulation. Other definitions for "commitment" may also be used as appropriate. The actual commitments of resources will be performed when weapons directors consider recommendations from the agent or issue orders. If this is a team commitment 3801, the agent determines the weapons director owning our resource, for which commitment is being attempted 3802, and the weapons director responsible for handling the enemy resource, for which commitment is being attempted 3803. The agent then indicates that a transfer of our resource from its owner to the weapons director responsible for handling the enemy resource needs to be approved by the senior director in order to perform this commitment 3804, sets our resource's "pending" indicator 3805 to indicate that a commitment is pending for this resource, builds a TARGET order for our resource to target the enemy resource for which the commitment is pending 3806, and generates the recommendation to the weapons director responsible for handling the enemy resource, attaching the previously built TARGET order 3807 (e.g., recommends that a TARGET order be issued for our resource, assigning it to target the enemy resource).

If transfer of our resource from its present owner to the weapons director responsible for handling the enemy resource is required 3808, the agent sets "recommendAfterTransfer" indicator in the previously built recommendation 3809, additionally recommending that the weapons director responsible for handling the enemy resource obtain permission from the senior director to transfer our resource from its present owner. The agent then adds the generated recommendation to the recommendations list of the weapons director responsible for handling this enemy resource 3810. The agent then removes our resource from the list of available resources 3811, and the enemy resource from the list of enemy resources that should be handled 3812. The agent then considers the list of available resources 3813. While there are unprocessed available resources in the list of available resources 3814, for each our available resource, the agent removes the enemy resource for which commitment was just performed from our available resource's candidates list 3815. Then, the agent considers the list of enemy resources 3816. While there are unprocessed enemy resources in the enemy resources list 3817, for each enemy resource from the enemy resources list, the agent removes our previously committed resource from this enemy resource's candidates list 3818.

Figure 39:
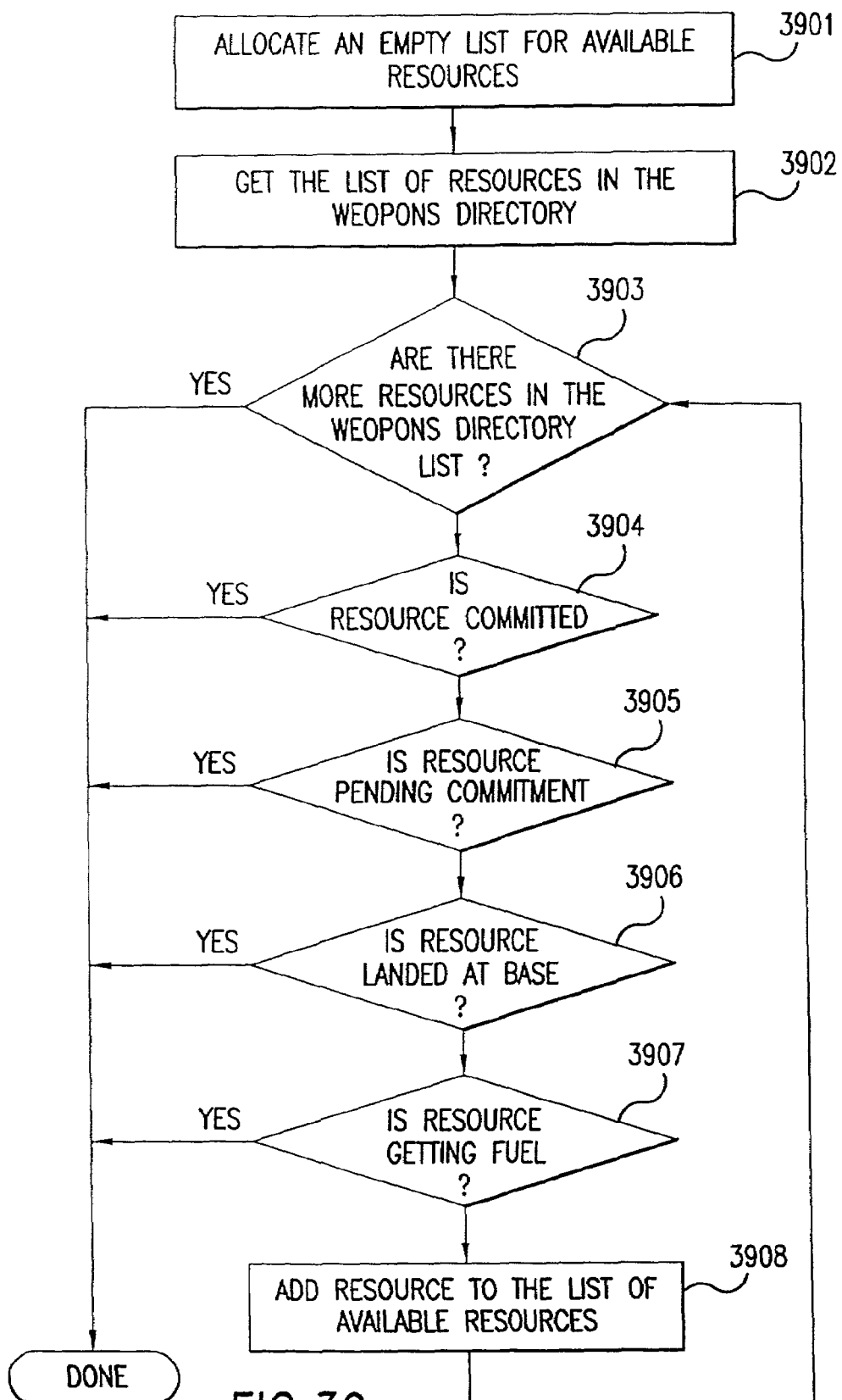
FIG. 39 shows the process of generating a list of available resources from a weapons directory.

FIG. 39 describes selection of available resources from a weapons directory and generation of the list of available resources. The agent allocates the list of available resources 3901. The agent then obtains the list of all resources in the weapons directory of the weapons director associated with this agent 3902. While there are unprocessed resources in the weapons directory resource list 3903, for each resource from the weapons directory resource list, the agent performs the following processing. If the resource has its "committed" indicator set 3904 (e.g., the resource is already committed to handling some enemy resource and is therefore not available), the agent ignores this resource. If the resource has its "pendingcommitment" indicator set 3905 (e.g., the resource is awaiting commitment which is yet to occur and is therefore not available), the agent ignores this resource. If the resource has its "atBase" indicator set 3906 (e.g., the resource is landed at base and is therefore not available), the agent ignores this resource. If the resource is getting fuel 3907 (e.g., the resource is fueling from a tanker and is therefore not available), the agent ignores this resource. If the agent has not previously determined that this resource is not available and should be ignored, the agent adds this resource to the previously allocated list of available resources 3908.

Figure 40:
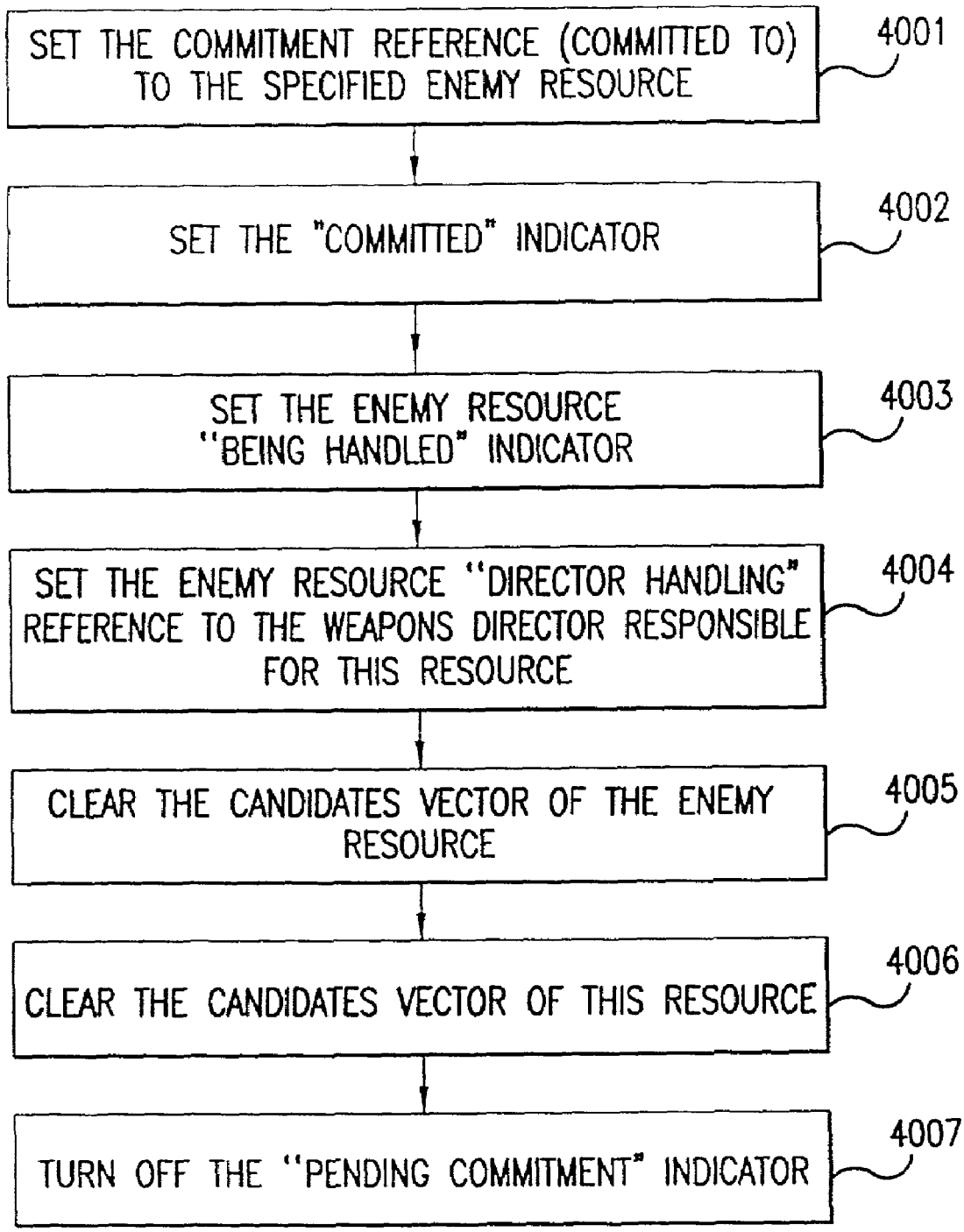
FIG. 40 shows the process of committing a resource.

FIG. 40 shows the actual process of commitment of our resource for handling an enemy resource. The process starts with setting the commitment reference (committedTo) of our resource to the enemy resource 4001. The "committed" indicator of our resource is then set 4002 to indicate that our resource is committed to handling an enemy resource. Then, the enemy resource "beingHandled" indicator is set 4003 to indicate that this enemy resource is being handled by us and that it should be excluded from future consideration by the resource assignment algorithm of the Agent. In addition, the "directorHandling" reference of the enemy resource is set to refer to the weapons director responsible for managing our resource which is committed to this enemy resource 4004. Then the candidates vector of the enemy resource and of our resource are cleared 4005, 4006, and the "pendingCommitment" indicator of our resource is turned off 4007, since the resource is now committed.

Figure 41:
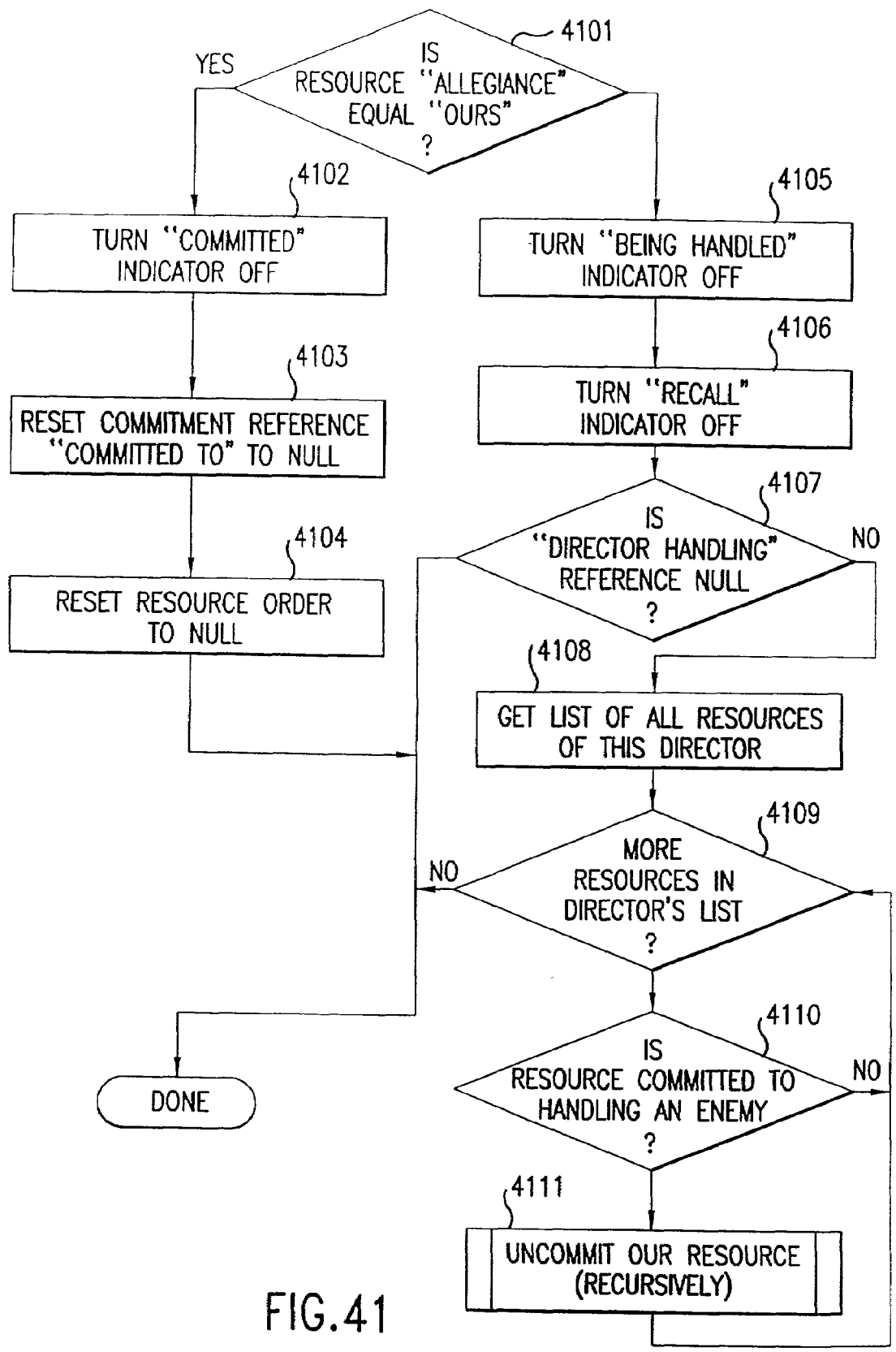
FIG. 41 shows the process of de-committing (termed "uncommitting") a resource.

FIG. 41 shows the process of uncommiting a resource, i.e., the substantially opposite of the process of committing a resource, described in FIG. 40. If the resource "allegiance" value is equals to "ours" 1301, the resource's "committed" indicator is turned off 4102, the resource's commitment reference "committedTo" is set to null 4103, and the resources order reference "order" is set to null 4104. Otherwise, if this is an enemy resource, the resource's "beingHandled" indicator is turned off 4105 and the resource's "recall" indicator is turned off 4106. Then, if the resource's "directorHandling" reference is not null 4107, the list of all the resources managed by the weapons director to which the "directorHandling" reference of this resource points is obtained 4108. While there are unprocessed resources in the previously obtained list of resources managed by the weapons director pointed to by the "directorHandling" reference of the resource for which the uncommit processing is being performed 4109, for each resource in the list, the following processing is performed. If the resource's "committedTo" reference is not null and points at the enemy resource being uncommitted 4110, uncommit processing steps 4101-4104 are recursively invoked to uncommit our resource 4111.

The agent algorithms described above have been tailored towards fighter attacks. Persons skilled in the art will understand that the same algorithm may be applied for bomber attacks or for other similar resource allocation needs. Additionally, it should be clear that boundary condition checks, such as, e.g., fuel or pilot fatigue (see below) verification, would result in the agent generating different types of recommendations, containing orders RTB (to return to base), TANK (to obtain more fuel), etc. Persons skilled in the art will also understand that the same algorithm may be applied in arbitrary applications, requiring resource allocation and involving human and agent participants. Among other possibilities, humans or agents may be recommended how to best manage a network, route telephone calls, manufacture a product from parts, and so on.

User Interface

The user interface embodies the means by which the users, in this case, weapons directors and the senior director, can interact with the program. Specifically, in this embodiment, the user interface performs the following functions:

present users with the information about events occurring in the simulation and actions performed by the airplane pilots permit users (weapons director and the senior director) to issue orders to the pilots manning the resources which the weapons directors are responsible for managing present recommendations from the agent to the weapons director allow users to control the speed of the simulation, restart the simulation, checkpoint the simulation state, or terminate the simulation allow each user to activate or deactivate the user's agent allow each user to log into the simulation or log out of the simulation allow weapons directors to communicate with the weapons directors for the purposes of resource transfer between weapons directors The user interface is an essential feature of the program, however, persons skilled in the art will understand that numerous alterations are possible with respect to the user interface, depending on the desired functionality of the program, the types of resources that are simulated, user preferences, etc. Persons skilled in the art will also understand that, although the preferred embodiment describes a windows-based graphical user interface, other types of interface are possible, such as non-graphical command-based user interface, character-mode (non-graphical) user interface, graphical user interface enhanced with sound, touch-screen graphical user interface, or virtual reality user interface.

Figure 42:
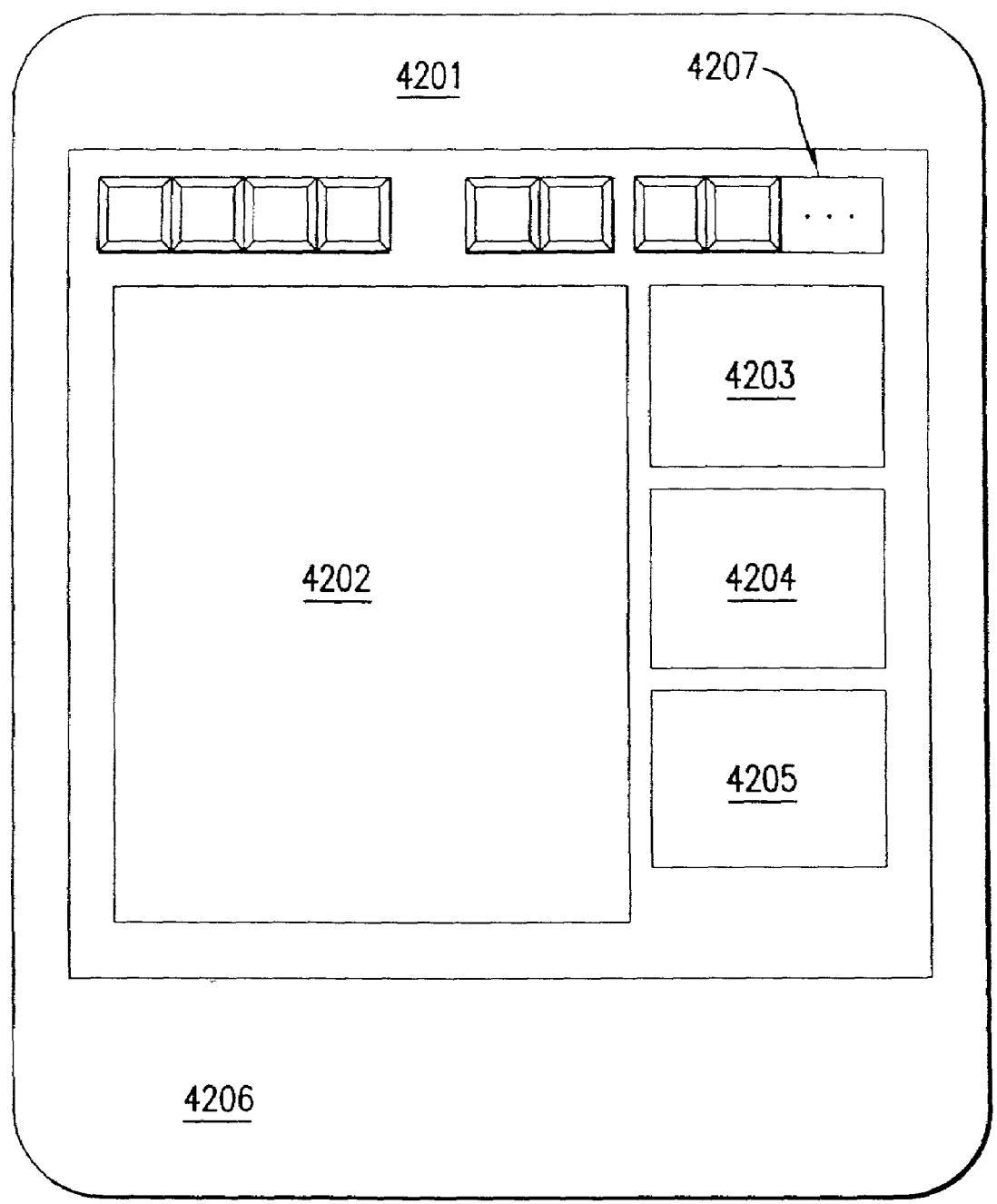
FIG. 42 shows a general layout of the user interface.

FIG. 42 shows an overview of the graphical user interface. The graphical user interface is a window 4401 on a computer monitor screen 4206, containing the following graphical elements: control panel 4207, primary graphical display area 4202, events display area 4203, resource status display area 4204, and an order entry/confirmation area 4205.

Figure 43:
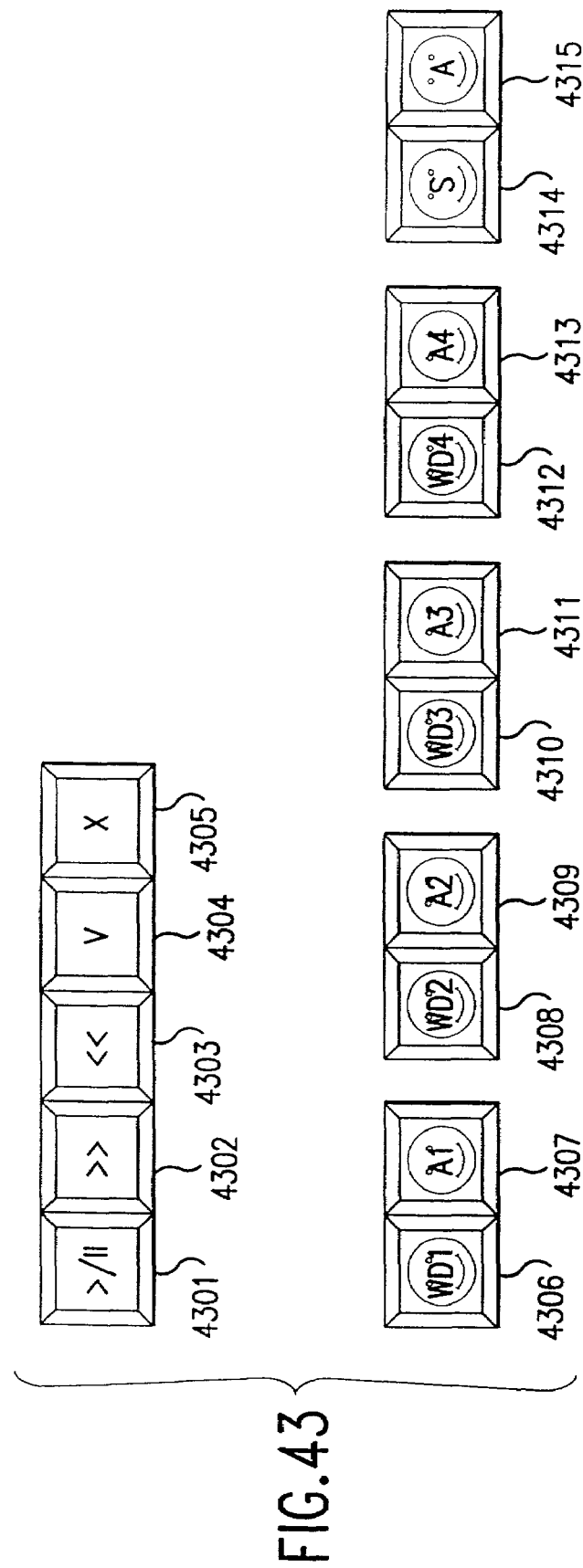
FIG. 43 shows user interface control buttons.

The control panel contains buttons that permit users to control the simulation as well as weapons director logon and agent activation buttons. FIG. 43 shows the details of the control panel. The simulation control section of the control panel includes the simulation start/pause button 4301, fast-forward button 4302, rewind button 4303, simulation state check-point button 4304, and exit button 4305. The user control section of the control panel contains a series of pairs of button, each pair corresponding to a single weapons director or a senior director. In the figure, there are four weapons directors (WD1-WD4) with the in/out button for each weapons director 4306, 4308, 4310, 4312, and a corresponding agent activation/deactivation button for each weapons director 4307, 4309, 4311, 4313, as well as the senior director button 4314 and the associated senior director agent button 4315.

Figure 44:
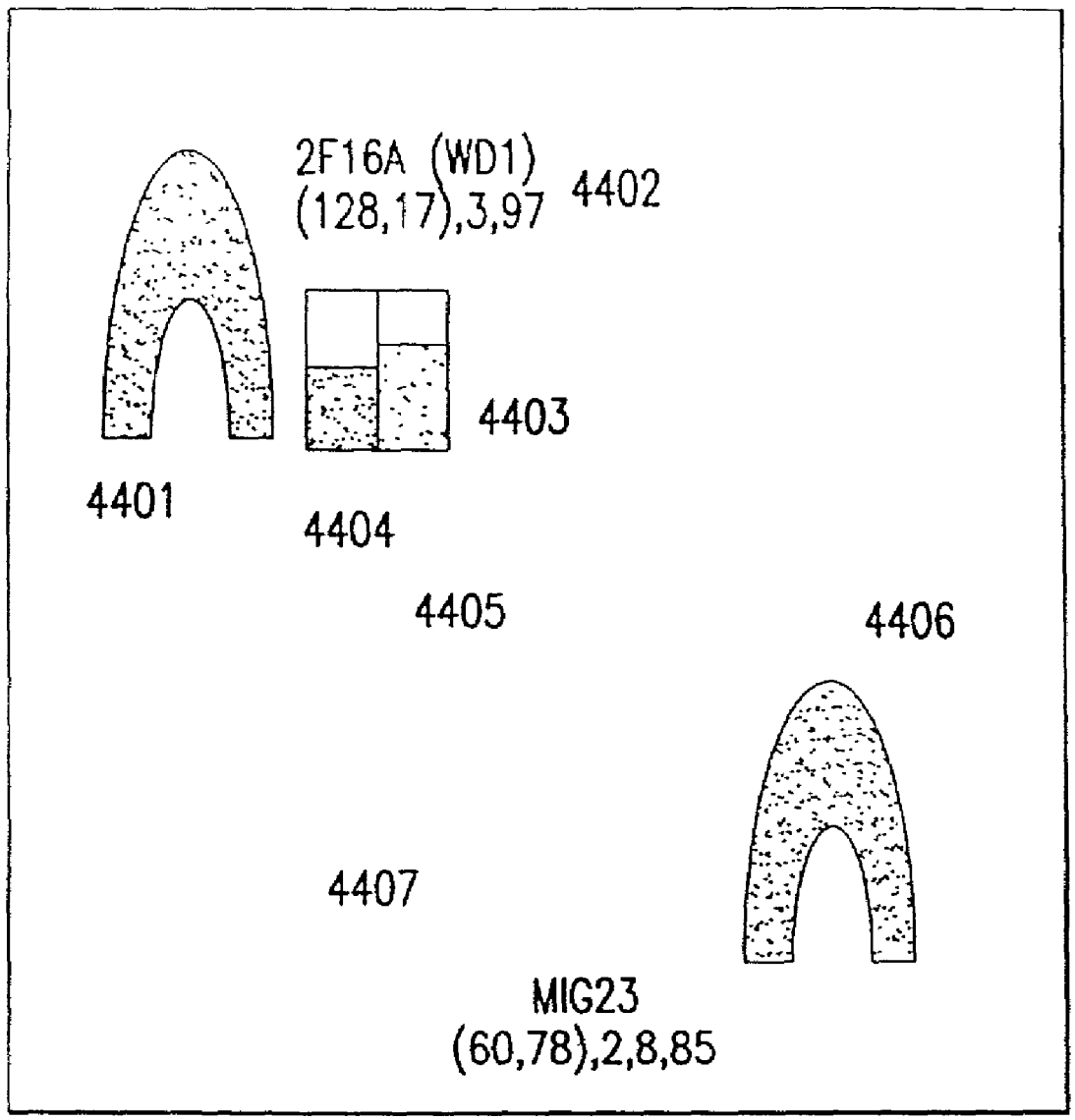
FIG. 44 shows a sample resource display in the primary graphical display area.

The primary graphical display area 4202 represents a map, with optional vertical and horizontal marks, showing the scale and locations of all of the simulated resources relative to the coordinate origin point. Each resource is represented by an appropriate symbol, corresponding to the type of resource, in the primary display area. FIG. 44 provides an example of resource display for one of our resources and one enemy resource. Our resource (in this case, a pair of F16 fighter planes) is represented by a blue symbol 4401. The enemy resource (in this case, a MIG23 fighter plane) is represented by a red symbol 4406. In general, color corresponds to resource allegiance (blue=ours, red=enemy, etc.). Each resource symbol is accompanied by a resource label 4402, 4407, showing the resource identifier, the identifier of the weapons director responsible for managing the resource, resource heading, altitude, and velocity. Depending on whether this information is known (i.e., for our resources), in addition to the resource label, a graphical histogram 4405 showing the amounts of fuel 4403 and ammunition 4404 possessed by the resource may also be shown.

Figure 45:
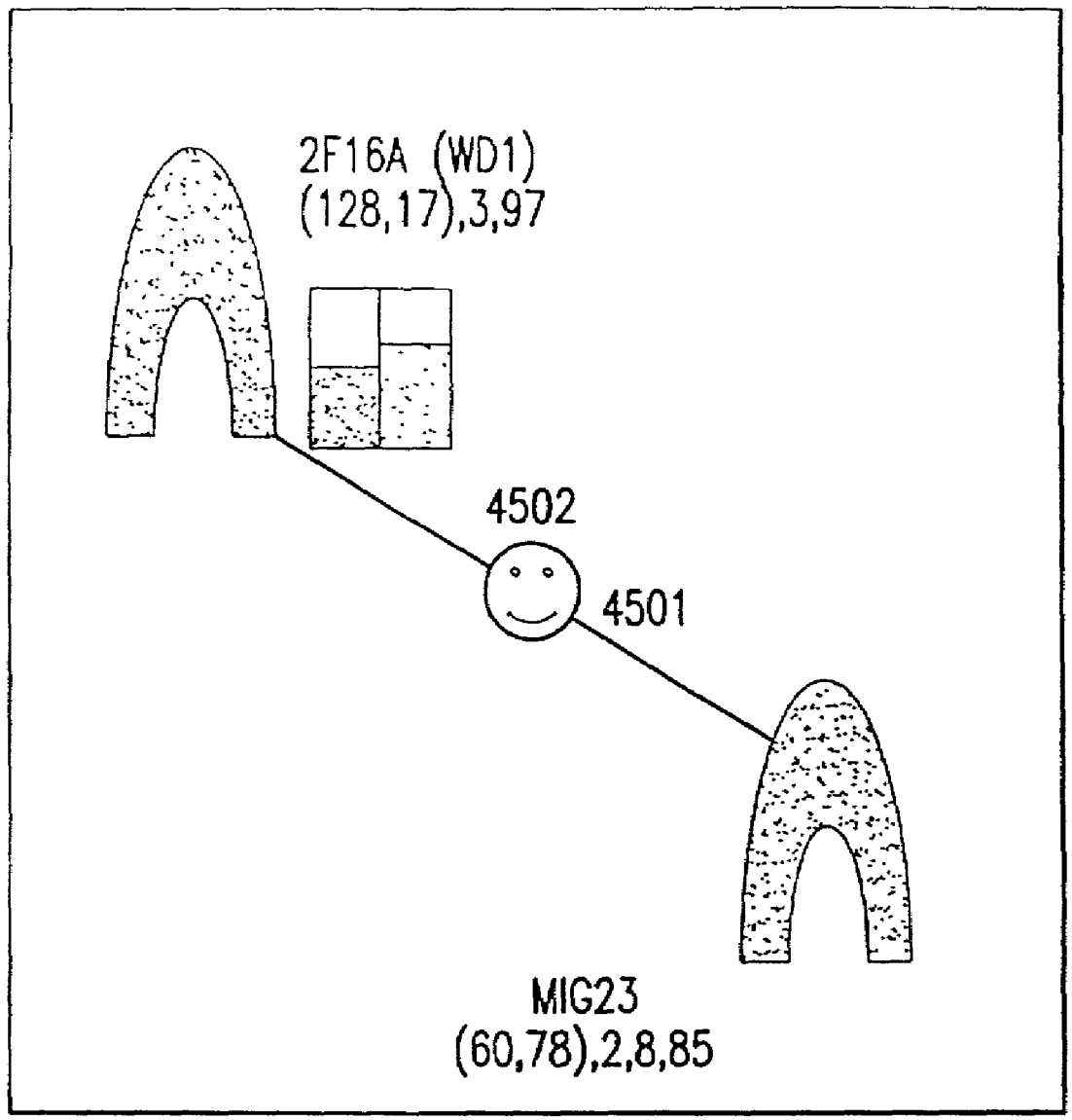
FIG. 45 shows a sample intelligent agent recommendation display in the primary graphical display area.

In addition to presenting resource locations and status for observation by the users, the primary graphical display area is also used for presentation of agent recommendations and provides the ability for the users to accept or ignore agent recommendations. FIG. 45 shows a sample recommendation from the agent. The line from 2F16A to the MIG23 symbols 4501 indicates that the agent recommends that our resource 2F16A target the enemy resource MIG23. The agent face symbol 4502 is blinking to attract the user's attention. The user can ignore the recommendation (by doing nothing) or accept it by double clicking the left mouse button in the area of the agent face (in which case the recommendation line and agent face will disappear from the screen).

In addition, the primary graphical display area is also used by the users for issuing orders to resources. A weapons director may only issue orders to the resources this director is responsible for managing. An attempt to issue an order to a resource managed by another weapons director will be interpreted as a request for the permission by the senior director to transfer this resource to the weapons director attempting to issue the order and cause the senior director button to blink. If the weapons director attempting to issue an order is indeed intending to request the senior director to permit transfer of this resource, the weapons director can depress the blinking senior director button and the resource transfer request will be presented to the senior director. If, upon consideration of this request, the senior director decides to approve the resource transfer, the senior director button will stop blinking and assume the green color. If, on the other hand, the senior director decides to reject the resource transfer request, the senior director button will stop blinking and assume the red color.

FIG. 46 shows the actions that can be performed by the weapons director on the screen and how they translate into weapons directors' orders. All the orders are issued by clicking the left mouse button on a resource and dragging the mouse pointer to another resource or particular area on the screen. Should an ambiguity be detected by the program, e.g., should there be more than one resource at the mouse click or release after drag point, the order entry/confirmation area is activated, presenting a user with the exhaustive choice of particular orders the user action could be translated and permitting the user to select one.

Figure 47:
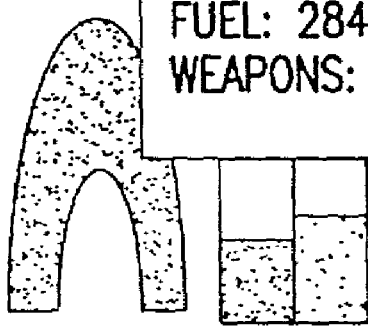
FIG. 47 shows a sample display of detailed resource information in the primary graphical display area.

The primary graphical display area also permits a user to examine a resource information in more detail than is provided by the default resource symbol and associated text. A click of the right mouse button when the mouse pointer points at a resource would result in a detailed display, showing all the essential known information about a resource. An example is shown in FIG. 47, where a detailed resource information display for 2F16A 4701 is shown, including the resource identifier "2F16A", the weapons director responsible for managing this resource "WD1", the resource heading "(128, 17)", the resource altitude "3", the resource velocity "97", as well as a detailed description of the resource "GROUP OF 2 F16", the order this resource is presently executing "TARGET MIG23", the degree of pilot fatigue "17", the amount of fuel remaining "284", and the remaining weapons "2 AIM 7, 4 AIM 9".

Figure 48:
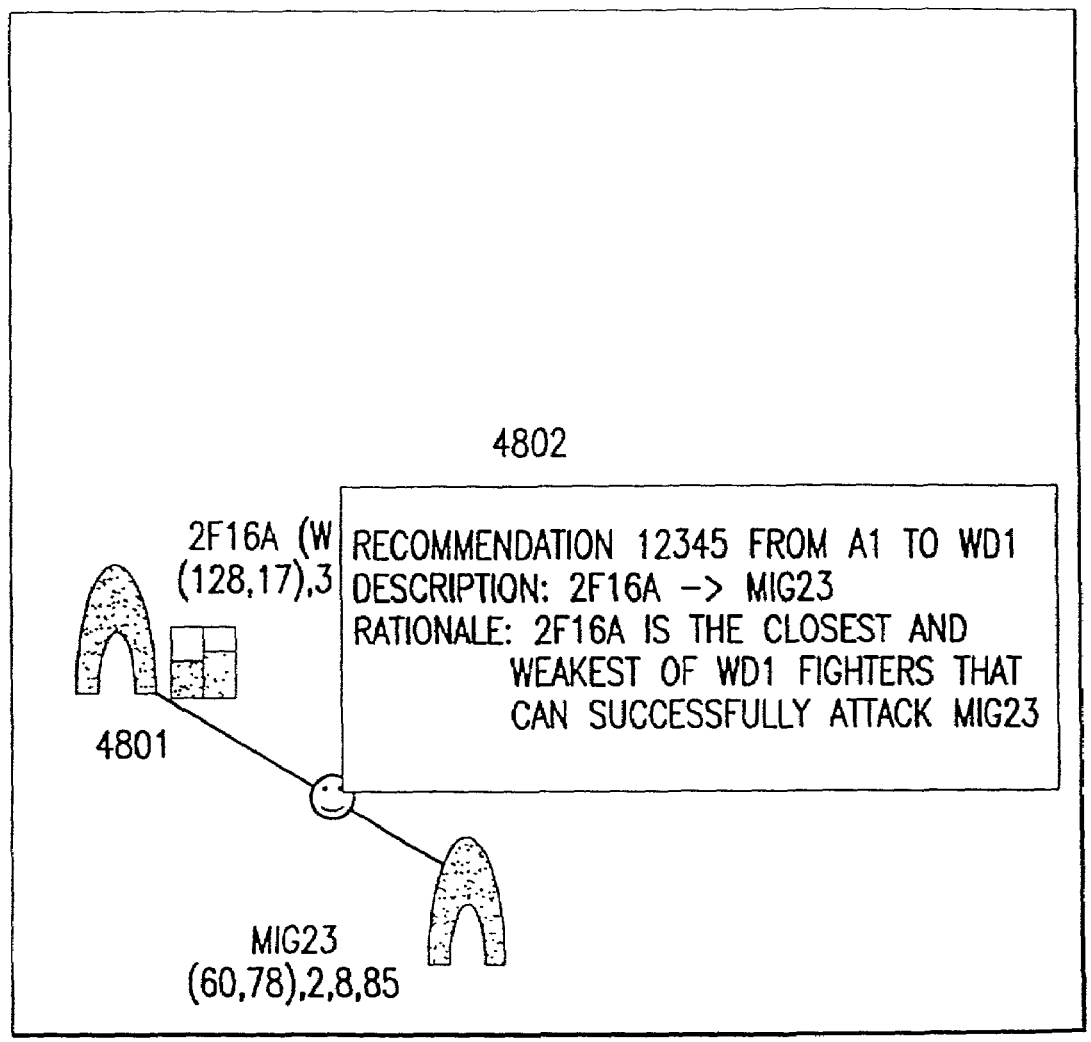
FIG. 48 shows a sample display of detailed intelligent agent recommendation information.

Similarly, detailed recommendation information can also be elicited by the weapons director from the primary graphical display area. FIG. 48 shows an example of an agent recommendation presented to weapons director 1 (WD1) 4801 and a corresponding detailed description of the agent recommendation 4802, including the recommendation identifier "123456", the source of the recommendation "A1", the intended recipient of the recommendation "WD1", the description of the recommendation "2F16A->MIG23", meaning "have 2F16A target MIG23", and the rationale for this recommendation. In this case, the rationale is that "2F16A is the closest and weakest of WD1 fighters that can successfully attack MIG23".

Possible Configurations

Figure 49:
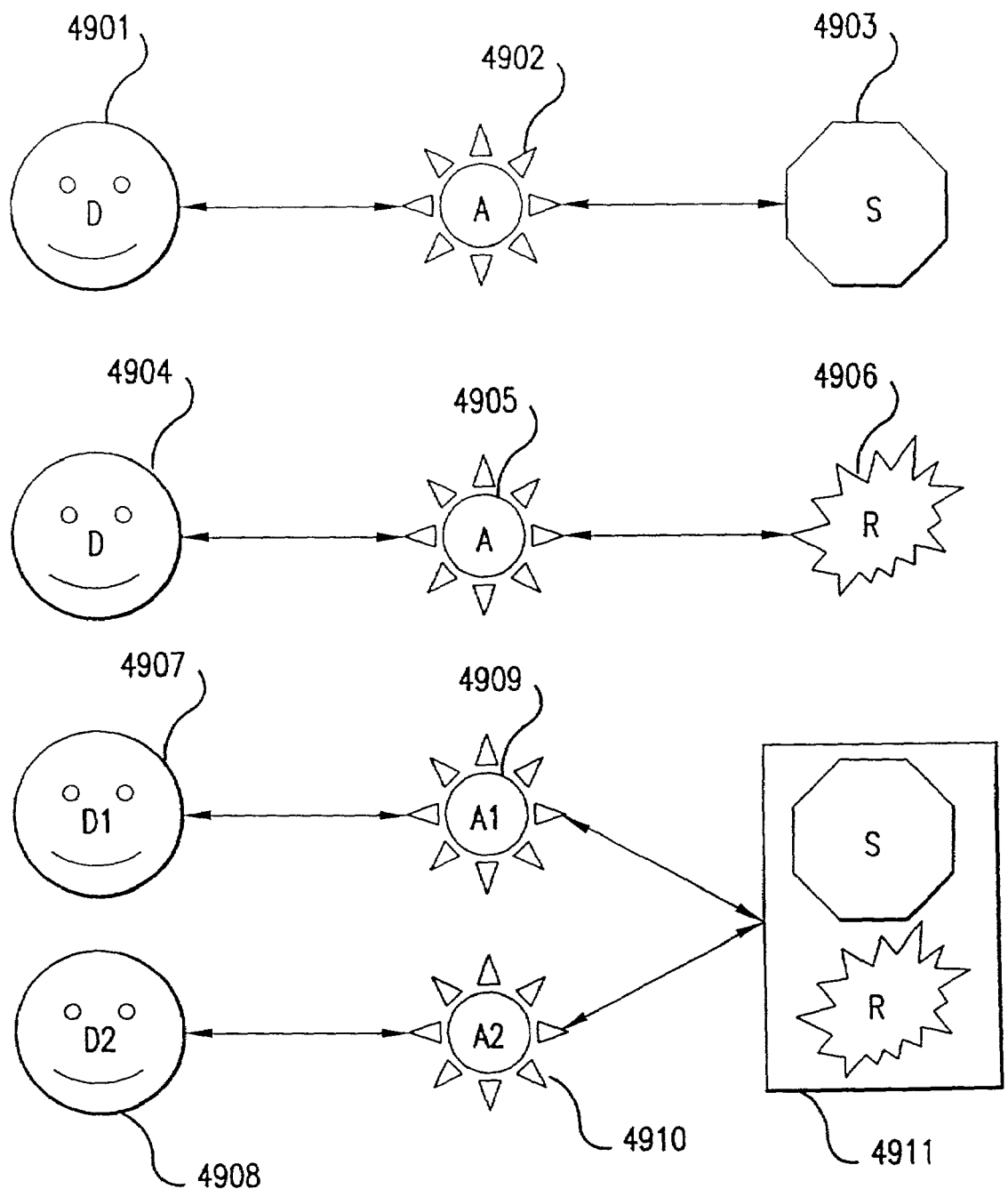
FIG. 49 shows possible configurations.

A number of possible configurations may exist for employing the described techniques. FIG. 49 describes some of them, however it will be understood by persons skilled in the art that a number of variations and combinations are possible. One possible configuration has a plurality of weapons directors and senior directors managing the weapons directors 4901 using a plurality of agents 4902, connected to a simulation engine 4903, and engaged in training, planning missions, etc. Another possible configuration includes a plurality of weapons directors and senior directors managing the weapons directors 4904 employ a plurality of agents 4905, connected to a real-time data gathering engine 4906 (e.g., radar detector), and performing real-time operations involving command of real aircraft.

In another possible configuration, one plurality of weapons directors and senior directors managing the weapons directors D1 4907 employs a plurality of agents of another type A1 4909, while another plurality of weapons directors and senior directors managing the weapons directors D2 4908 employs a plurality of agents of one type A2 4910, all of them connected to either a simulation engine or a set of real-time data gathering devices 4911. The agents included in groups A1 and A2 may be heterogeneous, i.e., of different types with respect to their implementation platforms (such as Microsoft Windows, UNIX, OS/400, OS/390, or a Java virtual machine), with respect to their implementation logic, with respect to their tactical goals (e.g., defensive vs. offensive combat), and with respect to other parameters, all communicating via a network (e.g., TCP/IP), and sharing information conforming to a single object model.

EMBODIMENT ENHANCEMENT 1—ENEMY RESOURCE RECOGNITION

In an enhanced embodiment, the agent is not provided any information about the type of enemy resources that are present or suddenly appear in the simulation. In a real-life military situation, when a resource is detected, it may not always be known what this resource's allegiance is—"ours", "enemy", "ally", "neutral", etc., nor what type of resources this is—fighter, bomber, civilian aircraft, etc. Actions of a resource may need to be observed over a particular time period, and certain conclusions may be drawn heuristically, based on these actions. Additionally, an attempt to contact an unknown resource via radio or optical signals, or even a fly-by of an unknown resource by our aircraft may be recommended by the agent or ordered by a weapons director to visually identify an unknown resource. If the agent is connected to the radar feed, the agent may also examine the radar screen patterns of unknown resources and attempt to combine the information it gains from the radar with any other known information to fathom the nature of unidentified resources.

The process of recognition of unknown resources would be performed as a part of building the agent view of the world table, described above. In the context of this process, each resource representation would be enhanced with the "identified" indicator, permanently set for our resources, and not set for any of the enemy resources that have not been identified. Upon successful identification of an enemy resource, the enemy resource's "identified" indicator is set.

EMBODIMENT ENHANCEMENT 2—USER FEEDBACK OR AUGMENTATION OF INFORMATION AND ITS PROPAGATION

A weapons director may also obtain information from sources not monitored by the agent, e.g., from conversations with other weapons directors or the senior director, from intelligence sources, or from radio transmissions. In this case, it would be advantageous for a weapons director to provide additional information to the agent so that the agent could incorporate this additional information in its decision making. For this purpose, user feedback/correction is permitted by the user interface, and corrected information is conveyed to the agent.

Figure 50:
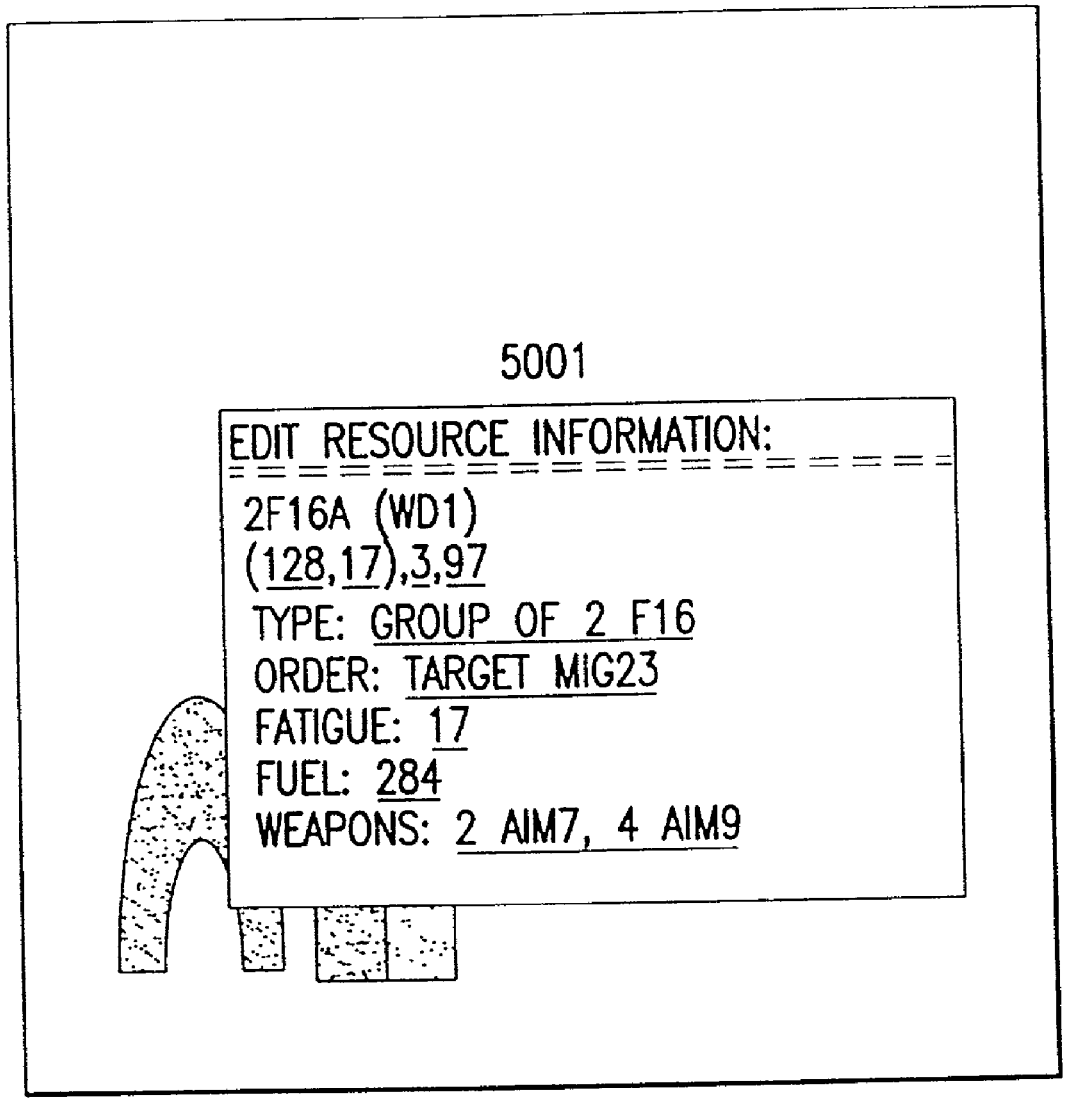
FIG. 50 shows a user feedback loop implementation for correction of the intelligent agent resource information.

While a single left mouse button click on a resource symbol causes a detailed resource information displayed to be presented to a user, a double left mouse button click on a resource symbol causes an edit session to be opened, permitting the user to edit specific information about the resource. FIG. 50 shows such an edit session for our resource 2F16A 5001, and the underlined fields are the ones the user can edit. Once editing is finished, the changed information will be adjusted in the resource representation in the simulator, and the modified resource representation will be known to the agent on the next tick of the simulation, when the agent examines resources and builds the view of the world resource table.

Figure 51:
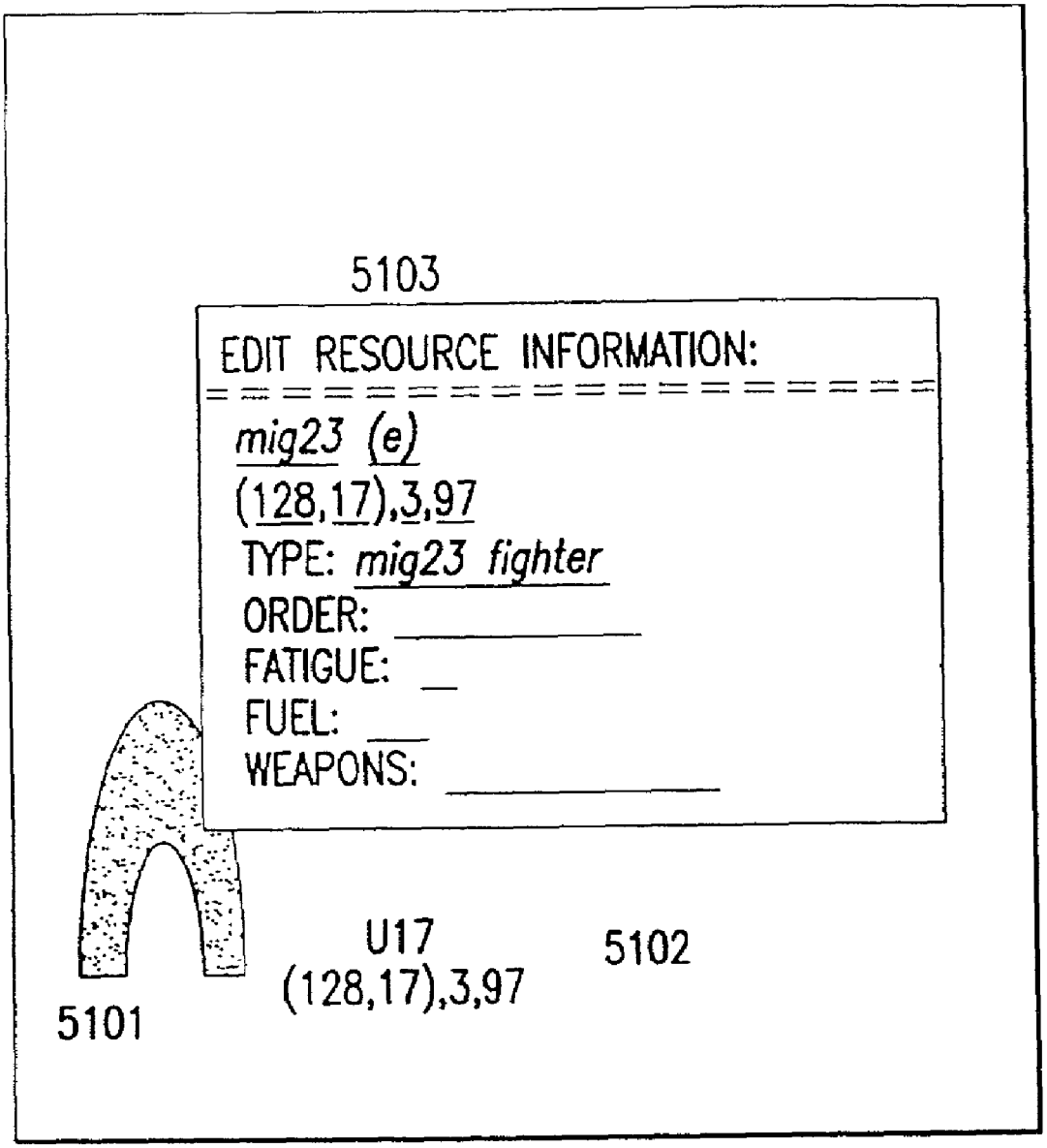
FIG. 51 shows a user feedback loop implementation for adding information about an unidentified resource.
Figure 52:
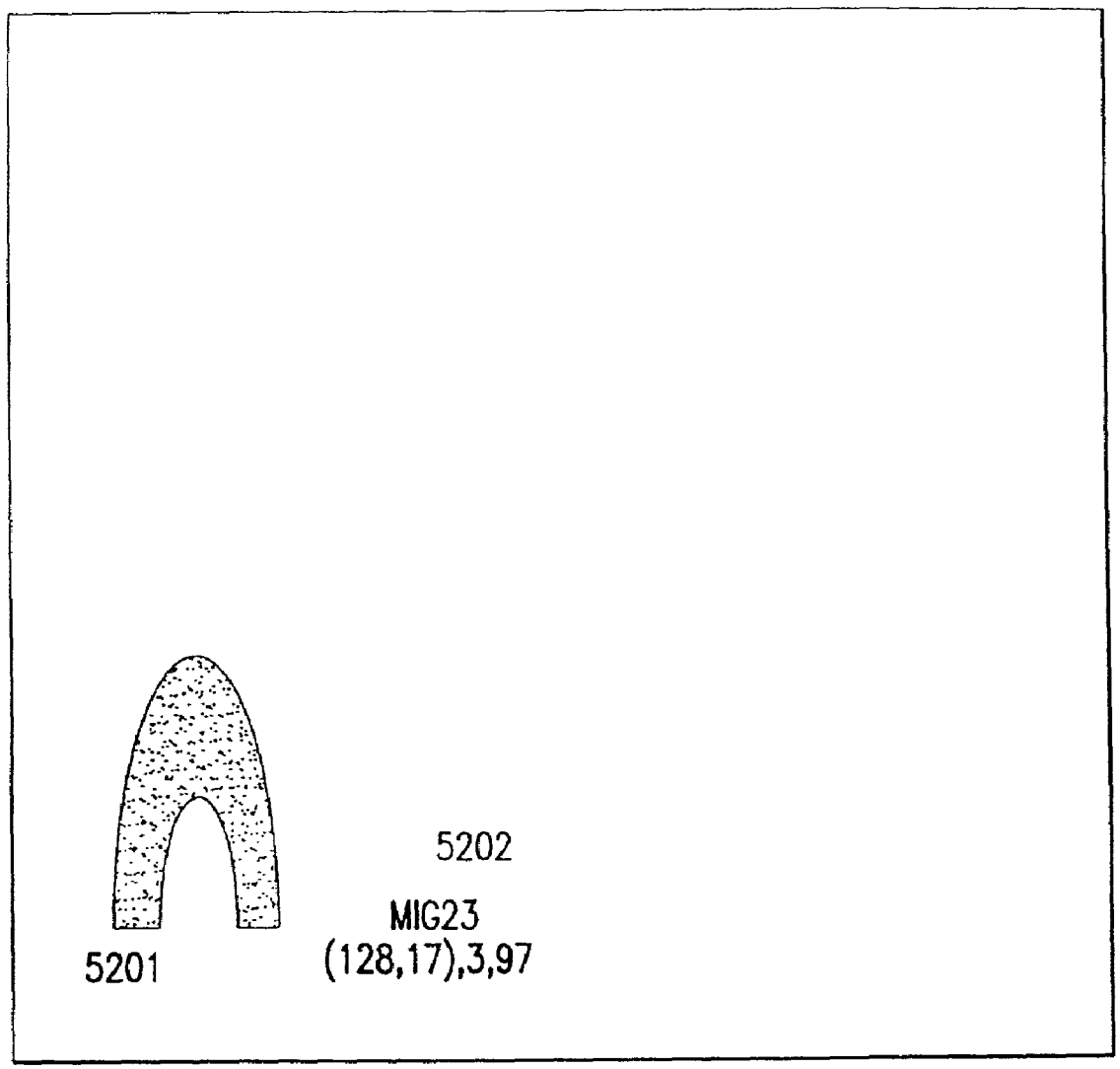
FIG. 52 shows a sample changed resource representation resulting from a user feedback action.

Similarly, information about an unidentified resource can be filled in by a user. An example of filling in information for an unidentified resource is shown in FIG. 51. An unidentified resource symbol is shown in yellow color 5101, yellow indicating unknown resource allegiance, and its associated label is "UI7" 5102, meaning the seventh unidentified resource. When a user edits the resource information, most of the field presented by the edit session would be blank 5103, and the user can fill any information known. The filled information is shown in lower case italics in FIG. 51. In the example shown in FIG. 51, the user has designated a resource identified "MIG23" for this unidentified resource, has indicated that this is an enemy resource by typing "e", and specified the resource type as "MIG23 FIGHTER". When this information is received by the simulator and propagated to the agent, the resource display will be as shown in FIG. 52, with the resource symbol drawn in red 5201, indicating an enemy resource, and the resource identifier reset to "MIG23" 5202.

Figure 53:
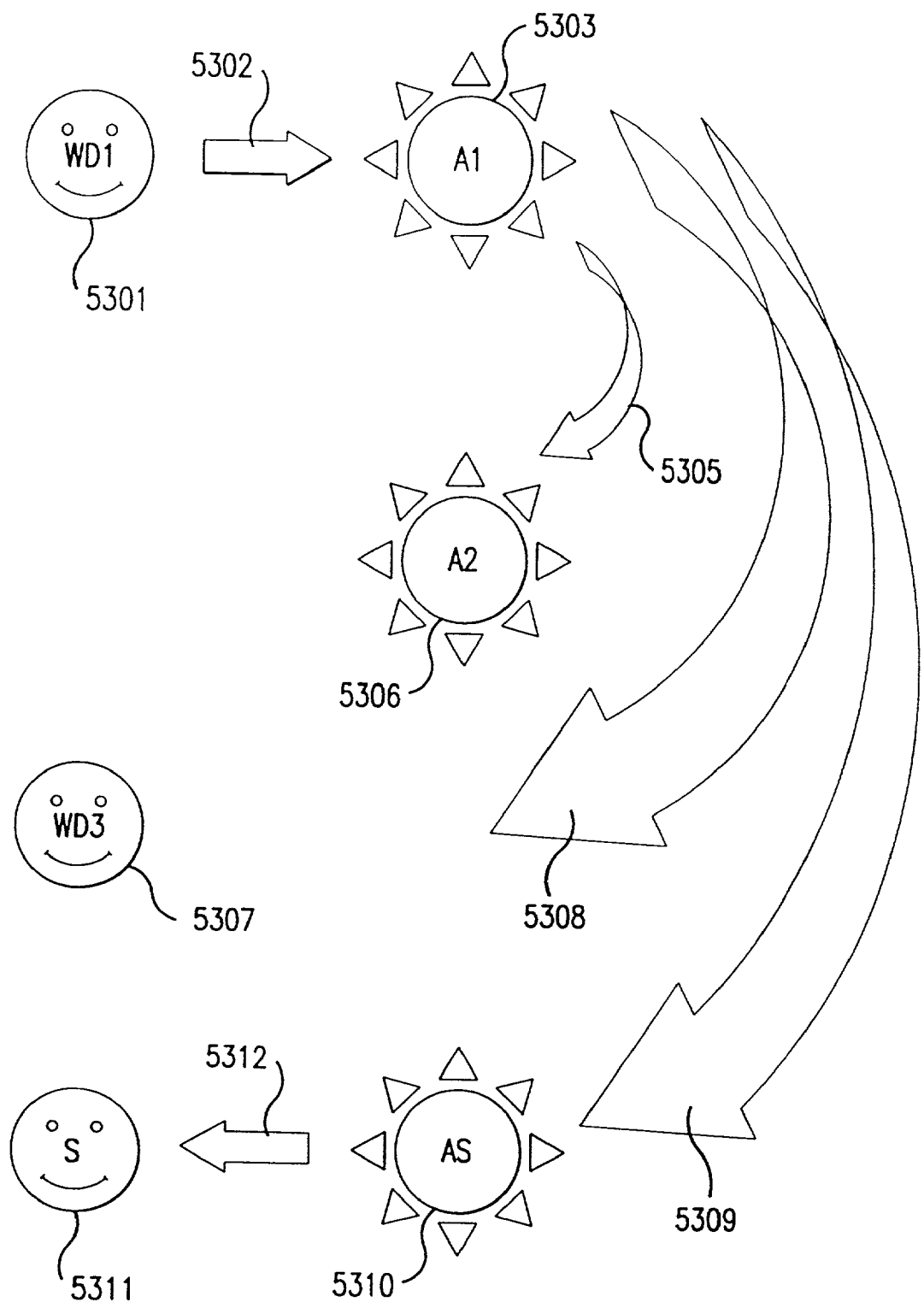
FIG. 53 shows the paths of propagation of new information among users and intelligent agents.

When new information becomes available to a particular agent, that agent is responsible for informing agents of other weapons directors and the agent of the senior director about this new information. FIG. 53 shows a sample flow of propagation of new information. Weapons director 1 (WD1) 5301 has obtained some new information and informed at 5302 its agent (A1) 5303. Agent A1 is now responsible for conveying at 5305 this information to its counterpart agent A2 5306, for conveying at 5308 this information to the user interface of weapons director 3 (WD3) 5307, and for conveying at 5309 this information to the agent of the senior director (AS) 5310. Senior director (AS) is, in turn, responsible for conveying at 5312 this information to the senior director 5311. When new information is conveyed to an agent, that agent updates its view of the world table and, if this agent is advising a human user, the agent reflects this information at the user's graphical interface.

Persons skilled in the art will understand that even though the specific feedback/augmentation of agent information by the user shown above pertains to airplanes and resource identification, information for other resources (e.g., satellites, submarines, ships, cars, etc.) as well as about environment (e.g., road blocks, traffic jams, network disruption points, etc.) can be provided to the agent in a similar fashion, as pertinent to a particular application of this technique.

EMBODIMENT ENHANCEMENT 3—PILOT FATIGUE MEASUREMENTS

Pilots' degree of stress and resulting pilot fatigue are important when making decisions about plane assignments for various missions. There exists an empirically established degree of pilot fatigue, which, when reached, causes the airplane pilot to be considered incapable of safe operation of an airplane. However, long before the critical fatigue level is reached, the ability of a pilot to safely operate an airplane in critical and demanding circumstances may be impaired. Pilot fatigue is an important factor contributing to loss of airplanes in the combat environment, and thus becomes an important consideration for tactical decision making when allocating resources for defensive, offensive, or reconnaissance purposes.

For the purpose of measuring pilot fatigue, each Plane object is enhanced with an additional floating-point field—"fatigue". This field is set to 0 every time a plane takes off from a base, under an assumption that the pilot is completely rested. The "fatigue" field value is incremented every tick of the simulation by the Plane class objects' tick of the simulation processing, and it grows proportional to the amount of time a Plane has been in the air. The "fatigue" value is additionally incremented in proportion when a plane is under attack, is performing an attack on an enemy target (air or ground), is performing a fly-by or reconnaissance, or is performing fueling in the air from a tanker. All of the previously enumerated factors increase the normal level of stress an airplane pilot is subject to, and therefore contribute to the increase of the pilot fatigue level.

When generating recommendations to the weapons directors, the agent will take pilot fatigue into consideration. So, the agent will detect the points when pilot fatigue reaches a critical level and may severely affect a pilot's performance, and recommend to the weapons director that the plane(s) manned by highly fatigued pilots be returned to base. Additionally, the agent will consider the pilot fatigue level when deciding which plane(s) to assign to specific tasks, e.g., when selecting a fighter to target an enemy plane, the agent may choose a resource that is slightly farther away from the enemy plane, but the pilot of which is less fatigued than the pilot of the closest of our fighters.

Pilot fatigue is a factor specific to the aircraft tactical decision making. Persons skilled in the art will understand that various applications of the techniques described herein may involve various types of measurements and factors, similar or different in their nature to what has been described, but applicable to different uses of these techniques. E.g., fatigue may also be applicable to drivers in a taxi or cargo car or truck fleet, albeit the factors contributing to the driver fatigue may be different from those for the fatigue of pilots, and different measurements may need to be taken to derive driver fatigue values. Furthermore, if an intelligent agent using this technique is produced for manned space devices, then other factors, such as, e.g., degree of solar radiation and current solar activity, duration of continuous exposure to weightlessness, the number of hours in over-oxygenated atmosphere, and specific biological measurements may be applicable in addition to or instead of the fatigue computations described above.

EMBODIMENT ENHANCEMENT 4—WEAPONS DIRECTORS AND TEAM PERFORMANCE MEASURES

One of the applications of the described program is training of weapons directors. For that purpose, it is essential to have a way of evaluating the results of weapons directors' actions. Different ways of evaluating weapons directors' actions are possible. The method described here ties the weapons directors' measurements with the attainment of tactical goals set for the weapons directors. E.g., the tactical goal is to defend air space and ground resources against an onslaught of enemy fighters and bombers, while preserving as many of our fighters as possible. It is possible to keep score of weapons directors activity by assigning values to our planes, our ground resources, and enemy planes, and then by computing the sum of values of destroyed enemy vs. our resources. For that purpose, each resource is enhanced with a "value" field, such as an integer, containing the value of that resource in the framework of the measurements.

Figure 54:
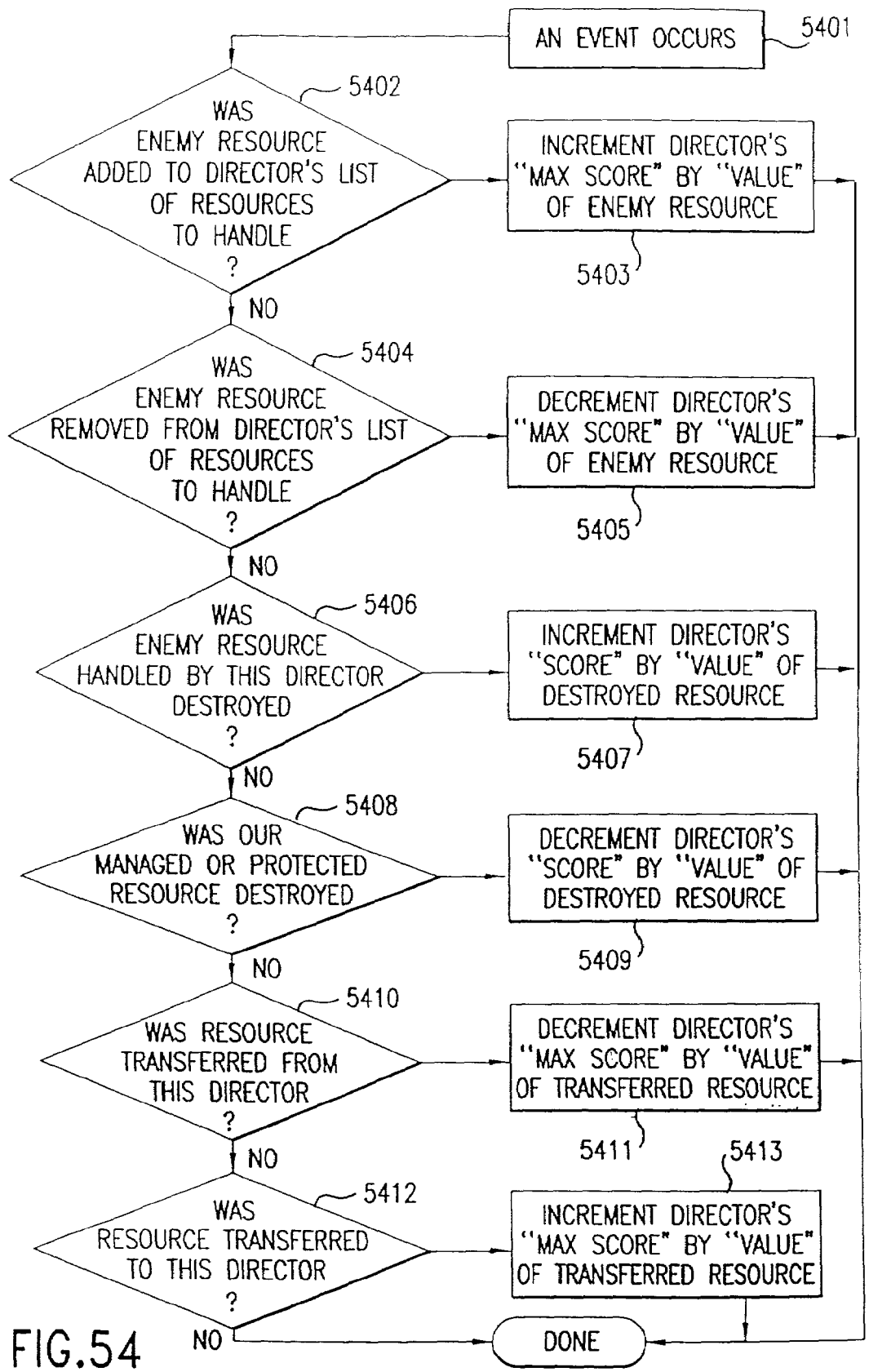
FIG. 54 shows the process of evaluating actions of the weapons directors.

Each weapons director (Director class) object representation is enhanced with two additional fields: "score" and "maxScore". The "score" field is initially set to 0, and the "maxScore" field is initially set to the sum of the contents of the "value" field of all of the resources this weapons director is responsible for managing and protecting. Every time an enemy resource is added to the list of enemy resources for which a weapons director is responsible for handling, the "maxScore" field is increased by the value of the "value" field of that enemy plane. Every time an enemy resource is destroyed by our fighters, the weapons director's "score" field is increased by the contents of the "value" field of the destroyed enemy resource. Every time our resource reporting to or protected by this weapons director is destroyed, the weapons directors' "score" value is decreased by the contents of the value field of this resource. Every time a resource is transferred between weapons directors, the weapons directors' "maxScore" field contents is adjusted by the value of the transferred resource. As a result, upon completion of a training session, it is possible to compare a weapons director's "score" value against this weapons director's "maxScore" value and derive conclusions about this weapons director's performance. FIG. 54 shows the mechanism for keeping weapons directors' scores when events occurs. An event occurs 5401, and is evaluated as follows. If an enemy resource has been added to the weapons director list of resources this weapons director is responsible for handling 5402, this weapons director's "maxScore" field is incremented by the "value" field of this enemy resource 5403. If an enemy resource has been removed from a weapons director list of resources this weapons director is responsible for handling 5404, and this weapons director's "maxScore" field is decremented by the "value" field of this enemy resource 5405. If an enemy resource in the list of enemy resources this weapons director is responsible for handling has been destroyed 5406, this weapons director's "score" field is incremented by the "value" field of the destroyed enemy resource 5407.

If our resource reporting to or protected by this weapons director has been destroyed 5408, this weapons director's "score" field is decremented by the "value" field of our destroyed resource 5409. If our resource has been transferred from this weapons director to another weapons director 5410, this weapons director's "maxScore" field is decremented by the "value" field of the transferred resource 5411. If our resource has been transferred from another weapons director to this weapons director 5412, this weapons director's "maxScore" field is incremented by the "value" field of the transferred resource 5413.

Similarly, the overall weapons directors' team effectiveness can be measured by a pair of score fields that would account for overall preservation of resources this team of weapons directors is responsible for protecting and for destruction of all enemy resources. To motivate the team spirit between weapons directors, additional "bonus" points may be awarded whenever a resource transfer between weapons directors has been successfully accomplished and has helped to attain the tactical goals.

EMBODIMENT ENHANCEMENT 5—HEURISTIC ESTABLISHMENT OF AGENT RECOMMENDATIONS CONSTRAINTS BASED ON USER BEHAVIOR PATTERNS

Over a period of time, the agent making recommendations to a particular user may observe that certain kinds of recommendations are consistently ignored by a user, while other kinds are consistently accepted. E.g. an agent may observe that a weapons director it advises tends to always accept recommendations to target advancing enemy with CAP'ed fighters but never with fighters on their way to tank (even though the agent may consider these fighters adequately fueled and otherwise ready for another dogfight). The agent may over time learn not to generate the recommendations that are consistently ignored. In the previous example, the agent may learn not to recommend the weapons director to assign fighters on their way to tank to other tasks.

FIG. 55 shows a data structure that the agent can use to accumulate historical recommendation disposition information for a particular weapons director. The data structure is a table with the following types of columns: "Recommendation type", "Accepted Count" (count of accepted recommendations), "Current resource order (acc.)" (the count of order types resources had at the time of recommendation acceptance), "Resource location (acc.)" (any specific information about locations of resources at the time of recommendation acceptance), "Not accepted count" (a.k.a. Ignored or Rejected count—the count of recommendations that were not accepted), and the corresponding "Current resource order (not acc.)" and "Resource location (not acc.)" columns for not accepted recommendations. The table rows represent different types of recommendations, in this case, based on the type of order a recommendation recommends—TARGET, RTB, TANK, JOIN, SPLIT, GO, CAP.

Every time a recommendation is accepted, the "accepted" count, corresponding to the order a recommendation prescribes is incremented, and the current (i.e., prior to recommendation acceptance) order of the resource for which the recommendation is being made and its location at the time of the recommendation issuance are noted. Every time a recommendation is not accepted, the "not accepted" count, corresponding to the order a recommendation prescribes is incremented, and the current (i.e., prior to recommendation acceptance) order of the resource for which the recommendation is being made and its location at the time of the recommendation issuance are noted. In the example in this figure, 17 TARGET recommendations were accepted by the weapons director, and 5 resource instances for which those recommendations were given were executing a CAP order of CAP1 patrol area. 5 TARGET recommendations were not accepted by the weapons director, and 5 resource instances for which those recommendations were given were executing a CAP order of CAP2 patrol area.

From this, the agent may note that the weapons director has no problems with removing resources from the CAP1 patrol area for the purposes of targeting enemy resources, but does not agree with agent recommendations that would remove resources from the CAP2 patrol area for the same purpose. The agent then may conclude that recommendations to remove resources from the CAP2 patrol area for the purpose of targeting enemy resources should not be made. This conclusion would only be reached by the agent after the number of not accepted recommendations has exceeded a pre-determined (and user-customizable) threshold of not accepted recommendations relative to the accepted ones of the same type, and subject to patterns observed in the current resource orders and locations.

Other considerations may be noted by the agent for the purpose of heuristic determination of user behavior patterns, such as proximity of resources to the enemy, resource speeds and altitudes, pilot fatigue values of the resources, etc.

EMBODIMENT ENHANCEMENT 5—WARFARE AND OTHER PROBLEM DOMAINS

Throughout this document we have observed that persons skilled in the art will know that the ideas, technology and algorithms discussed can be applied in problem domains other than the one on which the basic embodiment focuses (namely, tactical aerial warfare). Specifically, persons skilled in the art will understand that the same ideas, technology and algorithms can be applied in all conceivable areas of warfare, including but not limited to air, space, sea, land, undersea and underland. Persons skilled in the art will also understand that the same can be used for all types of warfare, including but not limited to tactical, strategic, global, limited and regional, during all stages of warfare, including but not limited to planning, logistics, combat, cease-fire, negotiation and reporting, and for all and any combination of warfare participants, including but not limited to individual and teams of humans and agents acting on behalf of enlisted personnel, non-commissioned officers, officers, general officers, civilians, diplomats and observers. Persons skilled in the art will also understand that the same can be used in great many other problem domains, including but not limited to telecommunications, business and finance, energy, manufacturing, transportation, health care, network, Internet and WWW and consumer services.

GENERAL BACKGROUND REFERENCES, INCORPORATED HEREIN BY REFERENCE

Our examination of the literature has not produced what we would consider relevant prior art. To acquaint herself or himself with general background information on agents, however, a person not skilled in the art may find much information published books and articles, such as the following, all incorporated herein by reference.

Title: "Intelligent agent systems: theoretical and practical issues: based on a workshop held at PRICAI'96, Cairns, Australia, Aug. 26-30, 1996./Lawrence Cavedon, Anand Rao, Wayne Wobcke (eds.).

Publisher/Date: New York: Springer, 1997.
Series (Searchable by title or keyword):
Lecture notes in computer science; 1209.
Lecture notes in computer science.
Lecture notes in artificial intelligence.
Series (Searchable only by keyword):
Lecture notes in computer science; 1209.
Lecture notes in artificial intelligence
Description: p. cm.
Subjects: Intelligent agents (Computer software)—Congresses.
Notes: Includes bibliographical references.
Other Authors/Contributors: Cavedon, Lawrence, 1964—
Rao, Anand, 1962—
Wobcke, Wayne, 1963—
Pacific Rim International Conference on Artificial Intelligence (4th: 1996: Cairns, Qld.)
ISBN: 3540626867 (softcover: alk. paper)
Primary Material: Book
Title: Agent technology: foundations, applications, and markets
Nicholas R. Jennings, Michael J. Wooldridge (eds.),
Publisher/Date: Berlin; New York: Springer, c1998.
Description: viii, 325 p.: ill.; 24 cm.
Subjects: Intelligent agents (Computer software)
Notes: Includes bibliographical references.
Other Authors/Contributors: Jennings, Nick.
Wooldridge, Michael J., 1966—
ISBN: 3540635912 (alk. paper)
Title: Agent technology handbook/Dimitris N. Chorafas.
Author/Contributor: Chorafas, Dimitris N.
Publisher/Date: New York: McGraw-Hill, c1998.
Series (Searchable by title or keyword):
The McGraw-Hill series on computer communications
Description: xlvii, 382 p.: ill.; 24 cm.
Subjects: Intelligent agents (Computer software)—Handbooks, manuals, etc.
Notes: Includes bibliographical references, glossary and index.
ISBN: 0070119236 (acid-free paper)
Primary Material: Book
Title: Cooperative knowledge processing: the key technology for intelligent organizations/Stefan Kim and Greg O'Hare (eds.).
Publisher/Date: Berlin; New York: Springer, c1997.
Series (Searchable by title or keyword):
Computer supported cooperative work Description: xxv, 296 p.: ill.; 24 cm.
Subjects: Teams in the workplace—Data processing.
Information technology—Management.
Notes: Includes bibliographical references
(p. 269-288) and indexes.
Other Authors/Contributors: Kim, Stefan.
O'Hare, G. M. P. (Greg M. P.)
ISBN: 3540199519 (alk. paper)
Title: Developing intelligent agents for distributed systems: exploring architecture, technologies, and applications/ Michael
Knapik, Jay Johnson.
Author/Contributor: Knapik, Michael.
Publisher/Date: United States McGraw-Hill 1998
Description: xix/389 p
Contents: Sect. 1. Introduction—Sect. 2. From Artificial Intelligence Comes Intelligent Agents—Sect. 3. Converging Technologies that Facilitate and
Enable Agents—Sect. 4. Agent-Enabling Infrastructures—Sect. 5. Agent Architectures—Sect.

6. Agent-Design Considerations—Sect. 7. Developing Intelligent Agents Now—Sect. 8. Agent
Applications—Sect. 9. Agent Futures.
ISBN: 0070350116:
Primary Material: Book
Title: Intelligent agents II: agent theories, architectures, and languages:
IJCAI'95 Workshop (ATAL), Montreal, Canada, Aug. 19-20, 1995: proceedings/M. Wooldrige, J. P. Müller, M. Tambe, (eds).
Author/Contributor: International Workshop on Agent Theories, Architectures, and Languages (2nd: 1995: Montréal, Quebec)
Publisher/Date: Berlin; New York: Springer, c1996.
Series (Searchable by title or keyword):
Lecture notes in computer science; 1037.
Lecture notes in computer science.
Lecture notes in artificial intelligence.
Series (Searchable only by keyword): Lecture notes in computer science; 1037.
Lecture notes in artificial intelligence
Description: xviii, 437 p.: ill.; 24 cm.
Subjects: Artificial intelligence—Data processing—Congresses. Computer architecture—Congresses.
Computational linguistics—Congresses.
Notes: Second International Workshop on Agent Theories, Architectures, and Languages, held in conjunction with the International Joint Conference on Artificial Intelligence. Includes bibliographical references and index.
Other Authors/Contributors: Wooldridge, Michael J., 1966—
Müller, Jörg P., 1965—Tambe, Milind, 1965—
International Joint Conference on Artificial Intelligence (1995: Montréal, Quebec)
ISBN: 3540608052 (softcover: alk. paper)
Primary Material: Book
Title: Distributed information systems in business/W. König . . . [et al.] eds.).
Publisher/Date: Berlin; New York: Springer-Verlag, c1996.
Description: vi, 302 p.: ill.; 24 cm.
Subjects: Business—Computer networks. Electronic data processing—Distributed processing.
Management information systems.
Distributed artificial intelligence.
Contents: Managing Distributed Information Systems—
Income/Star: Facing the Challenges for Cooperative
Information System Development Environments—A Business Process
Oriented Approach to Data Integration—Solving Decision Problems by Distributed
Decomposition and Delegation—Foundations of a
Theory and its Application within a Normative Group Decision
Support System Framework—Distributed Cooperative Budget-planning and-control—Decentralized Problem Solving in Logistics with Partly Intelligent Agents and Comparison with
Alternative Approaches—Organizational Multi-Agent Systems: A Process Driven Approach—
Development and Simulation of Methods for Scheduling and Coordinating Decentralized Job Shops Using Multi-Computer
Systems—Distributed Environments for Evolutionary Algorithms by means of Multi-Agent
Applications—Multi-Layered Developed of
Business Process Models and Distributed Business Application Systems—An Object—Oriented
Approach—Computer Support for Distributed Informations Management Tasks (CUVIMA)—The GroupFlow Framework: Enterprise Model and Architecture of the Workflow System
—ALLFIWIB: Customer Consulting in Financial Services with Distributed Knowledge Based Systems—A Generic Approach for Computer—Assistance of Complex Decision
Processes—Group Scheduling—Methods and Tools for Distributed Scheduling Processes in a Corporate Environment
—Modeling Knowledge about Long term IS Integration and Integration-oriented
Reengineering with KADS.
Notes: Includes bibliographical references and index.
Other Authors/Contributors: König, Wolfgang, 1951
ISBN: 3540610944 (hardcover: alk. paper)

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. In an intelligent agent system, a computer implemented or user assisted method of generating alternative actions to be selected by at least one user associated with in at least one aerial combat situation, comprising the steps of:
configuring, using a computer, at least one tactical agent with data corresponding to an aerial combat environment and with the data corresponding to resources involved in the at least one aerial combat situation, including first data on the aerial combat environment and the resources involved in the at least one aerial combat situation, second data on the near certain future status of the aerial combat environment and the resources involved in the at least one aerial combat situation, and third data on the possible future status of the aerial combat environment and the resources involved in the at least one aerial combat situation;
processing, using the computer, the at least one aerial combat situation and the data corresponding to the aerial combat environment and the resources involved in the aerial combat situation, using the at least one configured tactical agent;
assisting the at least one user in selecting at least one of the alternative actions for the at least one aerial combat situation by providing the at least one user information generated by the processing step; and
implementing at least one of the alternative actions, by at least one user or independently by at least one intelligent agent, based on said processing and assisting steps when selected by the at least one user, and the implementing of the at least one of the alternative actions being used to direct the use of one or more of the resources involved in the aerial combatat situation.

2. A computer implemented or user assisted method of generating alternative actions to be selected by at least one user according to claim 1, wherein the at least one intelligent agent exhibits autonomous behavior and engages in a human-simulated or human-like decision making process.

3. A computer implemented or user assisted method of generating alternative actions to be selected by at least one user according to claim 1, wherein the at least one intelligent agent assists the at least one user in the generating alternative actions to be selected by at least one user for the at least one aerial combat situation by providing the at least one user advice on coordinating the at least one aerial combat situation.

4. A computer implemented or user assisted method of generating alternative actions to be selected by at least one user according to claim 1, wherein the at least one intelligent agent is configurable to perform independent decisions in at least one of real-time and non-real time for the at least one aerial combat situation.

5. A computer implemented or user assisted method of generating alternative actions to be selected by at least one user according to claim 1, wherein the at least one intelligent agent comprises a plurality of collaborating intelligent agents for the the decision making, and wherein the plurality of collaborating intelligent agents exhibit autonomous behavior and engage in at least one of a human-simulated and human-like decision making process.

6. A computer implemented or user assisted method of generating alternative actions to be selected by at least one user according to claim 5, wherein at least one of the plurality of collaborating intelligent agents includes or accesses a portion of the data not shared by another of the plurality of intelligent agents.

7. A computer implemented or user assisted method of generating alternative actions to be selected by at least one user according to claim 5, wherein the decision making is implemented or the user assisted by implementing global decisions that affect the plurality of the collaborating intelligent agents and the at least one user on the basis of the plurality of collaborating agents exchanging, debating and discussing the data.

8. A computer implemented or user assisted method of generating alternative actions to be selected by at least one user according to claim 1,
wherein the at least one intelligent agent comprises a plurality of collaborating intelligent agents for generating alternative actions to be selected by at least one user, and
wherein the plurality of collaborating agents collaborate and optionally debate with each other and with the at least one user.

9. A computer implemented or user assisted method of generating alternative actions to be selected by at least one user according to claim 1,
wherein the at least one intelligent agent comprises a plurality of collaborating intelligent agents for generating alternative actions to be selected by at least one user, and
wherein the plurality of collaborating intelligent agents include at least one of role-playing agents and adviser agents.

10. A computer implemented or user assisted method of generating alternative actions to be selected by at least one user according to claim 1,
a wherein the at least one intelligent agent comprises a plurality of collaborating intelligent agents, wherein the at least one user comprises a plurality of users, and
wherein the plurality of collaborating intelligent agents collaborate with the plurality of users to jointly perform generating alternative actions to be selected by at least one user.

11. A computer implemented or user assisted method of generating alternative actions to be selected by at least one user according to claim 1,
wherein the at least one user comprises a plurality of independent or collaborating users, and
wherein the at least one intelligent agent collaborates with the plurality of independent or collaborating users to jointly perform generating alternative actions to be selected by at least one user.

12. A computer implemented or user assisted method of generating alternative actions to be selected by at least one user according to claim 1, wherein the at least one intelligent agent assists the at least one user in generating alternative actions to be selected by at least one user for the at least one aerial combat situation by providing the at least one user advice on coordinating the at least one aerial combat situation using a closed loop feedback process between the at least one intelligent agent and the at least one user.

13. A computer implemented or user assisted method of generating alternative actions to be selected by at least one user accccording to claim 12, wherein the at least one intelligent agent accepts real-time corrections to the environment as perceived by the at least one intelligent agent from the at least one user in at least one of a non-real time and real-time period.

14. A computer implemented or user assisted method of generating alternative actions to be selected by at least one user according to claim 1, wherein the at least one intelligent agent assists the at least one user in generating alternative actions to be selected by the at least one user for at least one of the at least one aerial combat situation, sea situation, undersea situation, space situation, land situation, railroad situation, automotive situation, underground situation, space situation, land situation, and traffic situation, and any combinations thereof.

15. A computer implemented or user assisted method of generating alternative actions to be selected by at least one user according to claim 1,
wherein the at least one user comprises a plurality of independent or collaborating users, and
wherein the at least one intelligent agent collaborates with the plurality of independent or collaborating users with different sets of environmental information representing each of the users different perceptions of the environment to perform the generating of alternative actions to be selected by the at least one user.

16. A computer implemented or user assisted method of generating alternative actions to be selected by at least one user according to claim 15, wherein the at least one intelligent agent utilizes the different sets of environmental information to at least one of enhance and correct the at least one intelligent agent's view of the environment.

17. A computer implemented or user assisted method of generating alternative actions to be selected by at least one user according to claim 16, wherein at least one of corrected and enhanced information resulting from the different sets of environmental information is propagated to the plurality of independent or collaborating users for at least one of review, adjusting and updating of the environmental information.

18. A computer implemented or user assisted method of generating alternative actions to be selected by at least one user according to claim 1,
wherein the at least one user comprises a plurality of independent or collaborating users, and
wherein the at least one intelligent agent comprises a plurality of collaborating intelligent agents representing the plurality of independent or collaborating users having different environmental perceptions.

19. A computer implemented or user assisted method of generating alternative actions to be selected by at least one user according to claim 1, wherein the at least one intelligent agent learns over time by accumulating knowledge about at least one of user behavior, habits and psychological profiles of the at least one user.

20. A computer implemented or user assisted method of generating alternative actions to be selected by at least one user according to claim 19, wherein the at least one intelligent agent includes a priority scheme, and wherein a repeated rejection by the at least one user of a particular type of agent recommendation by the at least one intelligent agent causes the at least one intelligent agent to review its priority scheme and optionally reprioritize the priority scheme.

21. A computer implemented or user assisted method of generating alternative actions to be selected by at least one user according to claim 20, wherein as a result of the at least one intelligent agent reviewing its priority, the at least one intelligent agent does not recommend a specific action or in-action.

22. A computer implemented or user assisted method of generating alternative actions to be selected by at least one user according to claim 1, wherein the at least one intelligent agent collects and evaluates at least one user performance indicator including mental state, physical condition, fatigue, and stress of the at least one user, responsive to the environment and complexity associated therewith.

23. A computer implemented or user assisted method of generating alternative actions to be selected by at least one user according to claim 22, wherein the at least one intelligent agent limits at least one of user privileges, user independent behavior and user authorization without authorization being provided by another user, when the at least one user performance indicator negatively reflects user performance.

24. A computer implemented or user assisted method of generating alternative actions to be selected by at least one user according to claim 22, wherein the at least one intelligent agent provides a recommended course of action responsive to the at least one user performance indicator.

25. A computer implemented or user assisted method of generating alternative actions to be selected by at least one user according to claim 22,
   wherein the at least one intelligent agent comprises a plurality of collaborating intelligent agents, wherein the at least one user comprises a plurality of users, and
   wherein a first recommended course of action is provided for the at least one user responsive to the at least one user performance indicator, and a second recommended course of action is provided for the plurality of users, optionally including the at least one user, responsive to at least one of collaboration between the plurality of agent, users, and a combination thereof.

26. A computer implemented or user assisted method of generating alternative actions to be selected by at least one user according to claim 1,
   wherein the at least one intelligent agent comprises a plurality of collaborating intelligent agents,
   wherein the at least one user comprises a plurality of users,
   wherein user specific information is collected and evaluated for each of the plurality of users and group specific information is collected and evaluated for the plurality of users as a group, and
   wherein a plurality of first recommended courses of action are provided for one or more of the plurality of users responsive to the user specific information, and a plurality of second recommended courses of action are provided for the plurality of users, optionally including the at least one user, responsive to the group specific information.

27. A computer implemented or user assisted method of generating alternative actions to be selected by at least one user according to claim 1,
   wherein said processing step further comprises the step of processing and visually building, using the computer, the at least one aerial combat situation using the at least one tactical agent on a user display, and
   wherein said visual building step further comprises the step of generating an object and imbedding the object in real-time in at least one of a working and running object environment, thereby processing the at least one aerial combat situation.

28. A computer implemented or user assisted method of generating alternative actions to be selected by at least one user according to claim 1,
   wherein said method further comprises the step of collecting environment information in real-time from at least one sensing device,
   wherein said processing step further comprises the steps of processing, using the computer, the at least one aerial combat situation using the at least one tactical agent on a user display, and automatically generating an object representative thereof as an object model indicative of the environment.

29. A computer implemented or user assisted method of generating alternative actions to be selected by at least one user according to claim 1,
   wherein the data further comprises a plurality of resources,
   wherein the at least one tactical agent comprises a plurality of tactical agents monitoring at least one the plurality of resources, each of the plurality of tactical agents capable of perceiving the at least one of the plurality of resources differently,
   wherein said processing step further comprises the steps of processing, using the computer, the at least one aerial combat situation using the plurality of tactical agents associated with the plurality of resources.

30. A computer implemented or user assisted method of generating alternative actions to be selected by at least one user according to claim 1,
   wherein the data further comprises information about a plurality of resources,
   wherein said method further comprises the step of collecting environment information in real-time, and wherein at least one of:
   at least one of the plurality of resources are known to the at least one tactical agent, and
   the at least one tactical agent recognizes objects in real-time from the environment information based on observable characteristics and behavior associated therewith.

31. A computer implemented or user assisted method of generating alternative actions to be selected by at least one user according to claim 1,
   wherein the at least one user comprises a plurality of users including a plurality of weapons directors and at least one senior director,
   wherein said method further comprises the sequential or non-sequential steps of:
   displaying to at least one of the plurality of weapons directors and the at least one senior director event information about events occurring in said method and actions associated therewith;

enabling the at least one of the plurality of weapons directors and the at least one senior director to issue orders to at least one resource managed by the at least one weapons director;

displaying recommendations generated by the at least one intelligent agent to the weapons director;

enabling the plurality of users to control speed of said method during a simulation including restarting the simulation, checking a state of the simulation, and terminating the simulation;

enabling the at least one user to activate or deactivate the at least one tactical agent associated with the at least one user;

enabling each of the plurality of users to log into the simulation or log out of the simulation; and enabling the plurality of weapons directors to communicate with each other for resource transfer therebetween.

32. A computer implemented or user assisted method of generating alternative actions to be selected by at least one user according to claim 1, wherein the at least one user comprises a plurality of users including a plurality of weapons directors and at least one senior director, wherein said method further comprises the sequential or non-sequential steps of issuing an order by at least one of the weapons directors to request the at least one senior director to authorize transfer of resources between weapons directors.

33. A computer implemented or user assisted method of generating alternative actions to be selected by at least one user according to claim 1, wherein the at least one user comprises a plurality of users including a plurality of weapons directors and at least one senior director, wherein each of the plurality of weapons directors includes:

at least one level having a value indicative of one of the following: unknown, novice, journeyman, expert, and master, an allegiance indicating whether each of the plurality of weapons directors is one of the following: ours, enemy, and unknown, a senior reference indicating the at least one senior director which each of the plurality of weapons directors reports thereto, a list of enemy resources each of the plurality of weapons directors are responsible for managing, and a human indicator indicating whether each of the plurality of weapons directors represents one of the at least one user and the at least one intelligent agent.

34. A computer implemented or user assisted method of generating alternative actions to be selected by at least one user according to claim 1, wherein the data further comprises a plurality of resources, wherein each of the plurality of resources includes indicators to indicate resource status, including:

a mustBeHandled indicator indicative of at least one of the plurality of resources that must be handled, without determining a time of handling the resource, a critical indicator indicative of at least one of the plurality of resources that must be handled immediately, and potentially jeopardizing predetermined goals, a beingHandled indicator indicative of at least one of the plurality of resources currently being handled, a committed indicator indicative of at least one of the plurality of resources committed to handling, a pending indicator indicative of at least one of the plurality of resources which is pending commitment, and a recall indicator indicative of at least one of the plurality of resources no longer needing to be handled.

35. A computer implemented or user assisted method of generating alternative actions to be selected by at least one user according to claim 1, wherein said method is implemented in an object-oriented computing enviroment, wherein the at least one intelligent agent is implemented by at least one intelligent agent object, the at least one tactical agent is implemented by at least one tactical agent object, wherein the data further comprises a plurality of resources, each of the plurality of resources is implemented by at least one resource object and comprising at least one moving resource object including moving resources, at least one group object comprising at least one group of the moving resources.

36. A computer implemented or user assisted method of generating alternative actions to be selected by at least one user according to claim 35, wherein the data further comprises at least one plane object including properties common to a plurality of planes.

37. A computer implemented or user assisted method of generating alternative actions to be selected by at least one user according to claim 36, wherein the at least one moving resource object comprises moving resource indicators including: destroyed if the at least one moving resource is destroyed, at base if the at least one moving resource has landed at a base, and getting fuel if this moving resource is in process of being refueled.

38. A computer implemented or user assisted method of generating alternative actions to be selected by at least one user according to claim 35, wherein the at least one user comprises a plurality of users including a plurality of weapons directors and at least one senior director, wherein the plurality of weapons director are implemented by a weapons director object, and the at least one senior director to whom at least one of the plurality of weapons directors report is implemented by at least one senior director object including a a list of at least one of the plurality of weapons directors reporting thereto.

39. A computer implemented or user assisted method of generating alternative actions to be selected by at least one user according to claim 38, wherein the at least one of the plurality of tactical agents pass recommendations to at least one of the plurality of weapons directors and the at least one user, the recommendations being implemented by a recommendation object.

40. A computer implemented or user assisted method of generating alternative actions to be selected by at least one user according to claim 1, wherein the data further comprises a plurality of resources, wherein the at least one user comprises a plurality of users including a plurality of weapons directors and at least one senior director, and wherein the at least one senior director approves and coordinates transfer of at least one of the plurality of resources from one of the plurality of weapons directors to another of the plurality of weapons directors.

41. A computer implemented or user assisted method of generating alternative actions to be selected by at least one user according to claim 1,
wherein the plurality of resources includes a plurality of enemy resources and a plurality of available resources, wherein said method further comprises the steps of:
determining, for each of the plurality of weapons directors, by the at least one tactical agent, at least one of the plurality of enemy resources that must be handled, and for the at least one enemy resource determining strength, speed, and time available for handling;
building, by the at least one tactical agent, a first list of at least one of the available resources to handle the at least one enemy resource, and for the at least one available resource determining strength, speed, pilot fatigue factor, and remaining flight time;
building, by the at least one tactical agent, for each of the plurality of enemy resources requiring handling, a second list of candidates of the plurality of resources capable of being dispatched to handle the at least one of the plurality of enemy resources;
processing, by the at least one tactical agent, the first list of at least one of the available resources and determining at least one available resource to handle the at least one enemy resource, and performing a resource commitment to commit at least one of the plurality of available resources for each of the plurality of weapons directors; and
assigning, by the at least one tactical agent, when no available resource is capable of handling the at least one enemy resource the corresponding enemy resource to a third list of resources to be handled by a team, and processing for the at least one each enemy resource associated therewith without regard to responsibilities and resources associated with specific weapons directors, and performing a team resource commitment to commit at least one team of available resources including transfer of resources between the plurality of weapons directors after authorization by the at least one senior weapons director.

42. A computer implemented or user assisted method of generating alternative actions to be selected by at least one user according to claim 1,
wherein the data further comprises a plurality of resources,
wherein the at least one user comprises a plurality of users including a plurality of weapons directors and at least one senior director,
wherein the at least one tactical agent accumulates historical recommendation information for at least one of the plurality of weapons directors including recommendation type, number of accepted recommendations, current resource order of accepted recommendations, accepted resource locations, number of not accepted recommendations, current resource orders of not accepted recommendations, and not accepted resource locations for not accepted recommendations.

43. In an intelligent object oriented agent system, a computer implemented or user assisted method of generating alternative actions to be selected by at least one user in at least one situation, comprising the steps of:
configuring, using a computer, at least one tactical agent implemented by at least one tactical agent object that includes a plurality of resources corresponding to resources involved in the at least one situation, including first data on the environment and the resources involved in the at least one situation, second data on the near certain future status of the environment and the resources involved in the at least one situation, and third data on the possible future status of the environment and the resources involved in the at least one situation
each of the plurality of resources being implemented by at least one resource object and comprising at least one moving resource object including moving resources, at least one group object comprising at least one group of the moving resources;
processing, using the computer, the at least one situation and the plurality of resources corresponding to the environment and the resources involved in the situation, using the at least one configured tactical agent;
assisting the at least one user in selecting at least one of the alternative actions for the at least one situation by providing the at least one user information generated by the processing step; and
implementing at least one of the alternative actions by at least one user or independently by at least one intelligent agent, based on said processing and assisting steps when selected by the at least one user, and the implementing of the at least one of the alternative actions being used to direct the use of one or more of the plurality of resources involved in the situation.

44. An intelligent agent computer system, comprising:
means for configuring at least one tactical agent with data corresponding to an aerial combat environment and with the data corresponding to resources involved in the at least one aerial combat situation, including first data on the aerial combat environment and the resources involved in the at least one aerial combat situation, second data on the near certain future status of the aerial combat environment and the resources involved in the at least one aerial combat situation, and third data on the possible future status of the aerial combat environment and the resources involved in the at least one aerial combat situation;
means processing, using the computer, the at least one aerial combat situation and the data corresponding to the aerial combat environment and the resources involved in the aerial combat situation, using the at least one configured tactical agent;
means for assisting the at least one user in selecting at least one of the alternative actions for the at least one aerial combat situation by providing the at least one user information generated by the means for processing; and
means for implementing at least one of the alternative actions, by at least one user or independently by at least one intelligent agent, based on said processing means and assisting means when selected by the at least one user, and the implementing of the at least one of the alternative actions being used to direct the use of one or more of the resources involved in the aerial combat situation.

45. A computer readable tangible medium storing instructions for implementing a user assisted method of generating alternative actions to be selected by at least one user associated in at least one aerial combat situation, the instructions executable by a computer, said instructions including the functions of:
configuring, using the computer, at least one tactical agent with data corresponding to an aerial combat environment and with the data corresponding to resources involved in the at least one aerial combat situation, including first data on the aerial combat environment and the resources involved in the at least one aerial combat situation, second data on the near certain future status of the aerial combat environment and the resources involved in the at least one aerial combat situation, and third data on the possible future status of the aerial combat environment and the resources involved in the at least one aerial combat situation;

processing, using the computer, the at least one aerial combat situation and the data corresponding to the aerial combat environment and the resources involved in the aerial combat situation, using the at least one configured tactical agent;

assisting the at least one user in selecting at least one of the alternative actions for the at least one aerial combat situation by providing the at least one user information generated by the processing step; and implementing the at least one of the alternative actions, by at least one user or independently by at least one intelligent agent, based on said processing and assisting steps when selected by the at least one user; and the implementing of the at least one of the alternative actions being used to direct the use of one or more of the resources involved in the aerial combat situation.

46. A computer readable tangible medium storing instructions for implementing a user assisted method of generating alternative actions to be selected by at least one user associated with at least one combat situation, the instructions executable by a computer, said instructions including the functions of:

configuring, using the computer, at least one tactical agent with data corresponding to a combat environment and with the data corresponding to resources involved in the at least one combat situation, including first data on the combat environment and the resources involved in the at least one combat situation, second data on the near certain future status of the combat environment and the resources involved in the at least one combat situation, and third data on the possible future status of the combat environment and the resources involved in the at least one combat situation;

processing, using the computer, the at least one combat situation and the data corresponding to the combat environment and the resources involved in the combat situation, using the at least one configured tactical agent;

assisting the at least one user in selecting at least one of the alternative actions for the at least one combat situation by providing the at least one user information generated by the processing step; and implementing at least one of the alternative actions, by at least one user or independently by at least one intelligent agent, based on said processing and assisting steps when selected by the at least one user, and the implementing of the at least one of the alternative actions being used to direct the use of one or more of the resources involved in the aerial combatat situation.

* * * * *